United States Patent
Aoki

(10) Patent No.: US 7,586,864 B2
(45) Date of Patent: Sep. 8, 2009

(54) COMMUNICATION SYSTEM, BASE STATION, TERMINAL, COMMUNICATION DEVICE, COMMUNICATION MANAGEMENT METHOD, CONTROL PROGRAM, AND COMPUTER-READABLE RECORDING MEDIUM CONTAINING THE SAME

(75) Inventor: Tsuguhiro Aoki, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 350 days.

(21) Appl. No.: 10/921,984

(22) Filed: Aug. 20, 2004

(65) Prior Publication Data

US 2005/0085279 A1 Apr. 21, 2005

Related U.S. Application Data

(60) Provisional application No. 60/585,528, filed on Jul. 6, 2004.

(30) Foreign Application Priority Data

Sep. 30, 2003 (JP) ............................. 2003-341877
May 20, 2004 (JP) ............................. 2004-151031

(51) Int. Cl.
H04W 4/00 (2006.01)
(52) U.S. Cl. ..................... 370/318; 370/328; 370/338
(58) Field of Classification Search ................ 370/318, 370/503, 507, 508, 338, 328, 329; 455/69, 455/561, 517, 433, 458, 480
See application file for complete search history.

(56) References Cited

U.S. PATENT DOCUMENTS

| | | | | |
|---|---|---|---|---|
| 5,509,035 A | * | 4/1996 | Teidemann et al. | 375/356 |
| 5,768,257 A | * | 6/1998 | Khacherian et al. | 370/229 |
| 5,963,870 A | * | 10/1999 | Chheda et al. | 455/522 |

| | | | |
|---|---|---|---|
| 2002/0181459 A1 | 12/2002 | Ohta et al. | |
| 2002/0187783 A1 | 12/2002 | Sugaya | |
| 2004/0072559 A1 | 4/2004 | Kakumaru et al. | |
| 2004/0165574 A1 | 8/2004 | Kakumaru et al. | |

FOREIGN PATENT DOCUMENTS

| | | |
|---|---|---|
| JP | 5-327586 | 12/1993 |
| JP | 9-162798 A | 6/1997 |
| JP | 2002-16575 | 1/2002 |
| JP | 2002-369255 | 12/2002 |

(Continued)

*Primary Examiner*—Lester Kincaid
*Assistant Examiner*—Sayed T Zewari
(74) *Attorney, Agent, or Firm*—Birch, Stewart, Kolasch & Birch, LLP

(57) ABSTRACT

In a wireless communication system, a terminal is identified by a base station in accordance with beacon signals transmitted periodically from the base station, and to the identified terminal, the presence or absence of data to be transmitted and a period until a transmission of a next beacon signal are notified. A terminal-side wireless communication section in the terminal transmits, to the base station, a request for setting of a period between transmissions of beacon signals. A communication control section in the base station sets the period between transmissions of beacon signals in accordance with the request having been received from the terminal. With this arrangement, the terminal can optimize its period between receptions of beacon signals, thereby keeping OFF power supply to a communication circuit from a power source section until the timing for receiving a beacon signal. This allows the terminal to reduce its power consumption.

42 Claims, 31 Drawing Sheets

FOREIGN PATENT DOCUMENTS

| | | |
|---|---|---|
| JP | 2003-60652 | 2/2003 |
| JP | 2003-87856 | 3/2003 |
| JP | 2003-110582 | 4/2003 |
| JP | 2003-124940 A | 4/2003 |
| JP | 2004-128949 | 4/2004 |
| JP | 2004-128949 A | 4/2004 |
| JP | 2004-260386 | 9/2004 |

* cited by examiner

FIG. 22

| TYPE OF APPLICATION | E-MAIL APPLICATION | BROWSER | ... |
|---|---|---|---|
| BEACON TRANSMISSION PERIOD | 60sec | 1sec | ... |

FIG. 23

| TYPE OF APPLICATION | STREAMING APPLICATION | | ... |
|---|---|---|---|
| COMMUNICATION PATTERN OF APPLICATION | 300Kbps | 600Kbps | ... |
| BEACON TRANSMISSION PERIOD | 40msec | 20msec | ... |

FIG. 24

| TYPE OF APPLICATION | IP PHONE APPLICATION | | ... |
|---|---|---|---|
| STATE OF APPLICATION | STAND-BY | CALL | ... |
| BEACON TRANSMISSION PERIOD | 1sec | 20msec | ... |

FIG. 25

| TYPE OF APPLICATION | E-MAIL APPLICATION | | | ... |
|---|---|---|---|---|
| TYPE OF DEVICE | PORTABLE PHONE | PORTABLE INFORMATION TERMINAL | LAP-TOP PERSONAL COMPUTER | ... |
| BEACON TRANSMISSION PERIOD | 10sec. | 60sec | 60sec | ... |

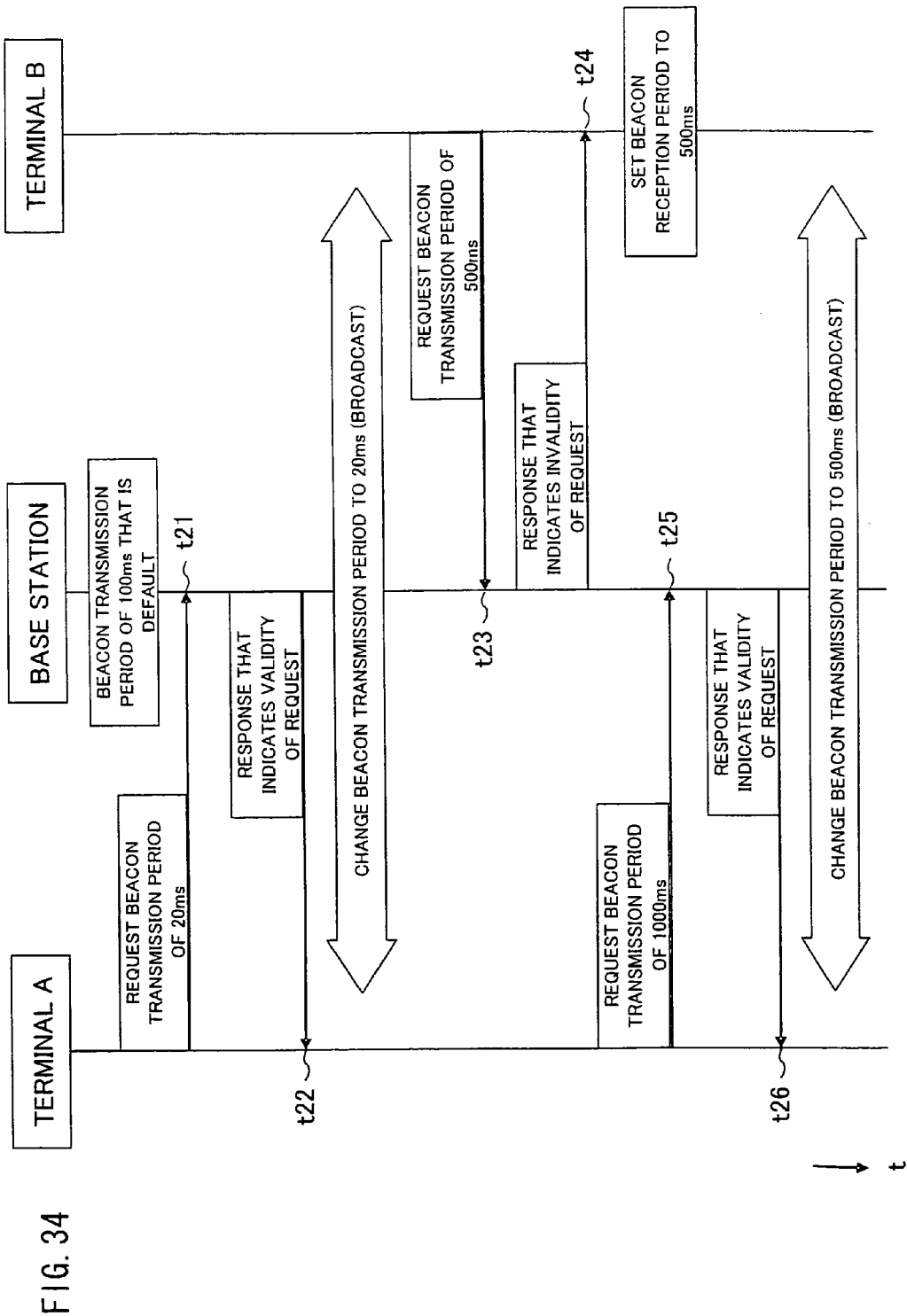

COMMUNICATION SYSTEM, BASE STATION, TERMINAL, COMMUNICATION DEVICE, COMMUNICATION MANAGEMENT METHOD, CONTROL PROGRAM, AND COMPUTER-READABLE RECORDING MEDIUM CONTAINING THE SAME

This nonprovisional application claims the benefit of U.S. Provisional Application Ser. No. 60/585,528 filed on Jul. 6, 2004, and claims priority under 35 U.S.C. §119(a) on Japanese Patent Application No. 2004/151031 filed on May 20, 2004, and Japanese Patent Application No. 2003/341877 filed on Sep. 30, 2003, the entire contents of all of which are hereby incorporated by reference.

FIELD OF THE INVENTION

The present invention relates to a communication system such as a wireless LAN (Local Area Network), a base station, a terminal, a communication device, a communication management method, a control program, and a computer-readable recording medium containing the same.

BACKGROUND OF THE INVENTION

In a wireless LAN realized by a base station and terminals, there is a demand for a minimized power consumption of the terminal.

In a certain kind of wireless LAN, the base station transmits beacon signals periodically to the terminal to notify the terminal of information on identification of the terminal, the presence or absence of data to be transmitted to that terminal, and when a subsequent beacon signal is to be transmitted, all of which are contained in the beacon signal. Therefore, the terminal must constantly receive the beacon signals.

By the way, in the case where an application operated by the terminal application is, for example, an e-mail reception software, and the terminal accesses to a mail server once every one minute to check whether or not any e-mail message has been received, it is a waste for the terminal to turn on its communication terminal every 100 msec at which the beacon signal is transmitted. Further, the wireless LAN is not necessarily limited to include a plurality of terminals, and the wireless LAN can be often realized by one base station and one terminal. In this case, the beacon signal including information of "NO" data to be transmitted to the terminal is received by the terminal every 100 msec, which is a power-wasting operation for the terminal.

What is known for solving such a problem is a technique that the base station extends a period between transmissions of beacon signals. For example, the patent publication 1 (Japanese Laid-Open Patent Application No. 1997/162798 (Tokukaihei 9-162798; published on Jun. 20, 1997)) discloses a technique that the base station changes an interval between transmissions of beacon signals in accordance with the amount of data transmitted to the terminal, and a beacon signal reception timing for the terminal entering a power-on state is changed in accordance with an interval at which the base station transmits the beacon signal. In addition, the patent publication 2 (Japanese Laid-Open Patent Application No. 2003/124940 (Tokukai 2003-124940; published on Apr. 25, 2003)) discloses a technique that the base station determines a polling interval period associated with an amount-of-data range, in accordance with data received over an external network, so that a polling interval period becomes shorter as the amount-of-data range increases.

Also, the terminal realizes such a technique that the terminal checks the beacon signal and if there is no data addressed to the terminal itself, the terminal maintains a low-power consumption mode until the next beacon signal is received, as power save mode of IEEE802.11.

However, the foregoing background art has the following problems. In the technique of the patent publication 1, in the case where the terminal is in a standby state during execution of an IP (Internet Protocol) phone application, an interval between transmissions of beacon signals becomes long since there is no data to be transmitted to the terminal. This makes it impossible to notify to the terminal that telephone incoming call data has been received, if timing is off, upon receiving the incoming telephone call data. Similarly in the technique of the patent publication 2, the base station changes the polling interval after data reception over the external network. This makes it impossible to respond to the demand for a response in real time, if timing is off.

Further, streaming, conversation with IP phone, and other operations are always carried out in a communication state. Therefore, in spite of the presence of periods during which no communications are carried out, it was impossible to suppress a consumed power by performing an intermittent data reception.

Further, patent publication 3 (Japanese Laid-Open Patent Application No. 2004/128949 (Tokukai 2004-128949; published on Apr. 22, 2004)) discloses a wireless terminal and a wireless communication system using the wireless terminal, of which object is to realize decrease of packet delay and improvement in communication quality of an application that requires power saving and a response in real time in voice communications and the like communications, by a wireless terminal varying an interval of intermittent reception for power saving depending on an operation mode of the application, and by transmitting polling data to a wireless base station and data, with respect to the polling data, transmitted from the wireless base station to the wireless terminal in such a manner that they are assigned priorities to depending on an operation mode of the application.

Incidentally, the following will describe differences between the technique in the patent publication 3 and the present invention.

In the technique of the patent publication 3, a setting change is performed only in a terminal, not in a base station. More specifically, in the technique of the patent publication 3, a beacon transmission interval of the base station is not changed. Therefore, the occurrence of delay causes degradation in voice quality since, for example, for the execution of VoIP (voice over IP) when a default beacon transmission interval in the base station is 100 msec, wherein a packetization period of G.711, a typical audio codec of a currently available VoIP, is 20 msec, if this execution is performed with an intermittent reception operation, voice data which is supposed to be transmitted at an interval of 20 msec is received at an interval of 100 msec. In other words, in the technique of the patent publication 3, an application that requires a shorter period than the default beacon transmission interval in the base station cannot be executed with intermittent reception. On the contrary, in the present invention, the base station also sets the beacon transmission period suitably in accordance with a type of application and/or communication property (communication pattern), so that an application that requires a shorter period can be executed with intermittent reception without degradation in communication quality.

In the technique of the patent publication 3, a setting change is not carried out in accordance with a status of an application. More specifically, in the technique of the patent publication 3, there is no difference in intermittent reception interval between a stand-by state and a call state under execution of the VoIP, and in the Embodiment, in the case of the VoIP, intermittent reception is operated by one TIM (Traffic Indication Map). This means consumption of an unnecessary power in the stand-by state. Note that, the TIM is an information element included in a beacon signal for the base station notifying to the terminal during power saving that data addressed to the terminal is stored in a buffer of the base station. On the contrary, in the present invention, the terminal suitably sets a beacon reception period in accordance with the status of an application, so that the beacon reception period is changed between the stand-by state and the call state of the VoIP, and power consumption can be further reduced in the stand-by state.

In the technique of the patent publication 3, a setting range of the intermittent reception interval is determined by DTIM (Delivery Traffic Indication Map). More specifically, in the technique of the patent publication 3, a setting range of the intermittent reception interval is a beacon interval including the TIM at the shortest, and a beacon interval including the DTIM at the longest. A setting of the beacon interval including the DTIM is carried out in the base station. For example, when the base station sets the beacon transmission interval to 100 msec, which is equal to the default beacon transmission interval containing the beacon interval including the DTIM, the terminal cannot change its intermittent reception interval from 100 msec to other value. Note that, the DTIM is TIM included in a beacon signal transmitted at a timing when a TSF (Timing Synchronization Function) timer for synchronization between the base station and the terminal becomes 0. Broadcast data and multicast buffered in the base station are transmitted immediately after the beacon signal including the DTIM. On the contrary, in the present invention, the intermittent reception interval can be set regardless of DTIM, so that power consumption can be further reduced.

SUMMARY OF THE INVENTION

An object of the present invention is to provide a communication system in which the terminal can suitably set a period at which a beacon signal is received, in accordance with the communication pattern and communication status of an application, a base station, a terminal, a communication device, a communication management method, a control program, and a computer-readable recording medium containing the same.

In order to achieve the above object, a communication system according to the present invention is a communication system where a period between transmissions of periodic signals transmitted from a base station is notified to a terminal, the communication system may be arranged such that the terminal comprises a terminal-side wireless communication section which transmits to the base station a request for setting of a period between transmissions of periodic signal; and the base station comprises a communication control section which changes the period between transmissions of periodic signals in accordance with the request having been received from the terminal.

With this arrangement, the terminal can control a period of periodic signals transmitted from the base station. As a result, the terminal can optimize a period between receptions of the periodic signals in accordance with its own status. Therefore, power supply to the communication circuit can be kept OFF until the timing for receiving a periodic signal in the terminal. This makes it possible to reduce power consumption of the terminal. More specifically, the period between transmissions of periodic signals is dynamically changed and is set to a best-suited value, in accordance with a type of device used as a terminal and an application executed by the terminal, so that a response in real time and reduction in power consumption are possible for the terminal.

Note that, in a communication system of the present invention, the terminal can suitably set a period between receptions of beacon signals in accordance with communication property (communication pattern, communication status, and others) and/or a type of application, so that the communication system of the present invention can be adopted suitably to a wireless communication system, such as a wireless LAN, of a portable telephone, a portable information terminal, a notebook computer, and a portable television. Further, a communication system, a base station, a terminal, a communication device, a communication management method of the present invention is applicable to wireless communications and/or wired communications.

For a fuller understanding of the nature and advantages of the invention, reference should be made to the ensuing detailed description taken in conjunction with the accompanying drawings.

BRIEF DESCRIPTION OF THE DRAWINGS

FIG. 22 is an explanatory diagram illustrating one example of a management table that associates the type of an application with a beacon transmission period, which is stored in a communication control section of a base station in the wireless communication system illustrated in FIGS. 1 and 2.

FIG. 23 is an explanatory diagram illustrating one example of a management table that associates the type of an application and the communication pattern with a beacon transmission period, which is stored in a communication control section of a base station in the wireless communication system illustrated in FIGS. 1 and 2.

FIG. 24 is an explanatory diagram illustrating one example of a management table that associates the type and state of an application with a beacon transmission period, which is stored in a communication control section of a base station in the wireless communication system illustrated in FIGS. 1 and 2.

FIG. 25 is an explanatory diagram illustrating one example of a management table that associates the type of an application and the type of a device used as a terminal with the beacon transmission period, which is stored in a communication control section of a base station in the wireless communication system illustrated in FIGS. 1 and 2.

FIG. 34 is a diagram illustrating one example of a sequence in the case where the wireless communication system illustrated in FIGS. 1 and 2 includes a plurality of terminals.

DESCRIPTION OF THE EMBODIMENTS

With reference to FIGS. 1 to 34, the following describes one embodiment of the present invention. The following embodiments discuss arrangements for wireless communication. However, in the present invention, a network may include a communication device, a communication system, a base station, and a terminal that are connected by wire so as to communicate with one another.

Embodiment 1

Figure 3:
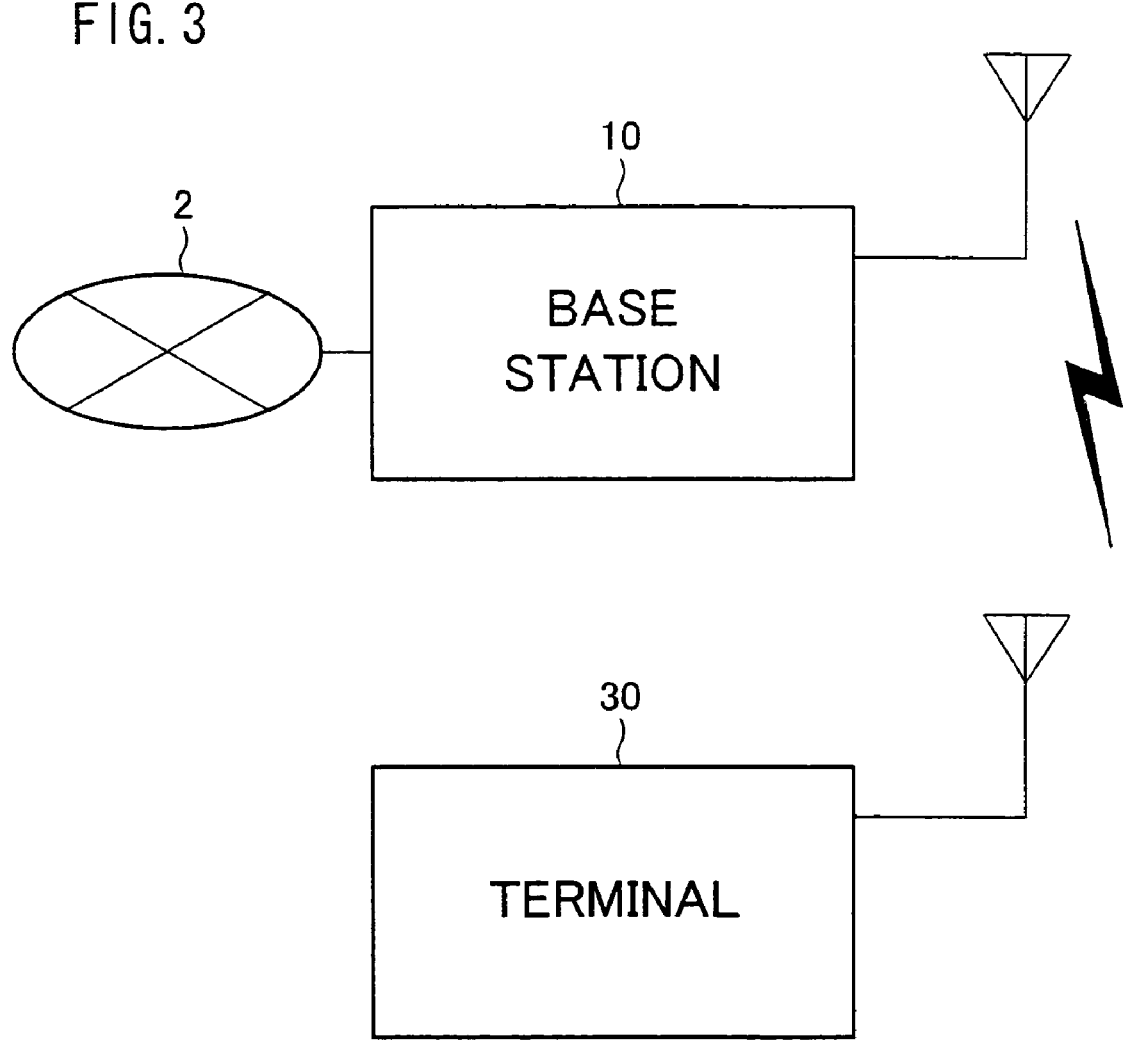
FIG. 3 is a schematic diagram of the wireless communication system illustrated in FIGS. 1 and 2.
Figure 4:
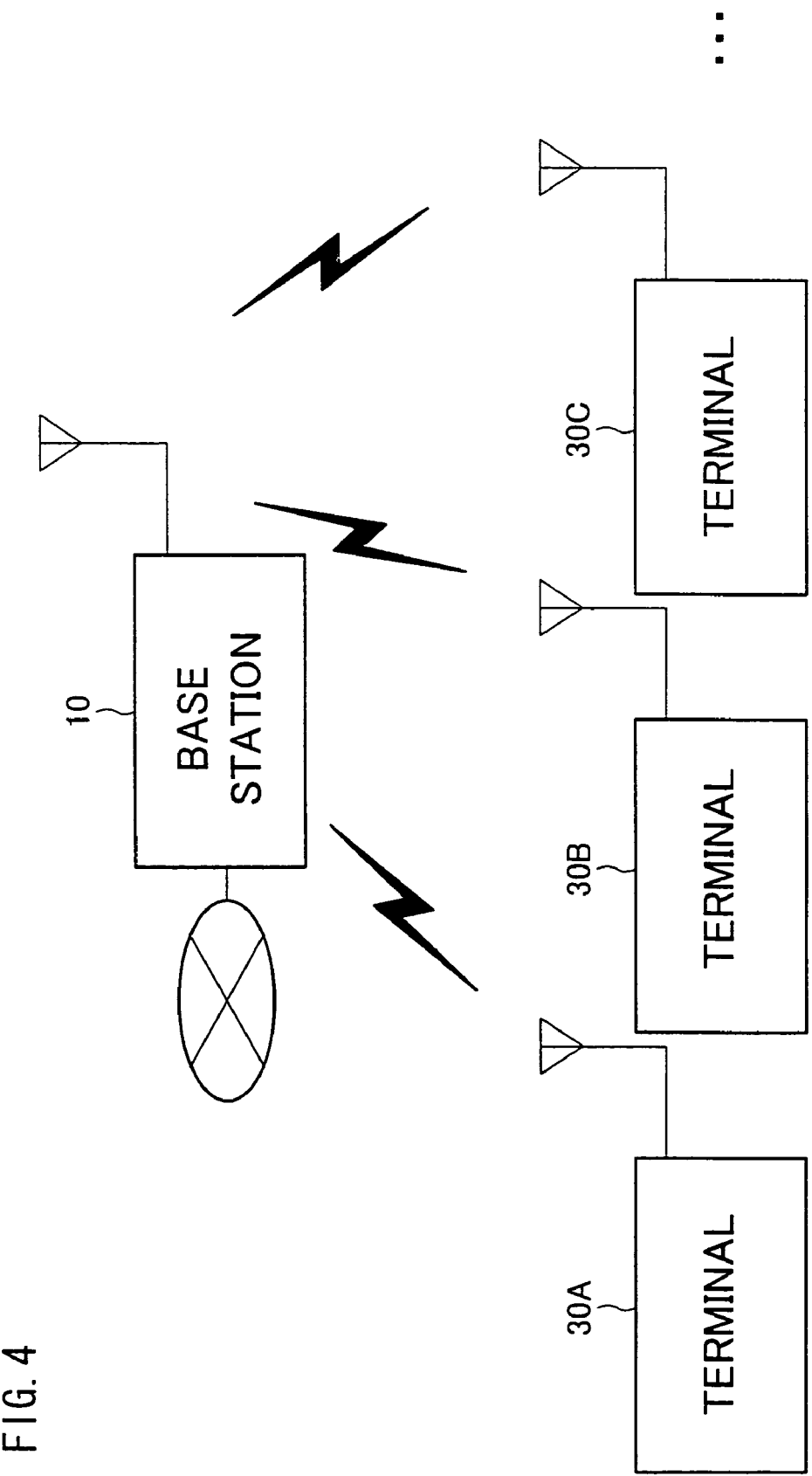
FIG. 4 is a schematic diagram of the wireless communication system illustrated in FIGS. 1 and 2.

FIGS. 3 and 4 are block diagrams illustrating a schematic arrangement of a wireless communication system 1 of the present embodiment. As shown in FIGS. 3 and 4, the communication system 1 is a system in which a base station 10 performs wireless communications with one or more terminal 30 (30A, 30B, 30C . . . ). The base station 10 relays communications between an external network 2 and the terminal 30. Thus, the wireless communication system 1 includes the base station 10 and the terminal 30. The base station 10 periodically transmits a beacon signal (periodic signal). In accordance with the beacon signal, the terminal 30 is identified from the base station 10. Then, to the identified terminal 30, the presence or absence of data to be transmitted and the period until a transmission of a next beacon signal are notified by using a beacon signal.

Figure 1:
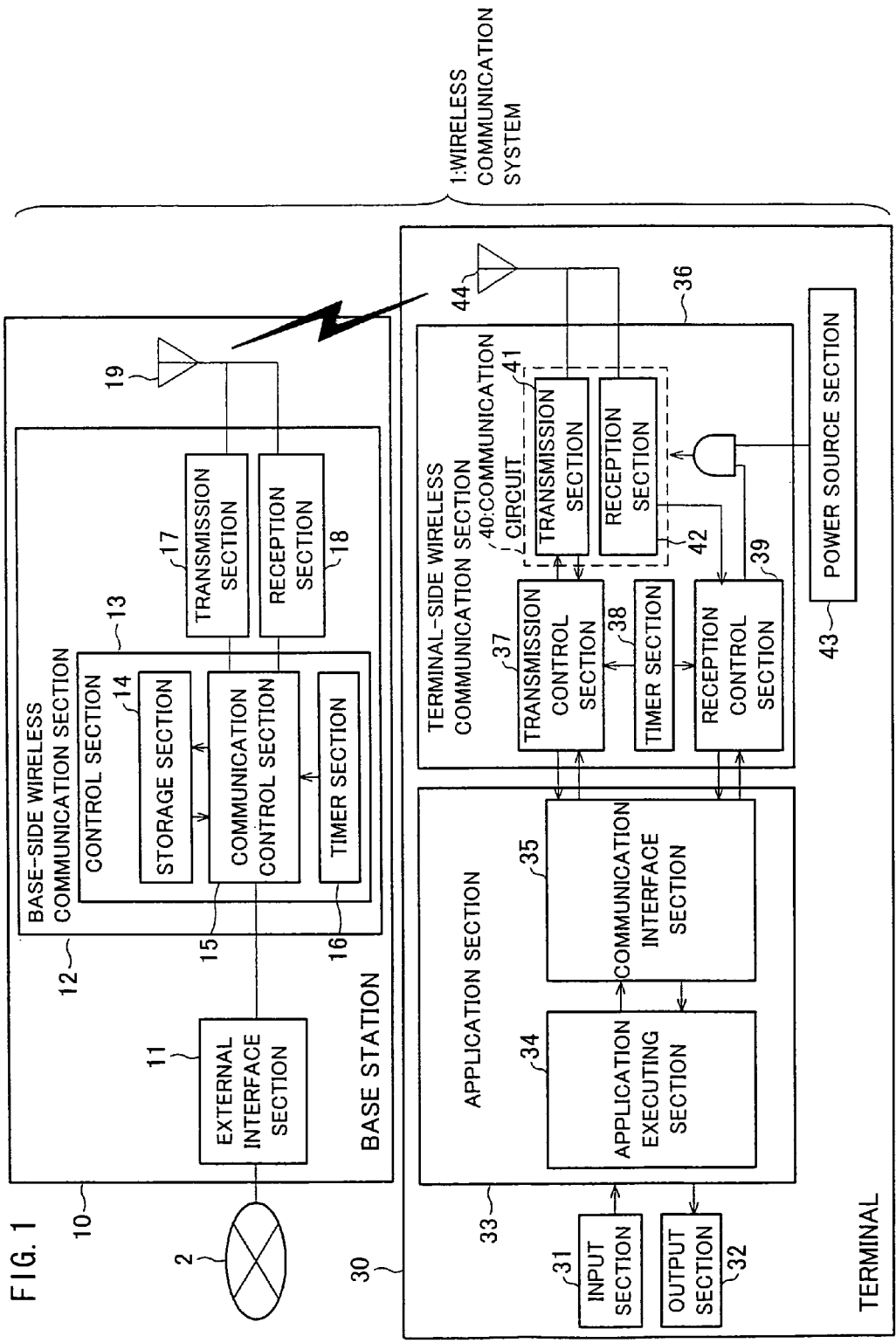
FIG. 1 is a functional block diagram illustrating a specific configuration of a wireless communication system according to an embodiment of the present invention.
Figure 2:
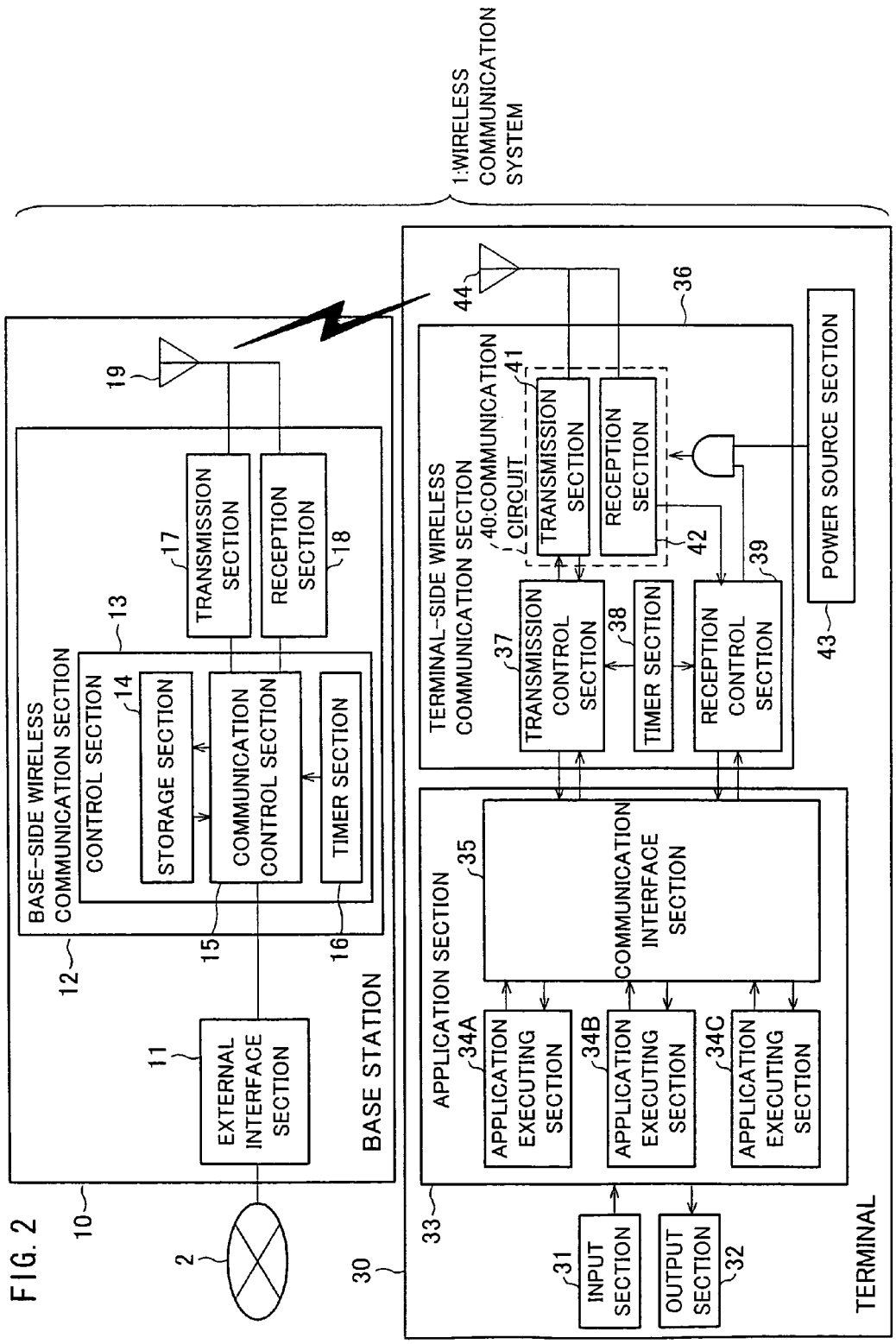
FIG. 2 is a functional block diagram illustrating a specific configuration of a wireless communication system according to an embodiment of the present invention.

FIGS. 1 and 2 are functional block diagrams illustrating a detailed arrangement of the wireless communication system 1. FIG. 1 shows a case in which one application is executed by the terminal 30. FIG. 2 shows a case in which a plurality of applications are executed by the terminal 30.

The base station 10 at least includes an external interface section 11, a base-side wireless communication section 12, and an antenna 19. The external interface section 11 is connected to the external network 2 via a dedicated line or a telephone line by using a wired LAN or a modem. In this way, the external interface section 11 performs data transmission with a server on a network (e.g. the Internet). The antenna 19 transmits and receives wireless signals to and from the terminal 30.

The base-side wireless communication section 12 includes a control section 13, a transmission section 17, and a reception section 18. The transmission section 17 transmits a signal to the terminal 30 via the antenna 19, under the control of a communication control section 15. The reception section 18 receives a signal from the terminal 30 via the antenna 19, under the control of the communication control section 15.

The control section 13 includes a storage section (buffer) 14, the communication control section (transmission period setting means) 15, and a timer section 16. The storage section 14 temporarily buffers data received over the external network 2. The timer section 16 determines a timing for transmitting a beacon signal to the terminal 30.

The communication control section 15 performs control for wireless communication. In particular, in accordance with a beacon period change request from the terminal 30, the communication control section 15 changes a period between transmissions of beacon signals. In other words, in accordance with a setting request received from the terminal 30, the communication control section 15 sets a period between transmissions of beacon signals (transmission period). If there are a plurality of terminals 30 (see FIG. 4), the communication control section 15 determines that the shortest period among the periods required by the terminals 30 is the period between transmissions of beacon signals. If a request on the amount of space available in the buffer is received from the terminal 30, the communication control section 15 obtains the amount of space available in the buffer (the storage section 14), and transmits it to the terminal 30. The amount of space available in the buffer may be incorporated into a beacon signal, or may be transmitted separately in a signal for notification.

The terminal 30 at least includes an input section 31, an output section 32, an application section 33, a terminal-side wireless communication section (transmission period setting requesting means) 36, a power source section 43, and an antenna 44.

The input section 31 and the output section 32 are user interfaces used by a user of the terminal 30 so as to operate the terminal 30. More specifically, the input section 31 is an input device such as a button, a key, a mouse, or a tablet. The output section 32 is an output device such as a display or a speaker. By using the input section 31 and the output section 32, the user of the terminal 30 can use applications that works in the application section 33.

The antenna 44 transmits and receives a wireless signal to and from the base station 10.

The power source section 43 is a power source for supplying power to a communication circuit 40 of the terminal-side wireless communication section 36.

The application section 33 includes an application executing section (application executing means) 34 and a communication interface section (communication interface means) 35.

The application executing section 34 executes an application involving communications with an external entity via the base station 10. More specifically, the application executing section executes an e-mail application, a streaming application, an IP phone application, or the like. The application executed by the application executing section 34 may be chosen appropriately in accordance with an intended use of the terminal 30.

After the user has operated the input section 31 and caused the application executing section 34 to execute an application, the communication interface section 35 makes control instructions to the terminal-side wireless communication section 36 in accordance with a condition of the application executed. In other words, to the terminal-side wireless communication section 36, the communication interface section 35 notifies such a period between transmissions of beacon signals that corresponds to a type of the application executed by the application executing section 34 and/or a communication property.

In the present specification, the "communication property" is determined by, for example, (a) a communication pattern of the application, (b) a state of the application, (c) a type of a device used as the terminal, or (d) a combination of (a) to (c). The "communication property" and the "type of the application" are used as information for determining the beacon period (beacon period determining information (transmission period determining information)).

For example, if the type of the application is the e-mail application, the communication property is determined by an interval, which is set by the user, of automatic mail reception check. If the type of the application is the streaming application, the communication property is determined by a data rate for streaming and an amount of space available in the buffer of the base station 10. If the type of the application is the IP phone application, the communication property is determined by an interval of reception check performed in a stand-by state, and by an interval of packet-transmission performed in a call state.

For example, the communication interface section 35 obtains the state of the application executed by the application executing section 34, and, in accordance with the state of the application, determines the period between transmissions of beacon signals. The communication interface section 35 determines the period between transmissions of beacon signals also in accordance with the amount of space available in the buffer of the base station 10. If a plurality of applications are executed by a single terminal 30, the communication interface section 35 determines that the shortest period among the periods required by the applications is the period between transmissions of beacon signals.

Therefore, the communication interface section 35 may have a table (not shown) in which the interval of automatic mail reception check, the data rate for reproduction, and the like conditions are associated with each application. Recording to the table can be performed in installing an application in the terminal or in terminating execution of the application.

As shown in FIG. 2, it is possible to execute a plurality of applications (application executing sections 34A, 34B, 34C, . . . ) in the application section 33. The communication interface section 35 may be provided with respect to each application executing section 34, or, as in FIG. 2, the plurality of application executing sections 34 may share a single communication interface section 35.

The terminal-side wireless communication section 36 includes a transmission control section 37, a timer section 38, a reception control section 39, a transmission section 41, and a reception section 42. In particular, the terminal-side wireless communication section 36 transmits, to the base station 10, a request for adopting the beacon period notified from the communication interface section 35.

The transmission control section 37 controls the transmission section 41 in accordance with an instruction from the communication interface section 35, so as to transmit a signal to the base station 10 via the antenna 44.

The reception control section 39 controls the reception section 42 in accordance an instruction from the communication interface section 35, so as to receive a signal from the base station 10 via the antenna 44.

The timer section 38 determines timing for receiving the beacon signal sent from the base station 10.

The communication circuit 40 includes the transmission section 41 and the reception section 42. The reception control section 39 controls the power supply from the power source section 43 to the communication circuit 40. Specifically, the reception control section 39 turns ON the power supply from the power source section 43 to the communication circuit 40 only in receiving a beacon signal, and keeps the power supply OFF in the other periods.

Taking examples (1) to (3), the following describes how the beacon period is controlled in the wireless communication system 1 of the present embodiment.

(1) If one terminal 30 uses one base station 10, and the terminal 30 executes one application, the beacon period is set to such a period that is best suited for the application executed by the terminal 30. Also, the beacon period is set to a best suited period in accordance with a communication pattern and/or a state of the application executed.

Figure 5:
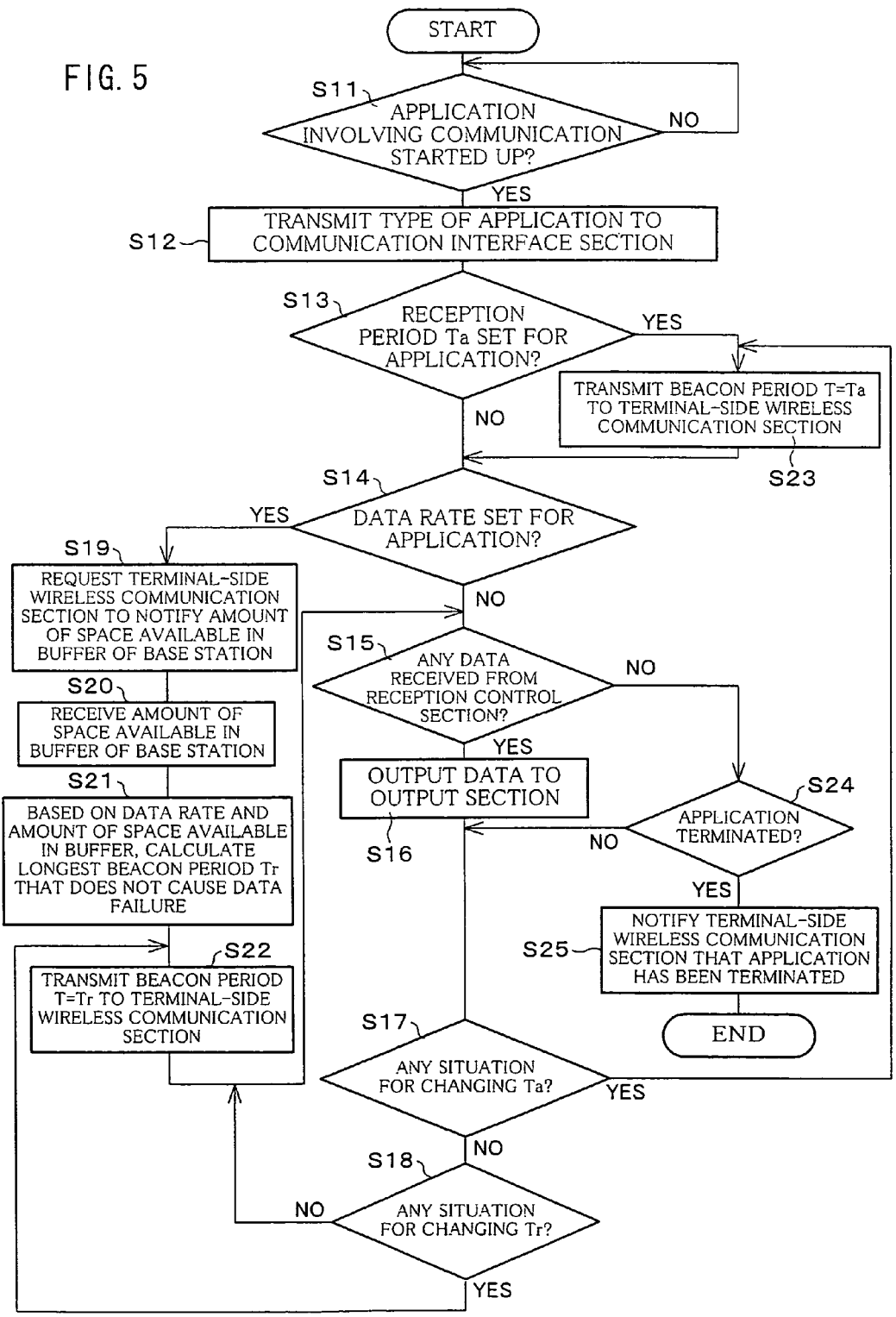
FIG. 5 is a flowchart illustrating operation of an application section of a terminal in the wireless communication system illustrated in FIG. 1.
Figure 6:
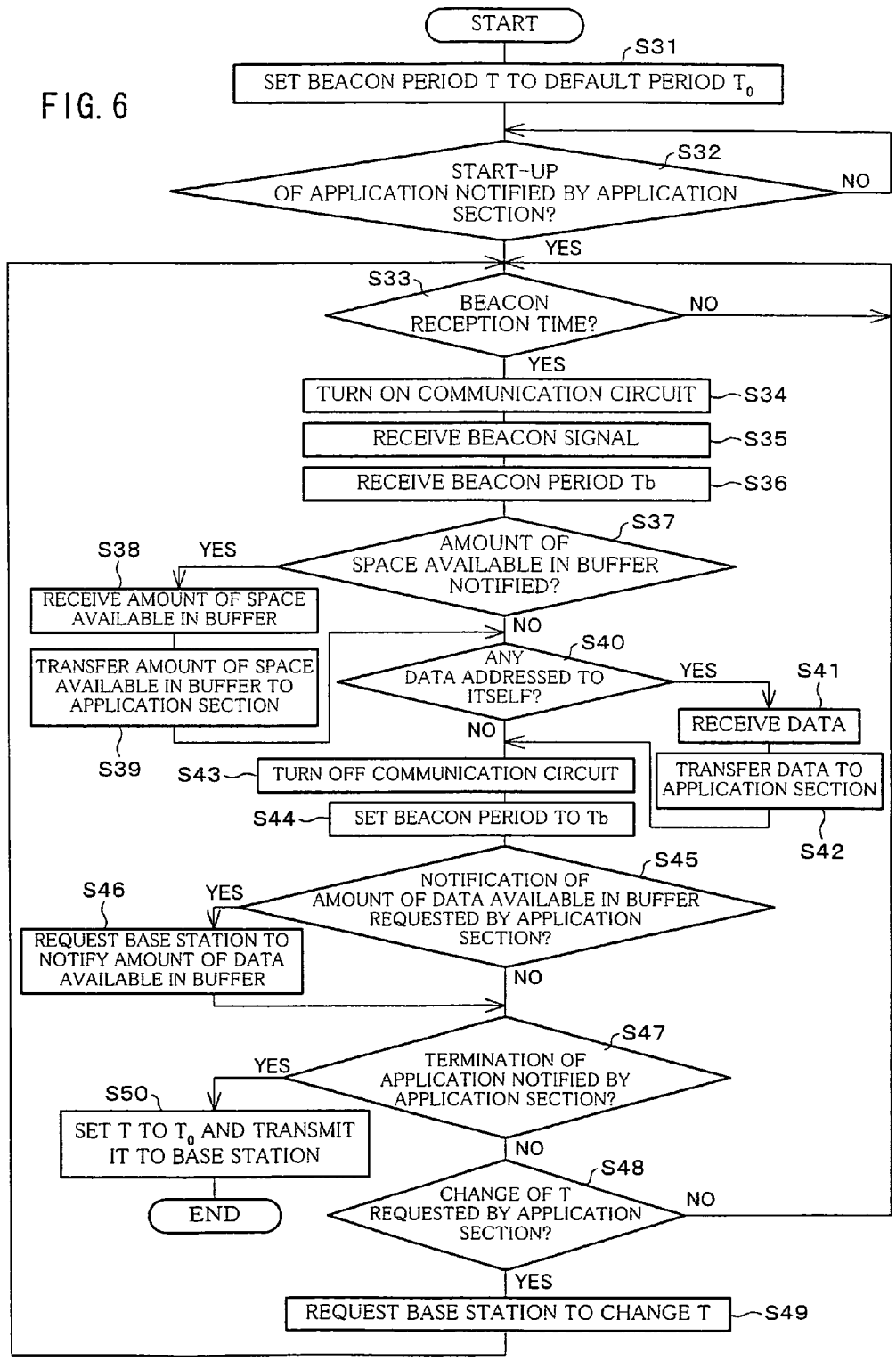
FIG. 6 is a flowchart illustrating operation of a terminal-side wireless communication section of a terminal in the wireless communication system illustrated in FIG. 1.
Figure 7:
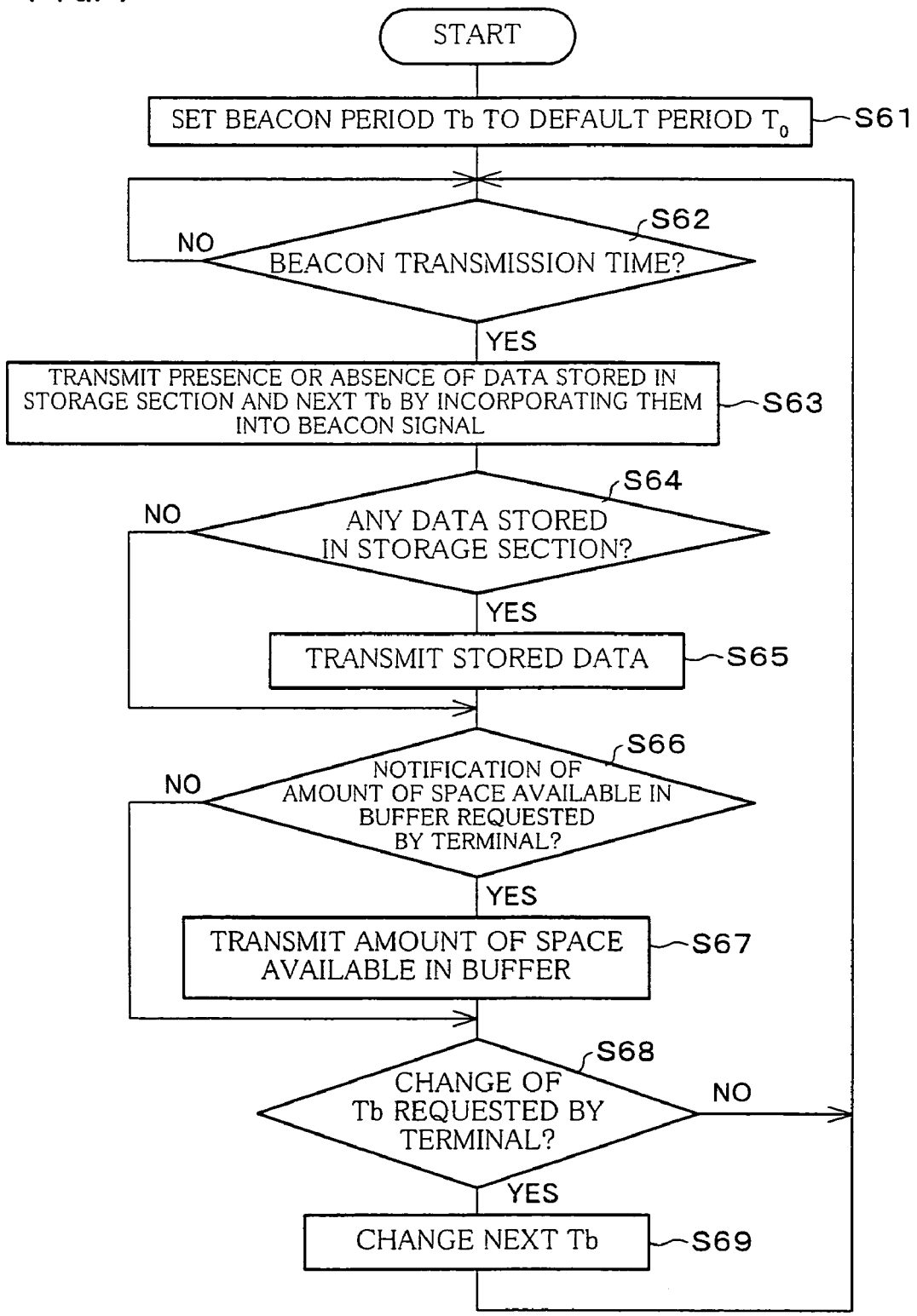
FIG. 7 is a flowchart illustrating operation of a base station in the wireless communication system illustrated in FIG. 1.

FIG. 5 is a flowchart illustrating operation of the application section 33 in a case where one application is executed. FIG. 6 is a flowchart illustrating operation of the terminal-side wireless communication section 36 in a case where one application is executed. FIG. 7 is a flowchart illustrating operation of the base station 10 in a case where one application is executed. In each of FIGS. 5, 6, and 7, executions of the e-mail application, the streaming application, and the IP phone application are illustrated in one figure.

[E-mail Application]

Described first is control in a case where the application executing section 34 executes an e-mail application. Initially, the beacon period is set to a default value (T0=100 msec).

Figure 8:
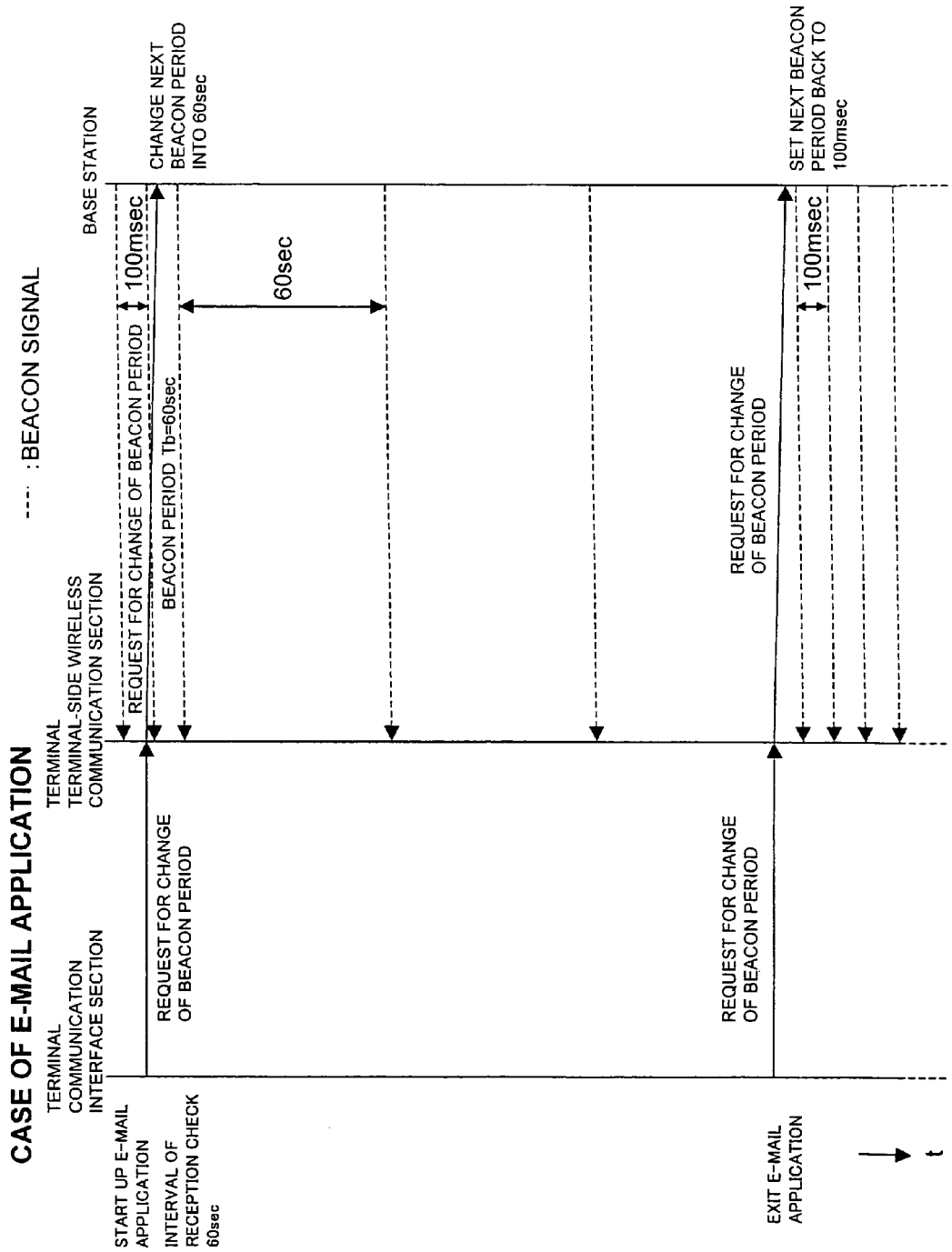
FIG. 8 is a sequence diagram illustrating operation of the wireless communication system illustrated in FIG. 1, wherein an application is a e-mail application.
Figure 9:
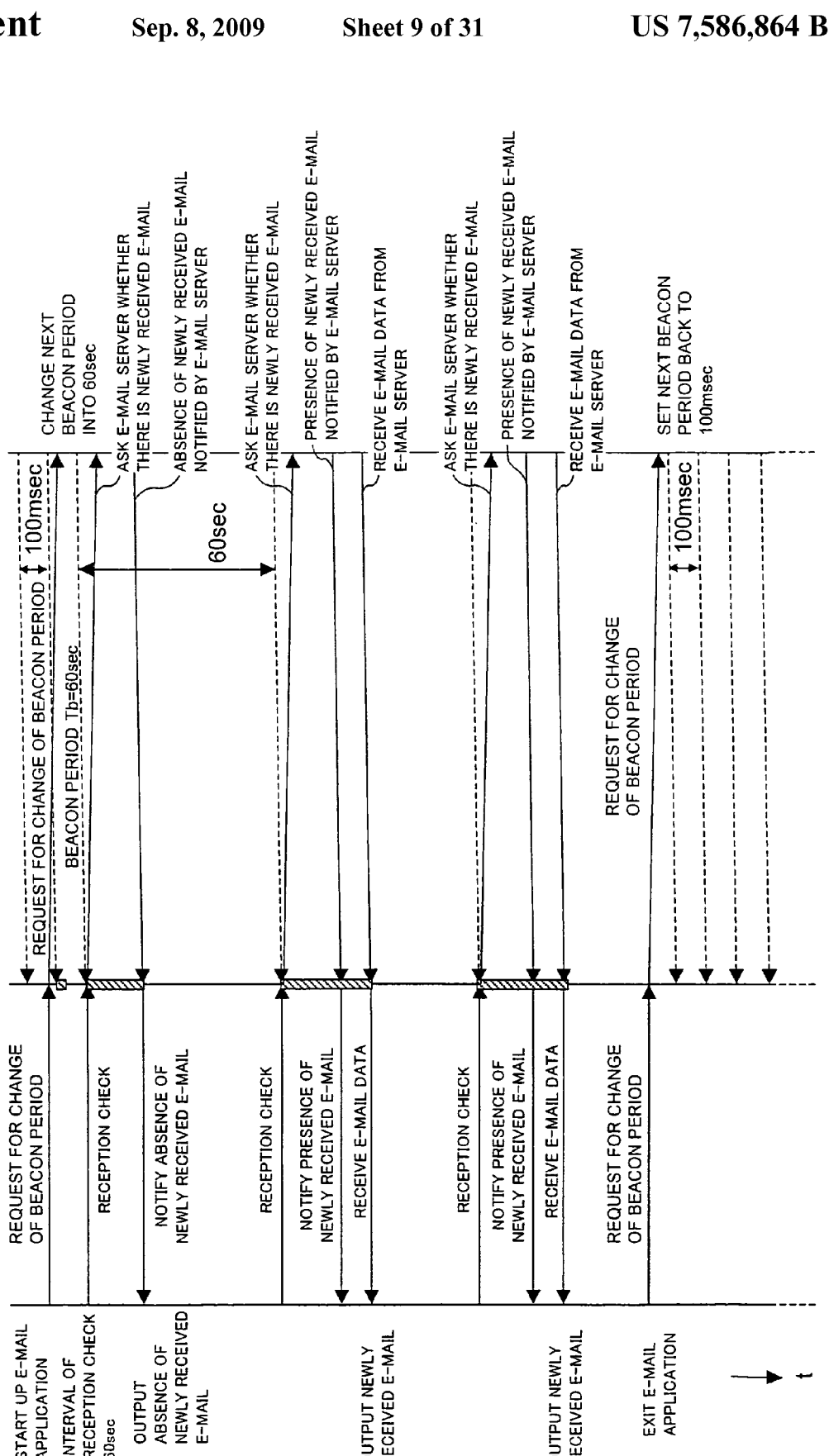
FIG. 9 is a sequence diagram illustrating operation of the wireless communication system illustrated in FIG. 1, wherein an application is a e-mail application.

FIG. 8 is a sequence diagram illustrating operation of changing the beacon period in the case where the type of the application is the e-mail application. FIG. 9 is a sequence diagram made by adding operation of receiving e-mail data to FIG. 8.

If the type of the application is the e-mail application, the terminal 30 requests the base station 10 to change the beacon period to such a period that corresponds to the interval, which is set for the application, of automatic mail reception check. This allows the terminal 30 to perform intermittent reception, at a minimum period required to check whether or not any e-mail massage has been received. Therefore, the terminal 30 can optimize its period between receptions of beacon signals (reception period), so that the power supply from the power source section 43 to the communication circuit 40 can be kept OFF until the timing for receiving a beacon signal. As a result, power consumption is reduced.

More specifically, first, the application executing section 34 starts up the e-mail application (S11). Then, the communication interface section 35 notifies the terminal-side wireless communication section 36 that the e-mail application has been started up, and requests the terminal-side wireless communication section 36 to set the beacon period of the base station 10 to the interval (e.g. 60 sec), which is set for the e-mail application, of automatic mail reception check (S13, S23).

The beacon period may be set in advance in the communication interface section 35 with respect to each application, or may be notified from the application executing section 34 to the communication interface section 35 each time a necessity to set a beacon period arises.

When the terminal-side wireless communication section 36 receives the e-mail application start-up notification along with the designation of the beacon period from the application section 33 (S32), the terminal-side wireless communication section 36 transmits, to the base station 10, a beacon period change request in the form of a beacon signal including the requested beacon period.

When the base station 10 receives the beacon period change request from the terminal 30 (S68), the communication control section 15 changes the beacon period to the designated beacon period (S69). At a pre-change beacon transmission time, the base station 10 transmits the next beacon period to the terminal 30, by incorporating the beacon period into a beacon signal addressed to the terminal 30.

On the other hand, at a (pre-change) beacon reception time, the terminal 30 turns ON the communication circuit 40, and receives the beacon signal from the base station 10 (S33 to S35). The terminal 30 then turns OFF the communication circuit 40 (S43). At this time, the reception control section 39 confirms that the beacon period included in the beacon signal is the requested beacon period, and sets the beacon period as the period between receptions of beacon signals (S44). Therefore, the beacon reception period is 60 sec from the next time. If the beacon signal includes information indicating that there is data addressed to the terminal 30 itself, the reception control section 39 receives the data and transfers it to the application section 33 (S40 to S42).

Thereafter, when the application section 33 receives data from the terminal-side wireless communication section 36 (S15), the application executing section 34 causes the output section 32 to output data (S16). When the user exits the e-mail application (S24), the communication interface section 35 transmits a notification of exit from the application to the terminal-side wireless communication section 36, so that the terminal-side wireless communication section 36 requests the base terminal 10 to restore the initial beacon period (the beacon period before the start-up of the e-mail application) (S25, S47, and S50).

In the case of the e-mail application, a situation for changing the beacon period occurs if the user changes the time interval of automatic mail reception check.

FIG. 9 additionally illustrates at which timing a signal for data communication is sent in the sequence in which the beacon period is changed. As shown in FIG. 9, if there is e-mail data in the base station 10 (in a case of "PRESENCE OF NEWLY RECEIVED E-MAIL NOTIFIED BY E-MAIL SERVER"), the e-mail data is sent in the form of a data communication signal that follows the beacon signal. Thus, whether or not there is e-mail data to be sent from the base station 10 to the terminal 30 can be notified by using the beacon signal.

In a power ON period (shaded area) shown in FIG. 9, at the pre-change beacon reception time, the terminal 30 turns ON the communication circuit 40 and receives the beacon signal from the base station 10. Then, the terminal 30 inquires the e-mail server whether there is any newly received e-mail, and, if any, receives the e-mail data. After that, the terminal 30 then turns OFF the communication circuit 40. At each post-change beacon reception time thereafter, the terminal 30 turns ON the communication circuit 40, receives the beacon signal from the base station 10, inquires the e-mail server whether there is any newly received e-mail, and, if any, receives the e-mail data, and turns OFF the communication circuit 40. When the terminal 30 has thus finished receiving signals sent from the base station 10, the terminal 30 keeps the power supply to the communication circuit 40 OFF until the timing for receiving a next beacon signal. Thus, the terminal 30 keeps the communication circuit 40 OFF while no signal is received.

[Streaming Application]

Described second is control in a case where the application executing section 34 executes a streaming application. Initially, the beacon period is set to a default value (T0=100 msec).

Figure 10:
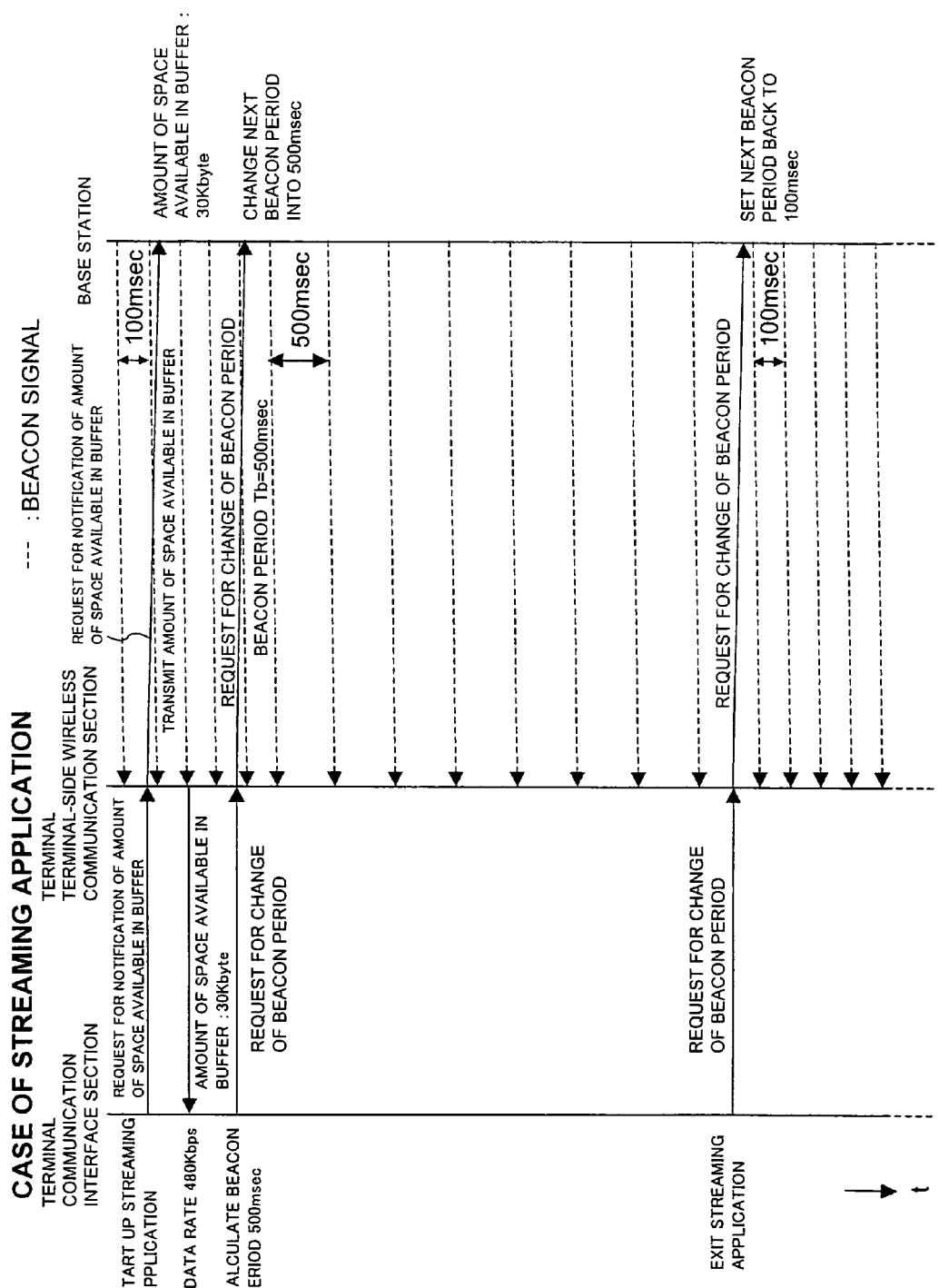
FIG. 10 is a sequence diagram illustrating operation of the wireless communication system illustrated in FIG. 1, wherein an application is a streaming application.
Figure 11:
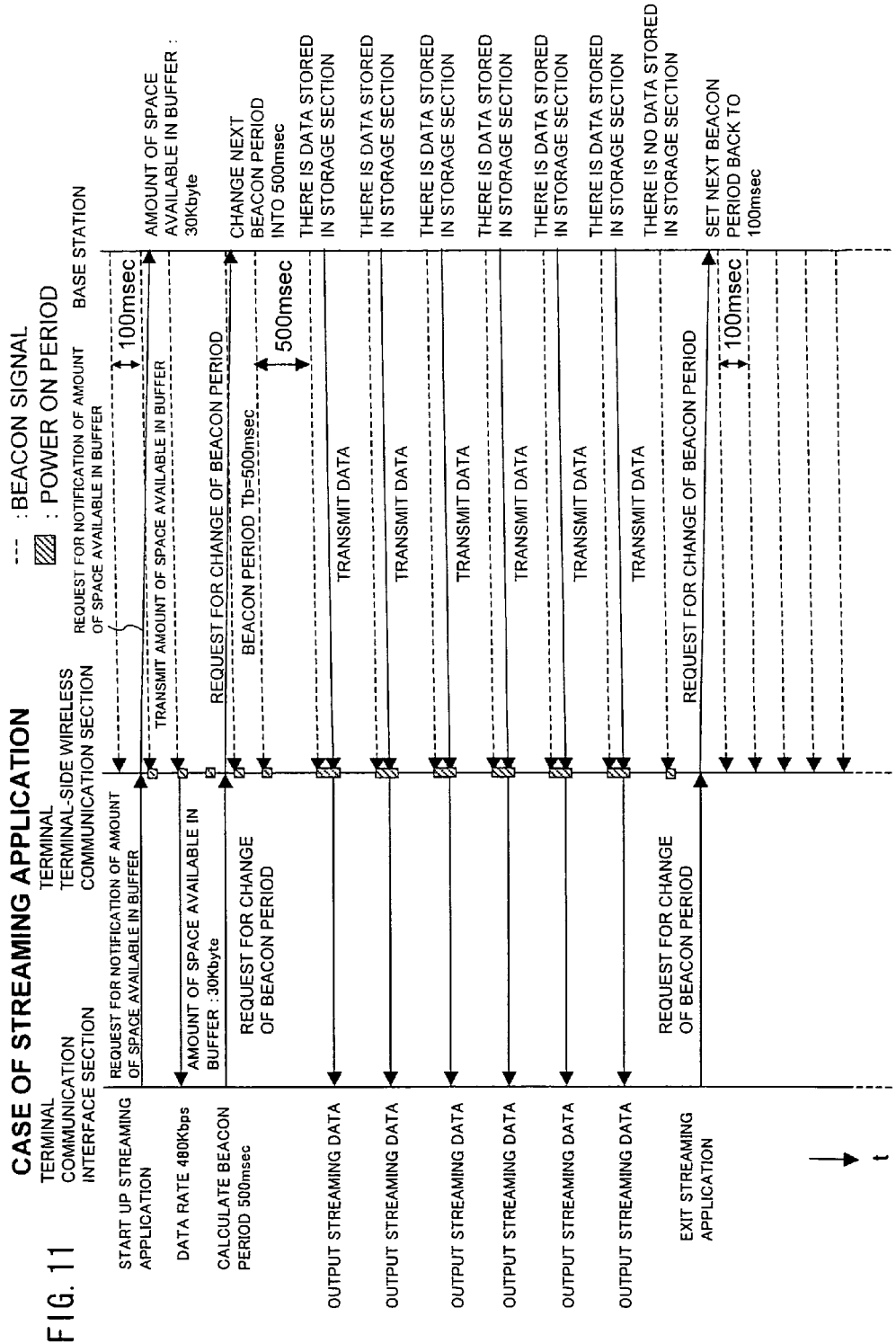
FIG. 11 is a sequence diagram illustrating operation of the wireless communication system illustrated in FIG. 1, wherein an application is a streaming application.

FIG. 10 is a sequence diagram illustrating operation of changing the beacon period in the case where the streaming application is executed. FIG. 11 is a sequence diagram made by adding operation of receiving streaming data to FIG. 10.

If the type of the application is the streaming application, the terminal 30 checks the buffer (storage section 14) size of the base station 10. Then, on the basis of the data rate of streaming and the amount of space available in the buffer, the terminal 30 calculates the longest beacon period that does not cause failure of data reproduction. Thereafter, the terminal 30 requests the base station 10 to change the beacon period to the beacon period thus obtained. This allows the terminal 30 to perform intermittent reception at a period that does not cause data failure. Therefore, the terminal 30 can optimize its period between receptions of beacon signals, so that the power supply from the power source section 43 to the communication circuit 40 can be kept OFF until the timing for receiving a beacon signal. As a result, power consumption during streaming is reduced.

More specifically, first, the application executing section 34 executes the streaming application (S11). Then, the communication interface section 35 obtains a reproduction data rate (e.g. 480 Kbps) that is set for the streaming application (S14). After that, the communication interface section 35 notifies the terminal-side wireless communication section 36 that the streaming application has been started up, and requests the base station 10 to notify the amount of space available in the buffer (S19).

The reproduction data rate may be set in advance in the communication interface section 35 with respect to each application, or may be notified from the application executing section 34 to the communication interface section 35 each time a necessity to set a reproduction data rate arises.

When the terminal-side wireless communication section 36 receives the streaming application start-up notification along with the request for notification of the amount of space available in the buffer of the base station 10 (S32), the terminal-side wireless communication section 36 transmits a beacon signal including the request for notification of the amount of space available in the buffer to the base station 10.

When the base station 10 receives the request for notification of the amount of space available in the buffer from the terminal 30 (S66), the communication control section 15 obtains the amount of space available in the buffer (e.g. 30 KByte) of the storage section 14, and transmits it to the terminal 30 by incorporating it into a beacon signal (S67).

Next, when the terminal 30 receives the amount of space available in the buffer from the base station 10 (S37 to S39, S20), the communication interface section 35 calculates the longest beacon period that does not cause failure of data reproduction (S21). The calculation is made based on the data rate (e.g. 480 Kbps) of the streaming and on the amount of space available in the buffer (e.g. 30 KByte). Since 30 KByte=240 Kbit, the longest beacon period in this example is 240/480=500msec. Then, the communication interface section 35 requests the terminal-side wireless communication section 36 to set the beacon period of the base station 10 to the beacon period thus obtained (e.g. Tr=500 msec) (S22).

The process after that is the same as the process of changing the beacon period in the case of the e-mail application. Therefore, further explanation is omitted.

In the case of the streaming application, a situation for changing the beacon period Tr occurs if the user chooses another streaming data.

In this example, the best suited beacon period is calculated by receiving the amount of space available in the buffer of the base station 10 at the terminal 30. However, the base station 10 may calculate the beacon period. In this case, the terminal 30 notifies the data rate of the streaming to the base station 10.

FIG. 11 additionally illustrates at which timing a signal for data communication is sent in the sequence in which the beacon period is changed. As shown in FIG. 11, if there is streaming data in the base station 10 (in a case of "there is stored data in storage section"), the streaming data is sent in the form of a data communication signal that follows the beacon signal. Thus, whether or not there is streaming data to be sent from the base station 10 to the terminal 30 can be notified by using the beacon signal.

In a power ON period (shaded area) shown in FIG. 11, at the pre-change beacon reception period, the terminal 30 transmits the request for notification of the amount of space available in the buffer, receives the amount of space available in the buffer, and transmits the beacon period change request, while turning ON/OFF the communication circuit 40. After the beacon period has been changed, at each post-change beacon reception time, the terminal 30 turns ON the communication circuit 40, receives the beacon signal and streaming data from the base station 10, and turns OFF the communication circuit 40. When the terminal 30 has thus finished receiving signals sent from the base station 10, the terminal 30 keeps the power supply to the communication circuit 40 OFF until the timing for receiving a next beacon signal. Thus, the terminal 30 keeps the communication circuit 40 OFF while no signal is received.

[IP Phone Application]

Described third is control in a case where the application executing section 34 executes an IP phone application. Initially, the beacon period is set to a default value (T0=100 msec).

Figure 12:
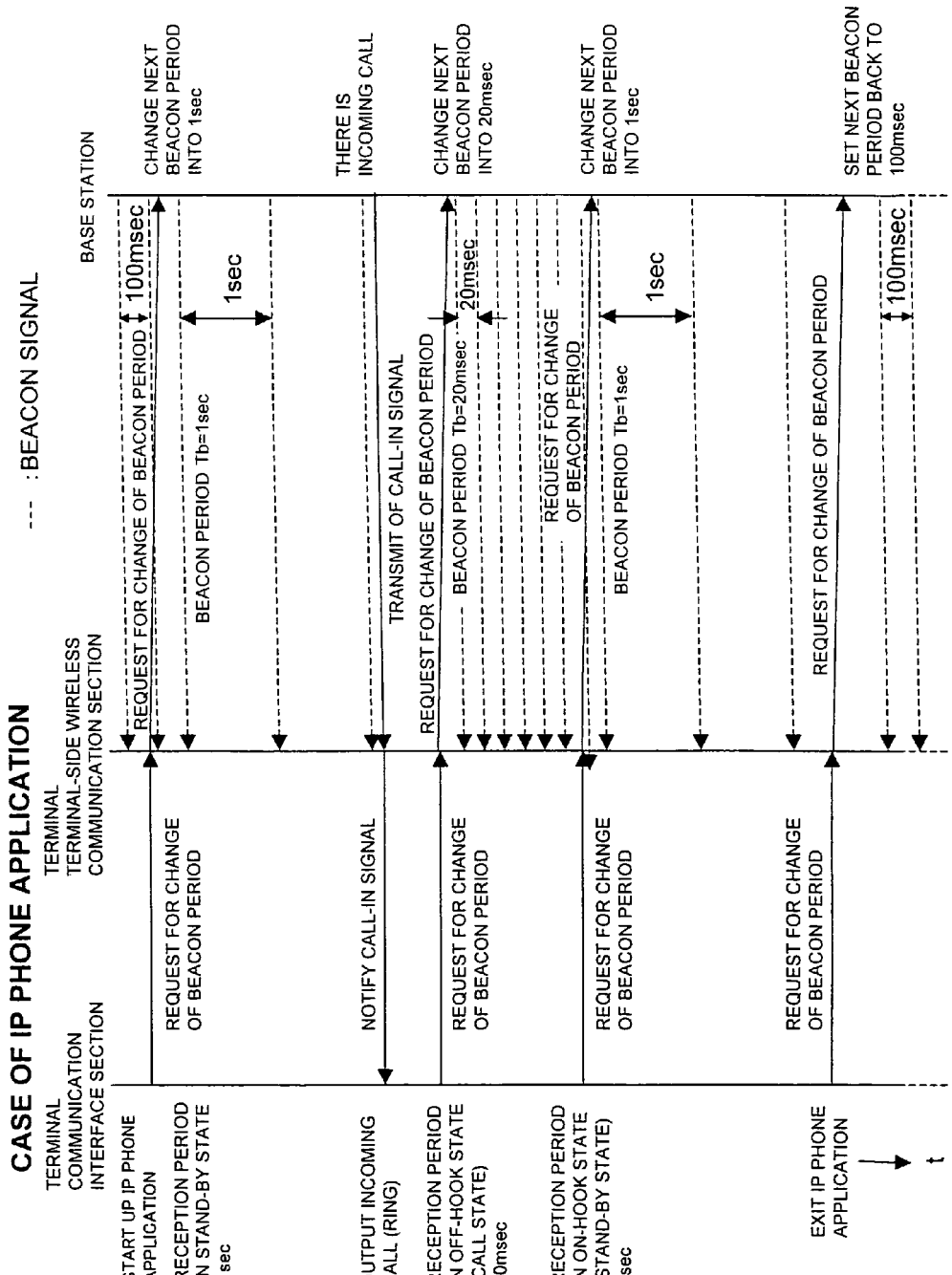
FIG. 12 is a sequence diagram illustrating operation of the wireless communication system illustrated in FIG. 1, wherein an application is an IP phone application.
Figure 13:
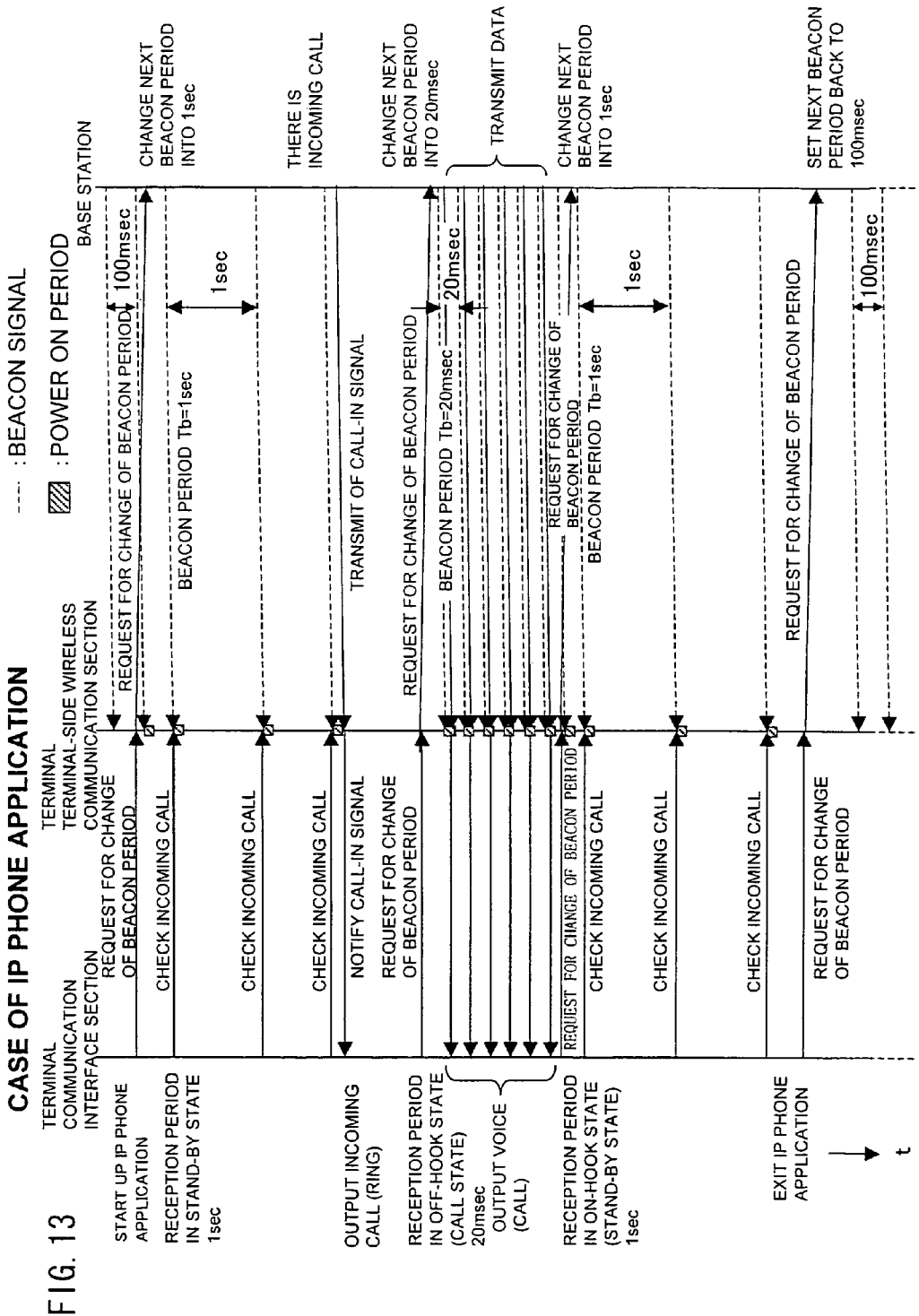
FIG. 13 is a sequence diagram illustrating operation of the wireless communication system illustrated in FIG. 1, wherein an application is an IP phone application.

FIG. 12 is a sequence diagram illustrating operation of changing the beacon period in the case of the IP phone application. FIG. 13 is a sequence diagram made by adding incoming call operation to FIG. 12.

In the case of the IP phone application, the terminal 30 sets the beacon period to, for example, 1 sec in the stand-by state, and to a value (e.g. 20 msec) corresponding to the interval of packet-transmission (with this value, delay will not have much influence) in the call state. This allows the terminal 30 to perform intermittent reception in accordance with the interval of packet-transmission. Therefore, the terminal 30 can optimize its period between receptions of beacon signals, so that the power supply from the power source section 43 to the communication circuit 40 can be kept OFF until the timing for receiving a beacon signal. As a result, power consumption in the call state is reduced.

More specifically, first, the application executing section 34 starts up the IP phone application (S11). Then, the communication interface section 35 notifies the terminal-side wireless communication section 36 that the IP phone application has been started up, and requests the terminal-side wireless communication section 36 to set the beacon period of the base station 10 to the interval (e.g. Ta=1 sec), which is set for the IP phone application, of reception check in the stand-by state (S13, S23).

The beacon period in the stand-by state and the beacon period in the call state may be set in advance in the communication interface section 35 with respect to each application, or may be notified from the application executing section 34 to the communication interface section 35 each time a change to the beacon period is required.

When the terminal-side wireless communication section 36 receives the IP phone application start-up notification along with the designation of the beacon period from the application section 33 (S32), the terminal-side wireless communication section 36 transmits, to the base station 10, a beacon period change request in the form of a beacon signal including the requested beacon period (e.g. T=1 sec).

When the base station 10 receives the beacon period change request from the terminal 30 (S68), the communication control section 15 changes the beacon period to the designated beacon period (S69). At this time, at the timing of the pre-change beacon period, the communication control section 15 transmits a beacon signal notifying the post-change beacon period. Then, the communication control section 15 starts transmitting beacon signals at the timing of the post-change beacon period.

On the other hand, at a (pre-change) beacon reception time, the terminal 30 turns ON the communication circuit 40, and receives the beacon signal from the base station 10 (S33 to S35). The terminal 30 then turns OFF the communication circuit 40. At this time, the reception control section 39 confirms that the beacon period included in the beacon signal is the requested beacon period, and sets the beacon period as the period between receptions of beacon signals (S44). Therefore, the beacon reception period is 1 sec (the bacon period in the stand-by state) from the next time. If the beacon signal includes information indicating that there is data addressed to the terminal 30 itself, the reception control section 39 receives the data and transfers it to the application section 33 (S40 to S42).

Thereafter, when the application section 33 receives the data from the terminal-side wireless communication section 36 (S15), the application executing section 34 notifies incoming call by a sound and/or display at the output section 32 (S16). When the user puts the IP phone off the hook and into a call state, the terminal 30 changes the beacon period to the beacon period in the call state (e.g. 20 msec), as in the above-described process for changing the beacon period in the stand-by state. When the user puts the IP phone on the hook and again into the stand-by state, the terminal 30 changes the beacon period to the beacon period for the stand-by state (e.g. 1 sec). Thus, in the case of the IP phone application, the terminal 30 changes the beacon period depending on whether the terminal 30 is in the stand-by state or the call state.

FIG. 13 additionally illustrates at which timing a signal for data communication is sent in the sequence in which the beacon period is changed. As shown in FIG. 13, if there is voice data of the IP phone in the base station 10 ("transmit data"), the voice data is sent in the form of a data communication signal that follows the beacon signal. Thus, whether or not there is voice data to be sent from the base station 10 to the terminal 30 can be notified by using the beacon signal.

In a power ON period (shaded area) shown in FIG. 13, in the stand-by state, the terminal 30 repeats the following operation: turn ON the communication circuit 40 and receive the beacon signal from the base station 10 at the beacon reception time for the stand-by state, and, if there is an incoming call, receive a call-in signal, and then turn OFF the communication circuit 40. Meanwhile, in the call state, the terminal 30 repeats the following operation: turn ON the communication circuit 40 and receive the beacon signal from the base station 10 at the beacon reception time in the call state, and, after receiving voice data, turn OFF the communication circuit 40. When the terminal 30 has thus finished receiving signals sent from the base station 10, the terminal 30 keeps the power supply to the communication circuit 40 OFF until the timing for receiving a next beacon signal. Thus, the terminal 30 keeps the communication circuit 40 OFF while no signal is received.

(2) If one terminal 30 uses one base station 10, and the terminal 30 executes a plurality of applications, the beacon period is set to the shortest period among the periods required by the applications. When the application is terminated, the beacon period is set to the shortest period among the periods required by the other applications executed.

Figure 14:
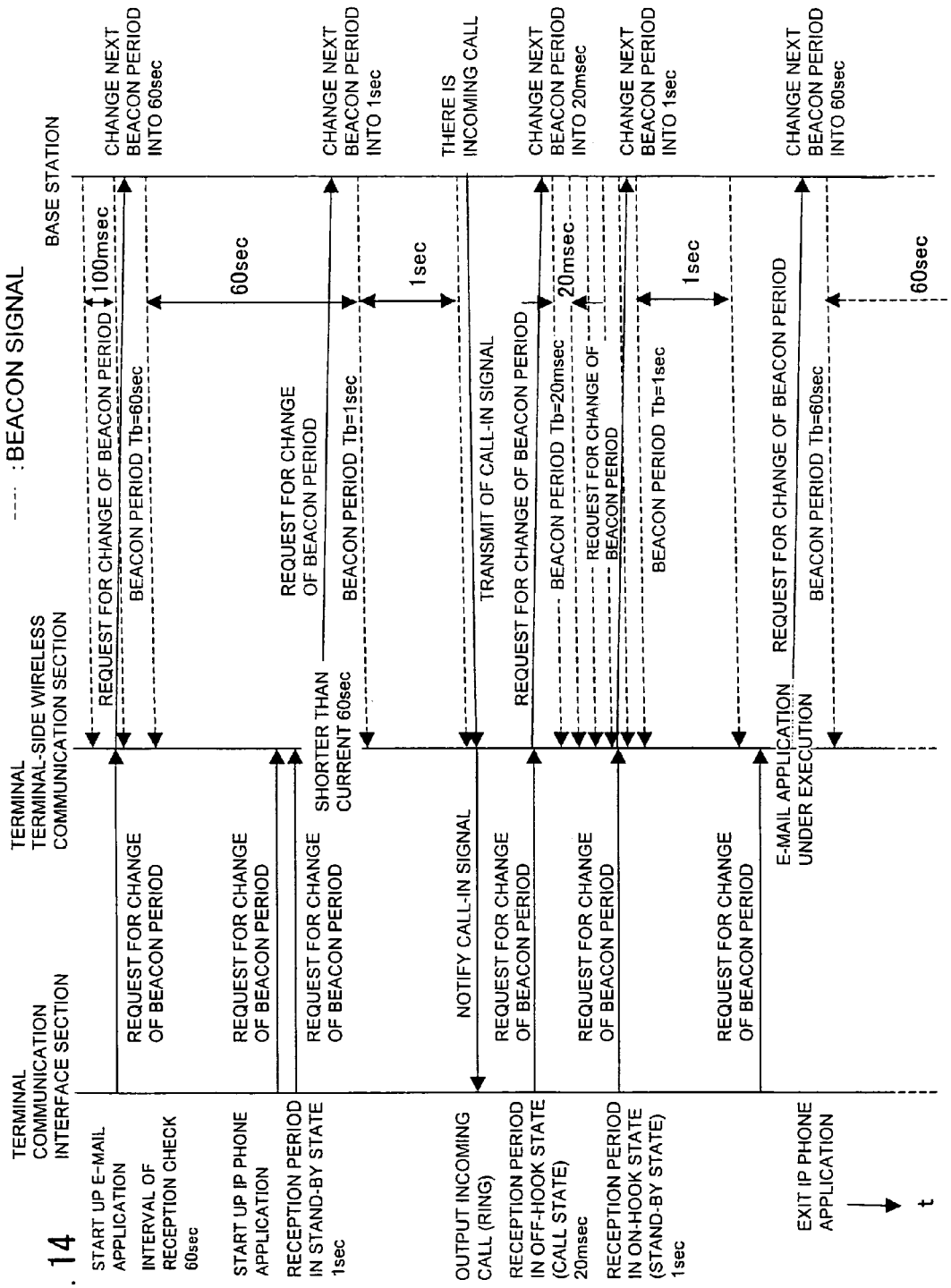
FIG. 14 is a sequence diagram illustrating operation of the wireless communication system illustrated in FIG. 1, wherein an application is an IP phone application.
Figure 15:
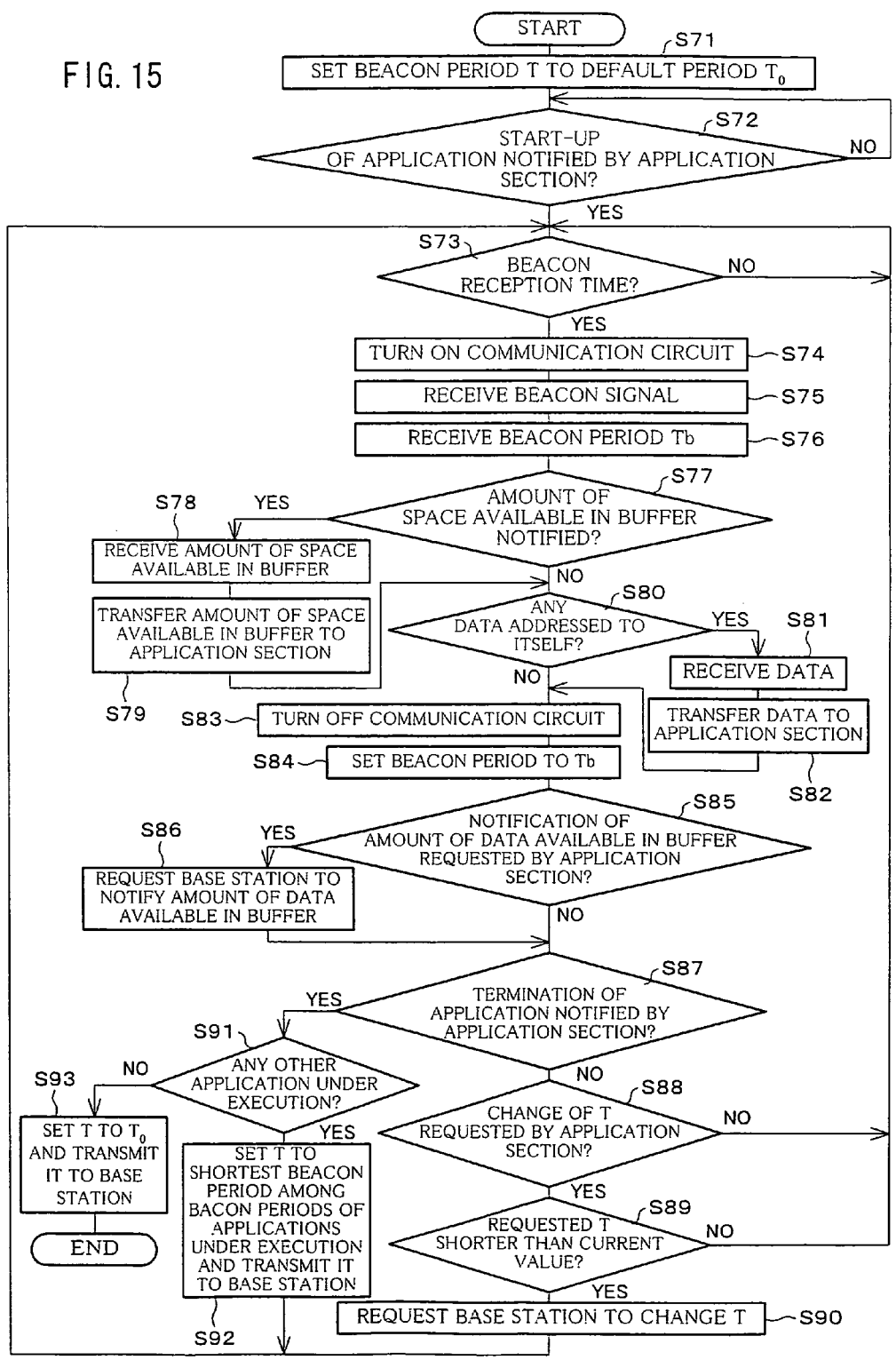
FIG. 15 is a flowchart illustrating operation of a terminal-side wireless communication section of a terminal in the wireless communication system illustrated in FIG. 2.

FIG. 14 is a sequence diagram illustrating operation in a case where an IP phone application is executed while an e-mail application is executed, and the IP phone application is terminated earlier. FIG. 15 is a flowchart illustrating operation of the terminal-side wireless communication section 36 in a case where a plurality of applications are executed. In FIG. 15, executions of the e-mail application, the streaming application, and the IP phone application are illustrated in one figure.

Described below is a case where, in the wireless communication system 1 shown in FIG. 2, the IP phone application is executed by the application executing section 34B while the e-mail application is executed by the application executing section 34A, and the IP phone application is terminated earlier.

More specifically, first, the terminal 30 sets the beacon period (e.g. 60 sec) of the base station 10 by the process described in (1) [E-mail Application], in accordance with the interval of automatic mail reception check performed by the application executing section 34A. Then, by the process described in (1) [IP Phone Application], the terminal 30 requests the base station 10 to set the beacon period of the base station 10 to the interval (e.g. Ta=1 sec) of reception check performed, while the IP phone is in the stand-by state, by the application executing section 34B.

When the terminal-side wireless communication section 36 receives the IP phone application start-up notification along with the designation of the beacon period in the stand-by state from the application section 33 (S72), the terminal-side wireless communication section 36 judges whether or not the requested beacon period (e.g. Ta=1 sec) is shorter than the current beacon period (e.g. T=60 sec) (S89). If shorter (YES), the terminal-side wireless communication section 36 transmits, to the base station 10, a beacon period change request including the requested beacon period (e.g. Ta=1 sec) (S90).

The beacon period (e.g. 20 msec) while the IP phone is in the call state is shorter than the beacon period of the e-mail application (e.g. T=60 sec). Therefore, by the process described in (1) [IP Phone Application], the terminal 30 performs communications of the e-mail application executed by the application executing section 34A and of the IP phone application executed by the application executing section 34B, while changing the beacon period in accordance with the stand-by/call states of the IP phone.

After that, when the user exits the IP phone application, the communication interface section 35 judges whether or not any other application is under execution (S91). If any other application is under execution (YES), the communication interface section 35 causes the terminal-side wireless communication section 36 to request the base terminal 10 to change the beacon period to the beacon period of the application (in this example, T=60 sec, which is the beacon period of the e-mail application) (S92). On the other hand, if no other application is under execution (NO), the communication interface section 35 causes the terminal-side wireless communication section 36 to request the base terminal 10 to change the beacon period to the default beacon period (e.g. T0=100 msec) (S93).

Thus, according to the wireless communication system 1, the terminal 30 can optimize its period between receptions of beacon signals, in the case where one terminal 30 uses one base station 10 and the terminal 30 executes a plurality of applications. Therefore, it is possible to reduce power consumption by keeping the power supply from the power source section 43 to the communication circuit 40 OFF until the timing for receiving a beacon signal.

In this example, the number of applications is two. If the number of applications is more than two, it is judged, upon termination of each application, whether or not any other application is under execution. For this purpose, the communication interface section 35 may have, for example, a table (not shown) for managing correspondence of the application under execution and the beacon period required by the application. If the table is provided, the communication interface section 35 can determine which application requires the shortest beacon period, and the communication interface section 35 can set the beacon period accordingly. In this example, it is the terminal 30 that judges the shortest beacon period. However, this judgment may be made by the base station 10. If it is the base station 10 that makes the judgment, the beacon periods of the applications executed by the terminal 30 are notified to the base station 10.

(3) If a plurality of terminals 30 use one base station 10, the beacon period is set to the beacon period of the terminal 30 that requires the shortest beacon period. Upon termination of each application, the beacon period is set to the beacon period of the terminal 30 that requires the shortest beacon period, among the terminals 30 executing the applications.

Figure 16:
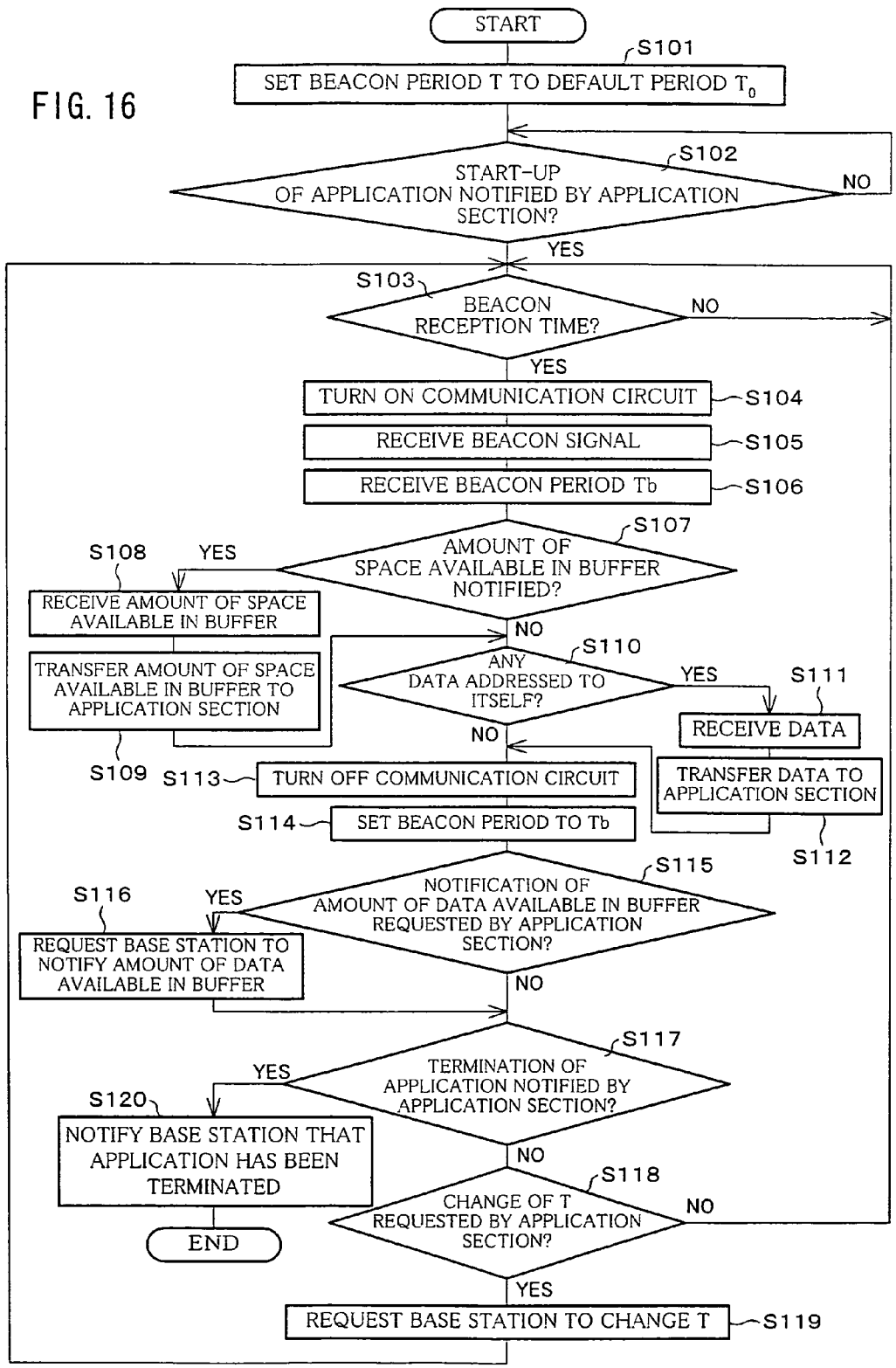
FIG. 16 is a flowchart illustrating operation of a terminal-side wireless communication section of a terminal in the case where the wireless communication system includes a plurality of terminals as illustrated in FIG. 4.
Figure 17:
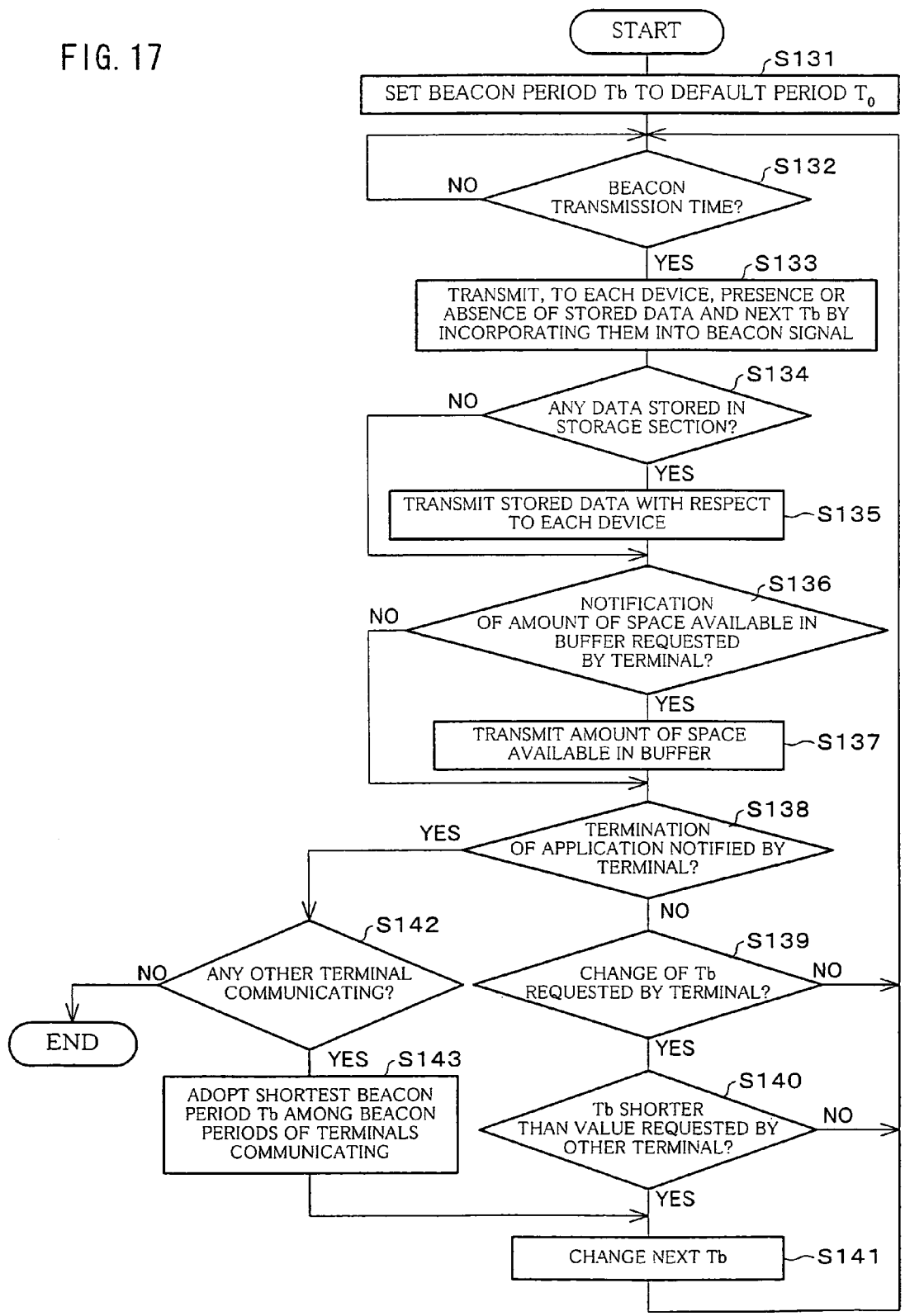
FIG. 17 is a flowchart illustrating operation of a base station in the case where the wireless communication system includes a plurality of terminals as illustrated in FIG. 4.

FIG. 16 is a flowchart illustrating operation of the terminal-side wireless communication section 36 in a case where a plurality of terminals 30 are provided. FIG. 17 is a flowchart illustrating operation of the base station 10 in the case where the plurality of terminals 30 are provided. In each of FIGS. 16 and 17, executions of the e-mail application, the streaming application, and the IP phone application are illustrated in one figure.

Described below is a case where the IP phone application is executed by the terminal 30A (see FIG. 4) while the e-mail application is executed by the terminal 30B (see FIG. 4), and the IP phone application executed by the terminal 30B is terminated earlier.

More specifically, first, when the terminal 30A executes the e-mail application, the terminal 30A sets the beacon period (e.g. 60 sec) of the base station 10 by the process described in (1) [E-mail Application], in accordance with the interval of automatic mail reception check of the e-mail application. Then, when the terminal 30B executes the IP phone application, the application executing section 34B of the terminal 30B requests the base station 10 to set the beacon period of the base station 10 to the interval (e.g. Ta=1 sec) of reception check performed while the IP phone is in the stand-by state.

In the base station 10, the communication control section 15 compares (S140) the current beacon period with the beacon period requested (S139) by the terminal 30B, and chooses (S141) the shorter beacon period. In this example, because the beacon period of the IP phone application in the stand-by state is shorter than the beacon period of the e-mail application, a change is made to the beacon period of the IP phone application in the stand-by state. At this time, at the timing of the pre-change beacon period, the communication control section 15 transmits a beacon signal notifying the post-change beacon period to the terminals 30A and 30B. Then, the communication control section 15 starts transmitting beacon signals at the timing of the post-change beacon period.

If the IP phone application executed by the terminal 30B is terminated earlier, the communication interface section 35 of the terminal 30B causes the terminal-side wireless communication section 36 to notify the base station 10 that the IP phone application has been terminated (S120).

Then, in the base station 10, the communication control section 15 judges whether or not there is any application under execution other than the IP phone application, which has been terminated in the terminal 30B (S142). If any other application is found as a result of judgment (YES), the beacon period is changed to the beacon period of the terminal 30 (among the terminals 30 communicating) that has the shortest beacon period (S143). In this example, the beacon period is changed to the beacon period (Tb=60 sec) of the e-mail application executed by the terminal 30A.

Thus, according to the wireless communication system 1, it is possible to optimize periods between receptions of beacon signals, in the case where a plurality of terminals 30 use one base station 10. Therefore, it is possible to reduce power consumption by keeping the power supply from the power source section 43 to the communication circuit 40 OFF until the timing for receiving a beacon signal.

In this example, the number of terminals 30 is two. If the number of terminals 30 is more than two, it is judged, when termination is notified from one of the terminals 30, whether or not communication is under way with any other terminal 30. For this purpose, the communication control section 15 may have, for example, a table (not shown) for managing correspondence of the terminal 30 communicating and the beacon period required by that terminal 30. If the table is provided, the communication control section 15 can determine which terminal 30 requires the shortest beacon period, and the communication control section 15 can set the beacon period accordingly.

Figure 18:
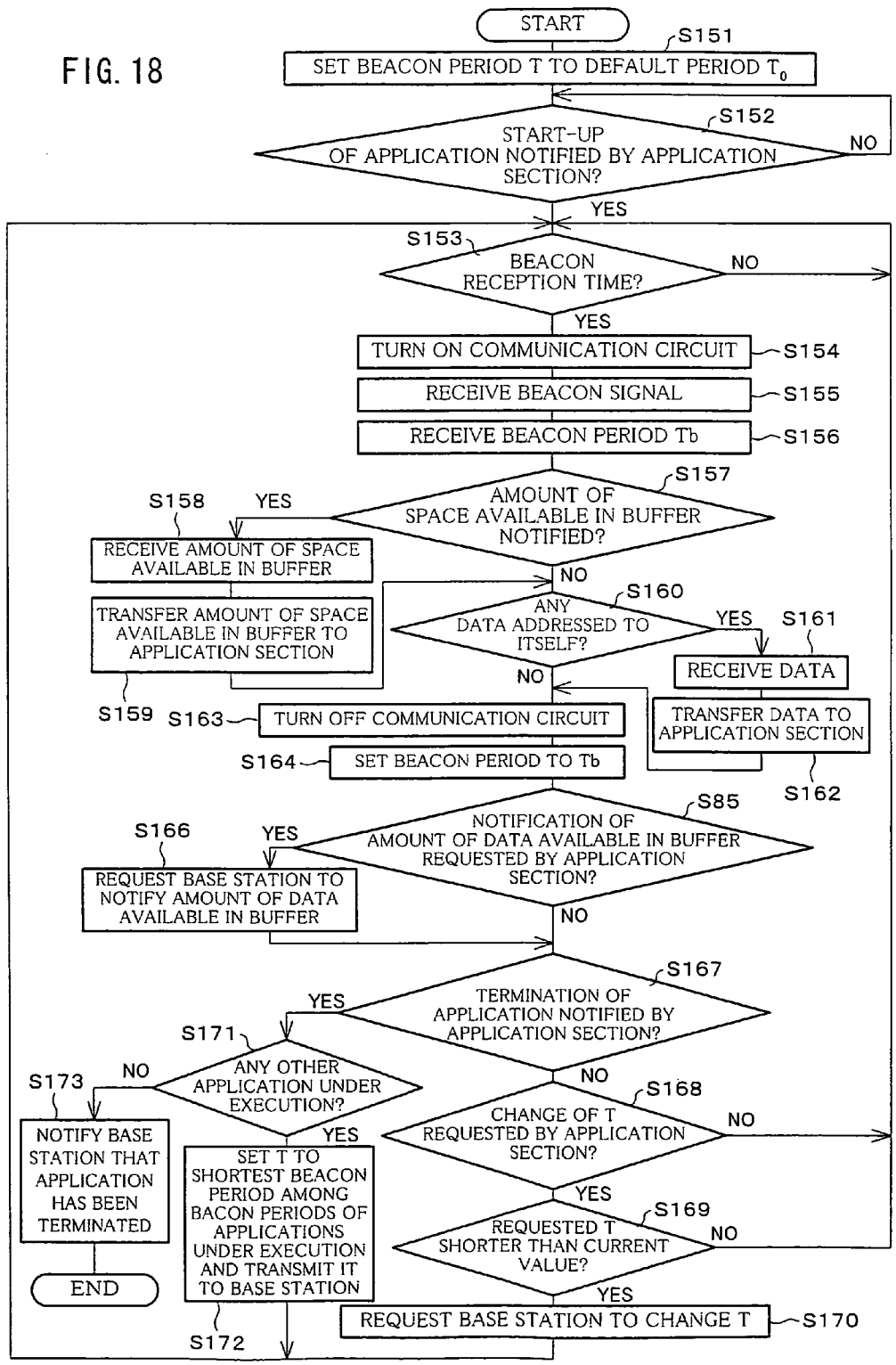
FIG. 18 is a flowchart illustrating operation of a terminal-side wireless communication section of a terminal in the case where the wireless communication system includes a plurality of terminals as illustrated in FIG. 4, and a plurality of applications are executed.

FIG. 18 is a flowchart illustrating operation of the terminal-side wireless communication section in a case where a plurality of terminals 30 execute a plurality of applications. In this case, if there is any application executed in the terminal 30 itself, the communication interface section 35 transmits the shortest beacon period to the base station 10. If there is no application under execution, the communication interface section 35 transmits a notification of termination to the base station 10. The operation of the base station 10 in this case is as illustrated in FIG. 17.

Next, with reference to FIGS. 22 to 25, the following describes a case where the terminal 30 transmits, to the base station 10, not a beacon signal but information for the base station 10 to determine the beacon period (beacon period determining information (transmission period determining information)).

As described above, the "communication property" is determined by, for example, (a) the communication pattern of the application, (b) the state of the application, (c) the type of the device used as the terminal, or (d) a combination of (a) to (c). In the wireless communication system 1, the "communication property" and the "type of the application" are used as the information for determining the beacon period (beacon period determining information (transmission period determining information)).

FIG. 22 is one example of a management table that associates the type of the application with the beacon transmission period. The management table as shown in FIG. 22 is stored in advance in the communication control section 15 of the base station 10. To the base station 10, the terminal 30 transmits information indicating the type (for example, e-mail application or browser) of the application executed by the application executing section 34. This information is transmitted as the beacon period determining information. In the base station 10, the communication control section 15 determines and sets the beacon transmission period by referring to the management table in accordance with the information indicating the type of the application received as the beacon period determining information. In the example of FIG. 22, the beacon transmission period is set to 60 sec if the type of the application is the e-mail application, and 1 sec if the type of the application is the browser.

FIG. 23 is one example of a management table that associates the type of the application and the communication pattern with the beacon transmission period. The management table as shown in FIG. 23 is stored in advance in the communication control section 15 of the base station 10. To the base station 10, the terminal 30 transmits information indicating the type (for example, streaming application) of the application executed by the application executing section 34, and information indicating the communication pattern (for example, information indicating that the data rate of streaming is 300 Kbps). These two sets of information are transmitted as the beacon period determining information. In the base station 10, the communication control section 15 determines and sets the beacon transmission period by referring to the management table in accordance with the information indicating the type of the application and the communication pattern, the information received as the beacon period determining information. In the example of FIG. 23, the beacon transmission period is set to 40 sec, if the type of the application is the streaming application and the data rate of streaming is 300 Kbps.

FIG. 24 is one example of a management table that associates the type and state of the application with the beacon transmission period. The management table as shown in FIG. 24 is stored in advance in the communication control section 15 of the base station 10. To the base station 10, the terminal 30 transmits information indicating the type (for example, IP phone application) of the application executed by the application executing section 34, and information indicating the state (for example, stand-by or call) of the application executed by the application executing section 34. These two sets of information are transmitted as the beacon period determining information. In the base station 10, the communication control section 15 determines and sets the beacon transmission period by referring to the management table in accordance with the information indicating the type and state of the application received as the beacon period determining information. In the example of FIG. 24, the beacon transmission period is set to 1 sec, if the type of the application is the IP phone application and the state of the application is the stand-by state. If the type of the application is the IP phone application and the state of the application is the call state, the beacon transmission period is set to 20 msec.

FIG. 25 is one example of a management table that associates the type of the application and the type of the device used as the terminal 30 with the beacon transmission period. The management table as shown in FIG. 25 is stored in advance in the communication control section 15 of the base station 10. To the base station 10, the terminal 30 transmits information indicating the type (for example, e-mail application) of the application executed by the application executing section 34, and information indicating the type (for example, portable phone, portable information terminal, or lap-top personal computer) of the device used as the terminal 30. These two sets of information are transmitted as the beacon period determining information. In the base station 10, the communication control section 15 determines and sets the beacon transmission period by referring to the management table in accordance with the information indicating the type of the application and type of the device, the information received as the beacon period determining information. In the example of FIG. 25, the beacon transmission period is set to 10 sec if the type of the application is the e-mail application and the type of the device is the portable phone. If the type of the device is the portable information terminal or lap-top personal computer, the beacon transmission period is set to 60 sec.

As described above, to the base station 10, the terminal 30 may transmit the beacon period change request in the form of a beacon signal including, instead of the beacon period, the information for determining the beacon period (beacon period determining information). The beacon period determining information may be the "type of the application" alone, the "communication property" alone, or both the "type of the application" and the "communication property". As may be expected, the more the amount of information is, the more precisely the beacon period can be set.

The terminal of the present invention may include communication interface means (communication interface section 35) that notifies information for determining the period between transmissions of the periodic signal (beacon signal) to the transmission period setting requesting means (terminal-side wireless communication section 36), the transmission period setting requesting means transmitting, to the base station, a request for setting the transmission period, the request being notified by the communication interface means. In addition, the terminal may be such that the information for determining the period between transmissions of the periodic signals is a type of an application executed by the terminal. Alternatively, the terminal may be such that the information for determining the period between transmissions of the periodic signals is a communication property. Alternatively, the terminal may be such that the information for determining the period between transmissions of the periodic signals is a combination of a type of an application executed by the terminal and a communication property.

Embodiment 2

With reference to FIGS. 1 to 4 and 19 to 21, the following describes another embodiment of the present invention. For the purpose of explanation, members whose functions are identical to those of the members described in Embodiment 1 are labeled with identical reference numerals, and explanations of such members are omitted.

In the wireless communication system 1 of the present embodiment, the terminal 30 dynamically changes its beacon reception period in accordance with a type of an application executed by the terminal 30 and/or a communication property (a communication pattern and/or a state of the application). Therefore, the present embodiment is different from Embodiment 1 in that the beacon period of the base station 10 is not changed. Note that schematic and detailed arrangements of the wireless communication system 1 are as shown in FIGS. 1 to 4.

More specifically, in the wireless communication system 1 of the present embodiment, the terminal-side wireless communication section 36 (reception period setting means) sets the period between receptions of beacon signals (reception period) to a multiple number of the period between transmissions of beacon signals by the base station 10 (transmission period). The communication interface section 35 (communication interface means) notifies the terminal-side wireless communication section 36 such a period between receptions of beacon signals that is in accordance with the type of the application executed by the application executing section 34 and/or the communication property. For example, the communication interface section 35 obtains the state of the application executed by the application executing section 34, and, in accordance with the state of the application, determines the period between receptions of beacon signals. The communication interface section 35 determines the period between receptions of beacon signals also in accordance with the amount of space available in the buffer of the base station 10. If one terminal 30 executes a plurality of applications, the communication interface section 35 adopts the period of the application that requires the shortest period.

Taking examples (1) and (2), the following describes how the beacon period is controlled in the wireless communication system 1 of the present embodiment.

(1) The beacon reception period is changed only through processing in the terminal 30. The beacon reception period is set to a multiple number of the beacon period of the base station 10.

The base station 10 may keep transmitting the same beacon signal until a reception confirmation signal (ACK) is received from the terminal 30. In this case, the base station 10 transmits the same beacon signal plural times during the beacon reception period of the terminal 30. In order to limit the number of times the base station 10 repeats transmitting the same beacon signal, the beacon period set by the terminal 30 may be limited to a certain multiple number at maximum.

Figure 19:
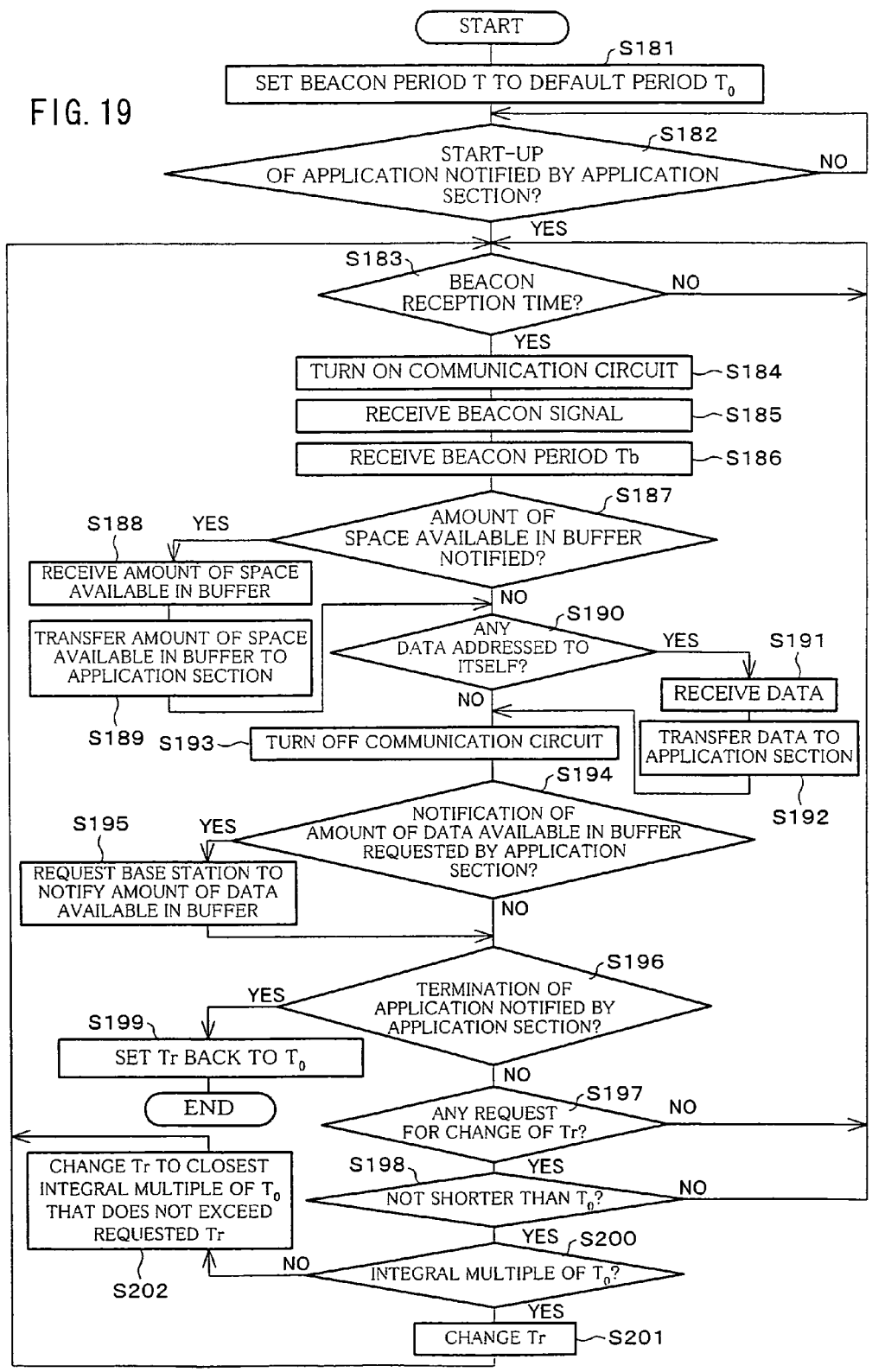
FIG. 19 is a flowchart illustrating operation of a terminal-side wireless communication section of a terminal in the wireless communication system illustrated in FIGS. 1 and 2.

FIG. 19 is a flowchart illustrating operation of the terminal-side wireless communication section 36. In FIG. 19, executions of the e-mail application, the streaming application, and the IP phone application are illustrated in one figure.

Described below is a case where, in the network arrangement of FIG. 4, the terminal 30A executes the e-mail application, and the terminal 30B executes the streaming application. In the terminal 30A, the communication interface section 35 sets the beacon reception period to 500 msec, which is an integral multiple of the beacon transmission period (100 msec) of the base station 10. The beacon reception period of each terminal 30 is not informed to the base station 10 or another terminal 30.

More specifically, first, when the application executing section 34 of the terminal 30A starts up the e-mail application, the communication interface section 35 notifies the terminal-side wireless communication section 36 that the e-mail application has been started up, and requests the terminal-side wireless communication section 36 to set the beacon reception period to the interval (e.g. 60 sec), which is set for the e-mail application, of automatic mail reception check.

At this time, if the interval of automatic mail reception check of the e-mail application is different from the current beacon reception period (S197), the communication interface section 35 follows the following procedure in determining the beacon reception period to request. Namely, the communication interface section 35 judges whether or not the beacon reception period suitable for the application is not shorter than the default beacon period T0 of the base station 10 and is an integral multiple of the default beacon period T0 of the base station 10 (S198, S200). If this requirement is satisfied, the beacon reception period suitable for the application is adopted (S201). For example, if the default beacon period T0 is 100 msec, and the beacon reception period is Tr=60 sec, the beacon reception period is changed as requested. On the other hand, no change is made if the beacon reception period suitable for the application is shorter than the default beacon period (NO to S198). If the beacon reception period suitable for the application is, for example, 60.01 sec, which is not an integral multiple of the default beacon period (NO to S200), the beacon reception period is set to such a value that is the closest integral multiple of the default period that does not exceed the requested value (S202).

Then, the terminal-side wireless communication section 36 sets the beacon reception period in accordance with the request by the communication interface section 35. After that, at a beacon reception time, the terminal-side wireless communication section 36 turns ON the communication circuit 40, receives a beacon signal from the base station 10, and turns OFF the communication circuit 40. If the beacon signal includes information that indicates there is data for the terminal 30 itself, the terminal-side wireless communication section 36 receives the data and transfers it to the application section 33 (S190 to S192).

When the user exits the e-mail application (S196), the communication interface section 35 notifies the terminal-side wireless communication section 36 that the application has been terminated. In this way, the beacon reception period is set back to the default period (the period before the start-up of the mailing application) (S199). In the case of the e-mail application, a situation for changing the beacon period Tr occurs if the user changes the time interval of automatic mail reception check.

Next, when the application executing section 34 of the terminal 30B starts up the streaming application, the communication interface section 35 obtains the reproduction data rate (e.g. 480 Kbps) that is set for the streaming application. Meanwhile, the communication interface section 35 notifies the terminal-side wireless communication section 36 that the streaming application has been started up, and requests the base station 10 to notify the amount of space available in the buffer (S195). When the terminal-side wireless communication section 36 receives the amount of space available in the buffer from the base station 10 (S188), the communication interface section 35 calculates, on the basis of the data rate (e.g. 480 Kbps) of streaming and the amount of space available in the buffer (e.g. 30 KByte), the longest beacon period that does not cause failure of data reproduction. Since 30 KByte=240 Kbit, the longest beacon period in this example is 240/480=500 msec. Then, the communication interface section 35 requests the terminal-side wireless communication section 36 to set the beacon reception period to the value thus obtained (e.g. Tr=500 msec) (S197).

At this time, if the calculated beacon reception period is different from the current beacon reception period (S197), the communication interface section 35 sets the beacon reception period to the closest integral multiple of the default period that does not exceed the calculated beacon reception period, as described above (S198, S200, S201, S202). For example, no change is made if the calculated beacon reception period is shorter than the default period. If the calculated beacon reception period is, for example, 512 msec, which is not an integral multiple of the default period, the beacon reception period is set to 500 msec, which is the closest integral multiple of the default period that does not exceed the calculated beacon period.

In accordance with the request by the communication interface section 35, the terminal-side wireless communication section 36 adopts the required beacon reception period. At the beacon reception time, the terminal-side wireless communication section 36 turns ON the communication circuit 40, receives a beacon signal from the base station 10, and turns OFF the communication circuit 40. At this time, if the beacon signal includes information indicating that there is data addressed to the terminal 30 itself, the terminal-side wireless communication section 36 receives the data, and transfers it to the application section 33 (S190 to S192).

When the user exits the streaming application (S196), the communication interface section 35 notifies the terminal-side wireless communication section 36 that the application has been terminated, and restores the default beacon reception period (the beacon reception period before the start-up of the streaming application) (S199).

In the case of the streaming application, a situation for changing the beacon period Tr occurs if the user chooses another streaming data.

(2) If a plurality of terminals 30 use one base station 10, the beacon reception period is left unchanged; only the beacon reception periods of the terminals 30 are changed. The beacon reception periods of the terminals 30 are integral multiples of the beacon period of the base station 10. This case is different from the case of (1) in that it is the base station 10 that determines and notifies the beacon reception periods of the terminals 30. The period between transmissions of beacon signals by the base station 10 is constant. Therefore, the beacon reception period set in one of the terminal 30 does not influence the other terminals 30.

Figure 20:
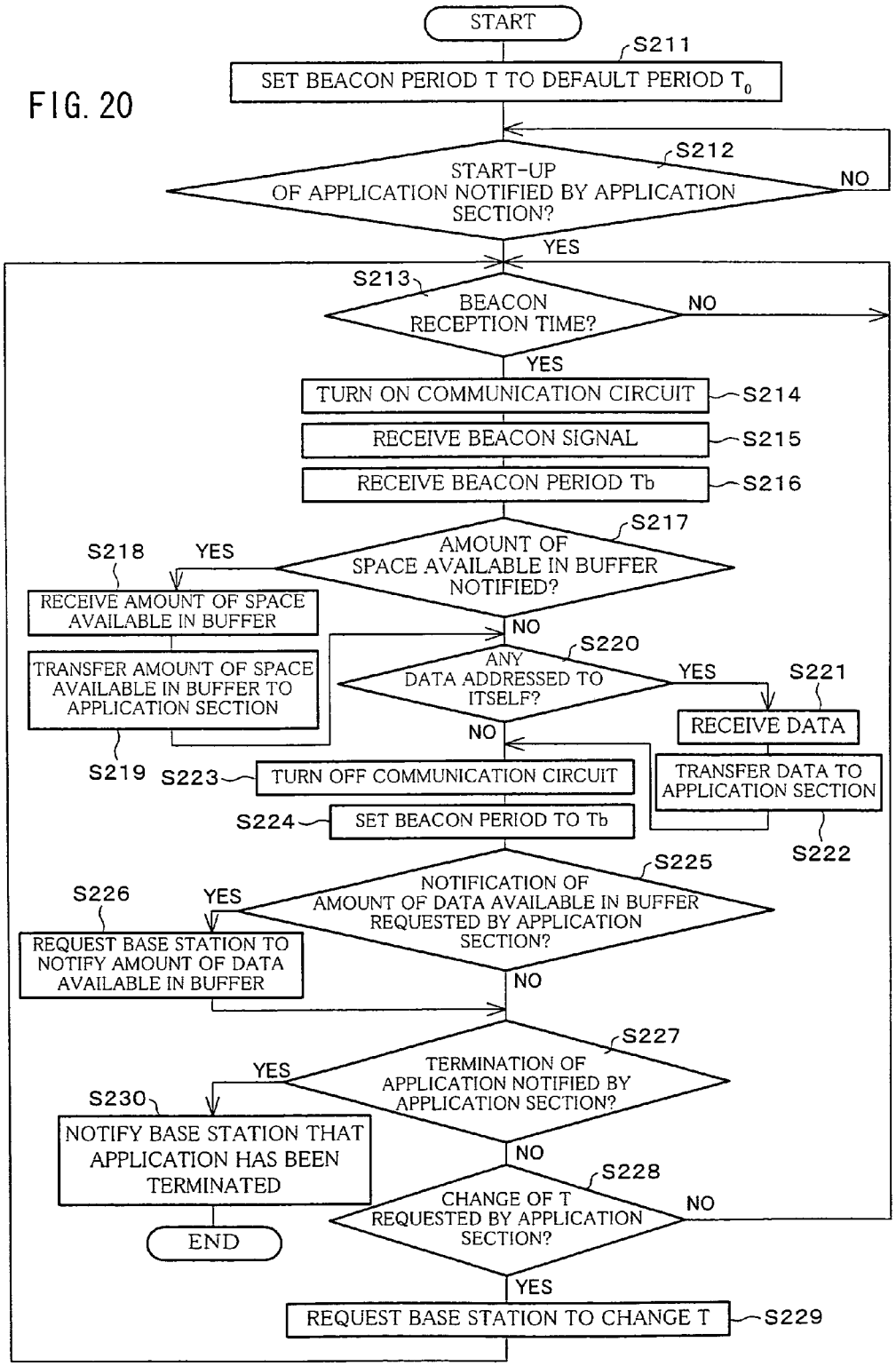
FIG. 20 is a flowchart illustrating operation of a terminal-side wireless communication section in the case where the wireless communication system includes a plurality of terminals as illustrated in FIG. 4.
Figure 21:
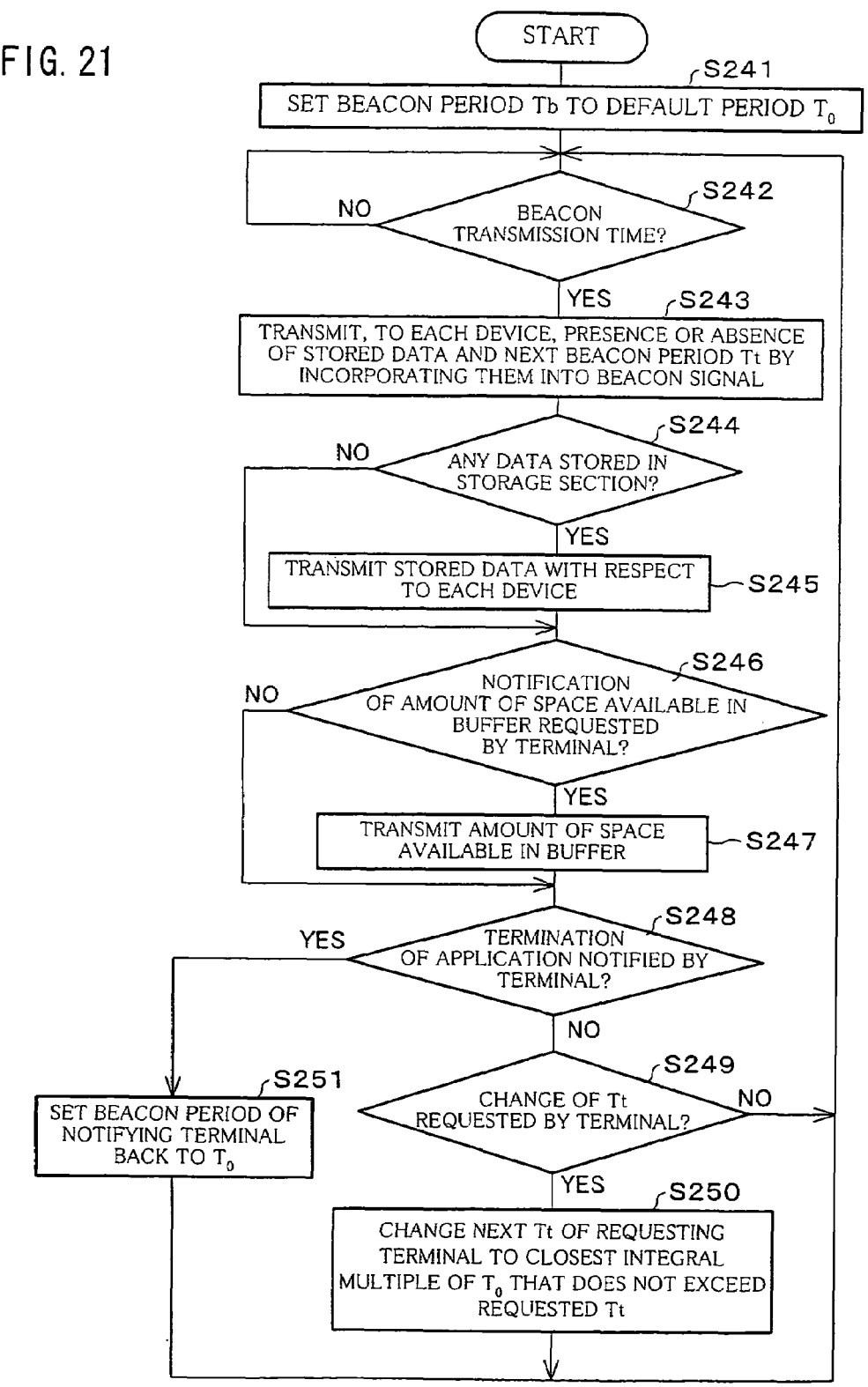
FIG. 21 is a flowchart illustrating operation of a base station in the case where the wireless communication system includes a plurality of terminals as illustrated in FIG. 4.

FIG. 20 is a flowchart illustrating operation of the terminal-side wireless communication section 36. FIG. 21 is a flowchart illustrating operation of the base station 10. In each of FIGS. 20 and 21, executions of the e-mail application, the streaming application, and the IP phone application are illustrated in one figure.

Described below is a case where, in the network arrangement of FIG. 4, the terminal 30A executes the e-mail application, and the terminal 30B executes the streaming application. In the terminal 30A, the communication interface section 35 sets the beacon reception period to 60 sec, which is an integral multiple of the beacon transmission period (100 msec) of the base station 10. In the terminal 30B, the communication interface section 35 sets the beacon reception period to 500 msec, which is an integral multiple of the beacon transmission period (100 msec) of the base station 10.

More specifically, first, when the application executing section 34 of the terminal 30A starts up the e-mail application, the communication interface section 35 notifies the terminal-side wireless communication section 36 that the e-mail application has been started up, and causes the terminal-side wireless communication section 36 to request the base-side wireless communication section 12 to set the beacon reception period to the interval (e.g. 60 sec), which is set for the e-mail application, of automatic mail reception check.

In the base station 10, when the request for the change of the beacon reception period is received from the terminal 30A (S249), the communication control section 15 sets, as described in (1), the beacon reception period to such a value that is the closest integral multiple of the default period that does not exceed the interval of automatic mail reception check (S250). For example, when a request for adopting the beacon period T=60 sec is received from the terminal 30A, the communication control section 15 transmits a change to the beacon period T=60 sec to the terminal 30A, because the requested beacon period is not shorter than 100 msec and is an integral multiple. No change is made if the requested beacon period is shorter than the default beacon period. If the requested beacon period is, for example, 60.01 sec, which is not an integral multiple of the default beacon period, the beacon period is set to 60 sec, which is the closest integral multiple of the default period that does not exceed 60.01 sec.

Then, at the pre-change beacon transmission time, the base station 10 transmits the next beacon period Tt=60 sec to the terminal 30a, by incorporating the beacon period into a beacon signal addressed to the terminal 30A.

On the other hand, at the (pre-change) beacon reception time, the terminal 30A turns ON the communication circuit 40, and receives a beacon signal from the base station 10 (S213 to S216). The terminal 30A then turns OFF the communication circuit 40 (S223). At this time, the reception control section 39 confirms that the beacon period included in the beacon signal is the requested beacon period, and sets the beacon period as the period between receptions of beacon signals (S224). Therefore, the beacon reception period is 60 sec from the next time. If the beacon signal includes information indicating that there is data addressed to the terminal 30A itself, the reception control section 39 receives the data and transfers it to the application section 33 (S220 to S222). Upon receiving the data from the terminal-side wireless communication section 36, the application section 33 outputs the data to the output section 32.

After that, when the user exits the e-mail application (S227), the communication interface section 35 notifies the terminal-side wireless communication section 36 that the application has been terminated, and requests the base station 10 to restore the initial beacon period (the beacon period before the start-up of the e-mail application) (S230). As a result, the beacon reception period of the terminal 30A is set back to 100 msec.

In the case of the e-mail application, a situation for changing the beacon period occurs if the user changes the time interval of automatic mail reception check.

The streaming application is executed by the terminal 30B in the same manner. Therefore, explanation for the streaming application is omitted.

In the case where a plurality of terminals 30 execute a plurality of applications, if, for example, the terminal 30A executes an application ap1 (which requires a beacon period of 1 sec), an application ap2 (which requires a beacon period of 512 msec), and an application ap3 (which requires a beacon period of 50 msec), 512 sec is chosen because it is the shortest beacon period that is not shorter than 100 msec. However, because 512 msec is not an integral multiple of 100 msec, the beacon reception period of the terminal 30A is set to 500 msec, which is the closest integral multiple of 100 msec that does not exceed 512 msec.

Instead of the foregoing arrangement, beacon reception periods may be determined by the plurality of terminals 30 and transmitted to the base station 10, and post-change beacon reception periods may be confirmed by using beacon signals received from the base station 10. With this arrangement, in the case where a plurality of terminals 30 executes a plurality of applications, it is possible to set best suited beacon reception periods for the plurality of terminals 30, without changing the beacon period of the base station 10.

As described above, according to the wireless communication system 1 of the present invention, the power consumption of the terminal 30 is reduced when the terminal 30 optimizes its beacon reception period in accordance with the communication pattern and/or state of its application. Moreover, the power consumption of the terminal 30 is reduced when the terminal 30 notifies the communication pattern and/or state of its application to the base station 10 and optimizes the beacon transmission period. In the cases of streaming, IP phone, and the like applications, the power consumption of the terminal 30 is reduced when data is received intermittently without the influences of data loss or delay. In the cases where a plurality of applications are executed, or a plurality of terminals 30 communicate, the power consumption of the terminal(s) 30 is reduced by optimizing the beacon reception period(s).

Moreover, according to the wireless communication system 1, the terminal-side wireless communication section 36 of the terminal 30 (e.g. a mobile device) can be controlled freely so as to attain power-saving. Therefore, it is possible to perform low power consumption control that is best suited for the use of the mobile device.

Next, referring to FIGS. 26 through 34, the following will describe in detail a process when there are a plurality of terminals 30. In summary, (1) in the case where the base station 10 shortens the beacon transmission period in response to a request from one terminal 30A, the other terminal 30B changes its own period between receptions of beacon signals to a multiple having a suitable length among multiples of the transmission period. (2) In the case of requests for shortening of the beacon transmission period, the base station 10 receives the requests transmitted from all the terminals. However, in the case of requests for extension of the beacon transmission period, the base station 10 receives only a request from the terminal having transmitted a request for shortening of the beacon transmission period which has been most recently received by the base station 10. With this arrangement, communications performed by the terminal 30 at a short beacon transmission period are not affected by the other terminal 30. Note that, a setting of the beacon transmission period by the base station 10 is the same as that described in Embodiment 1, and a setting of the beacon reception period by the terminal 30 is the same as that described in Embodiment 2, so that detailed explanations of such settings are omitted.

In the case where there are a plurality of terminals 30 and the base station 10 has shortened the beacon transmission period in response to the request from one terminal 30A, the other terminal 30B changes its own beacon reception period to a multiple having a suitable length among multiples of the beacon transmission period of the base station 10. With this arrangement, even if the beacon transmission period of the base station 10 has been shortened by the terminal 30A, the other terminal 30B can maintains a suitable beacon reception period and reduce its power consumption.

Figure 26:
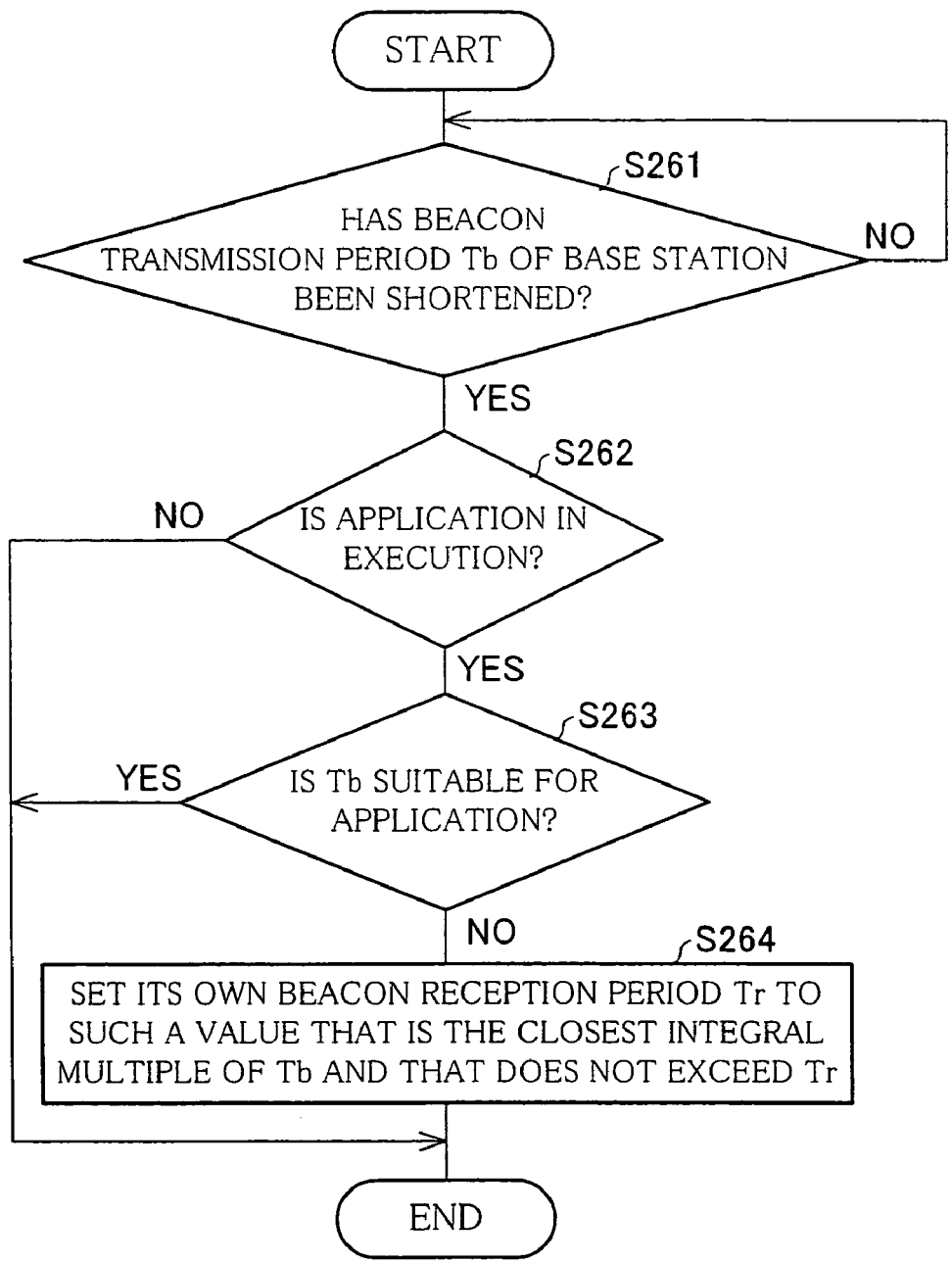
FIG. 26 is a flowchart illustrating operation of a terminal in the case where a beacon transmission period of a base station has been shortened in the wireless communication system illustrated in FIGS. 1 and 2.

With reference to FIG. 26, operation of the terminal 30B in this case will be described specifically below. FIG. 26 is a flowchart illustrating operation of the terminal 30 in the case where the beacon transmission period of the base station 10 has been shortened.

Firstly, the terminal 30B detects that a beacon transmission period Tb of the base station 10 has been shortened (YES in S261). Then, if an application is in execution (YES in S262), and the beacon transmission period Tb is not suitable for the application (NO in S263), the terminal 30B sets its own beacon reception period Tr to such a value that is the closest integral multiple of the beacon transmission period Tb that does not exceed the beacon reception period Tr (S264).

Further, in the case where the base station 10 has extended the beacon transmission period in response to the request from one terminal 30A, the other terminal 30B may request the base station 10 to change the beacon transmission period to such a period having a length suitable for the other terminal 30B. With this arrangement, even if the beacon transmission period of the base station 10 has been extended by the terminal 30A, the other terminal 30B can maintains a suitable beacon reception period and reduce its power consumption. Note that, the terminal 30A having a long beacon reception period in this situation can reduce its power consumption by the foregoing process (FIG. 26) of changing the beacon reception period to a multiple having a suitable length among multiples of the beacon transmission period of the base station 10 so as to maintain a suitable beacon reception period.

Figure 27:
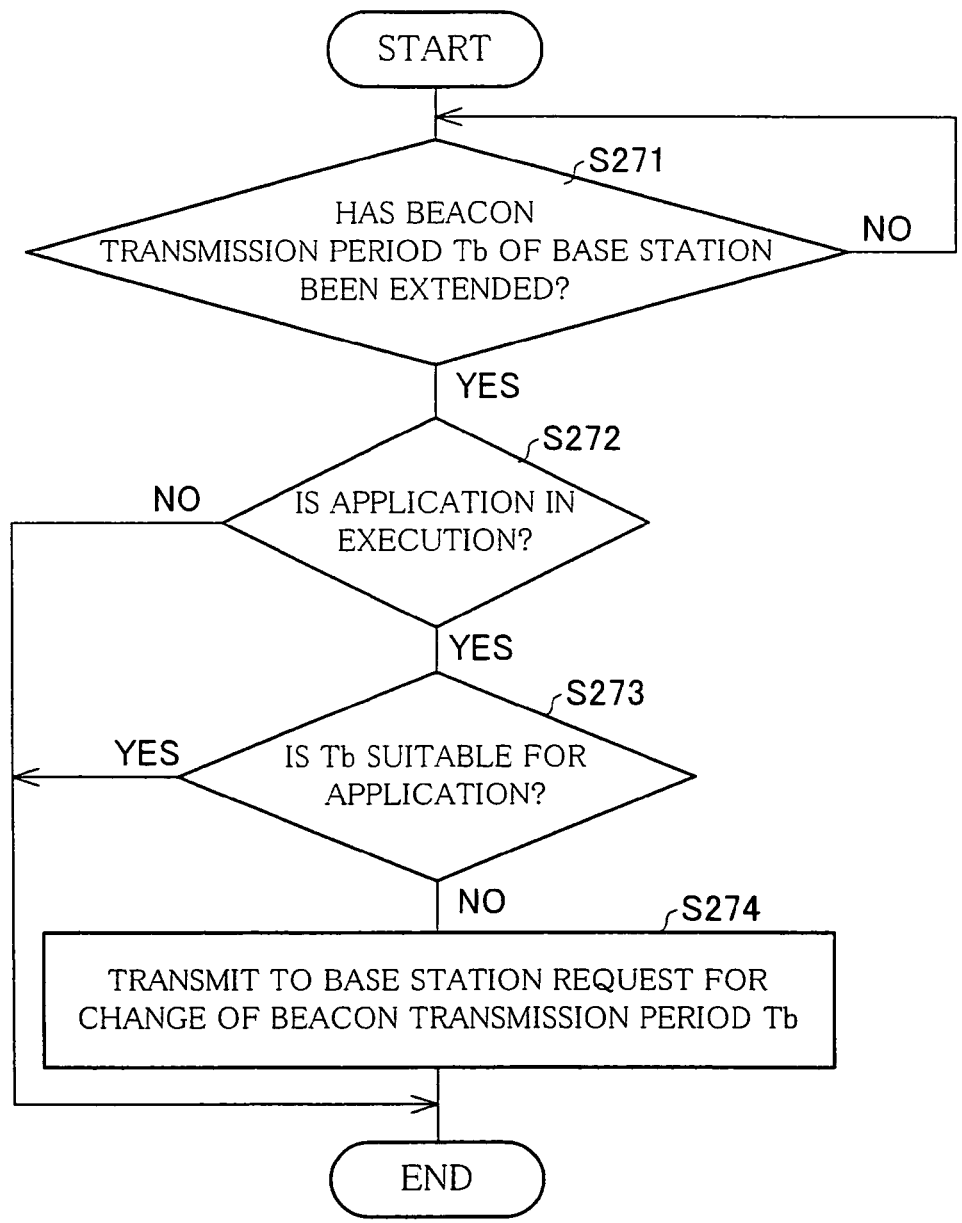
FIG. 27 is a flowchart illustrating operation of a terminal in the case where a beacon transmission period of a base station has been extended in the wireless communication system illustrated in FIGS. 1 and 2.

With reference to FIG. 27, operation of the terminal 30B in this case will be described specifically below. FIG. 27 is a flowchart illustrating operation of the terminal 30 in the case where the beacon transmission period of the base station 10 has been extended.

Firstly, the terminal 30B detects that a beacon transmission period Tb of the base station 10 has been extended (YES in S271). Then, if an application is in execution (YES in S272), and the beacon transmission period Tb is not suitable for the application (NO in S273), the terminal 30B transmits, to the base station 10, a request for change of the beacon transmission period Tb (S274).

In the case where the beacon transmission period is shortened, it may be arranged such that the base station 10 receives requests from all the terminals 30 and changes the beacon transmission period and the terminal 30B other than the terminal A having transmitted the requests changes the beacon reception period to a multiple having a suitable length among multiples of the beacon transmission period. Further, in the where the beacon transmission period is extended, it may be arranged such that the base station 10, except for the case of change from a default period, receives only a request from the terminal 30A having transmitted a request for setting to the current beacon transmission period and does not receive a request transmitted from the terminal 30B. In this case, the terminal 30B having been refused a request for extension of the beacon transmission period should change its own beacon reception period to a multiple having a suitable length among multiples of the current beacon transmission period.

Figure 28:
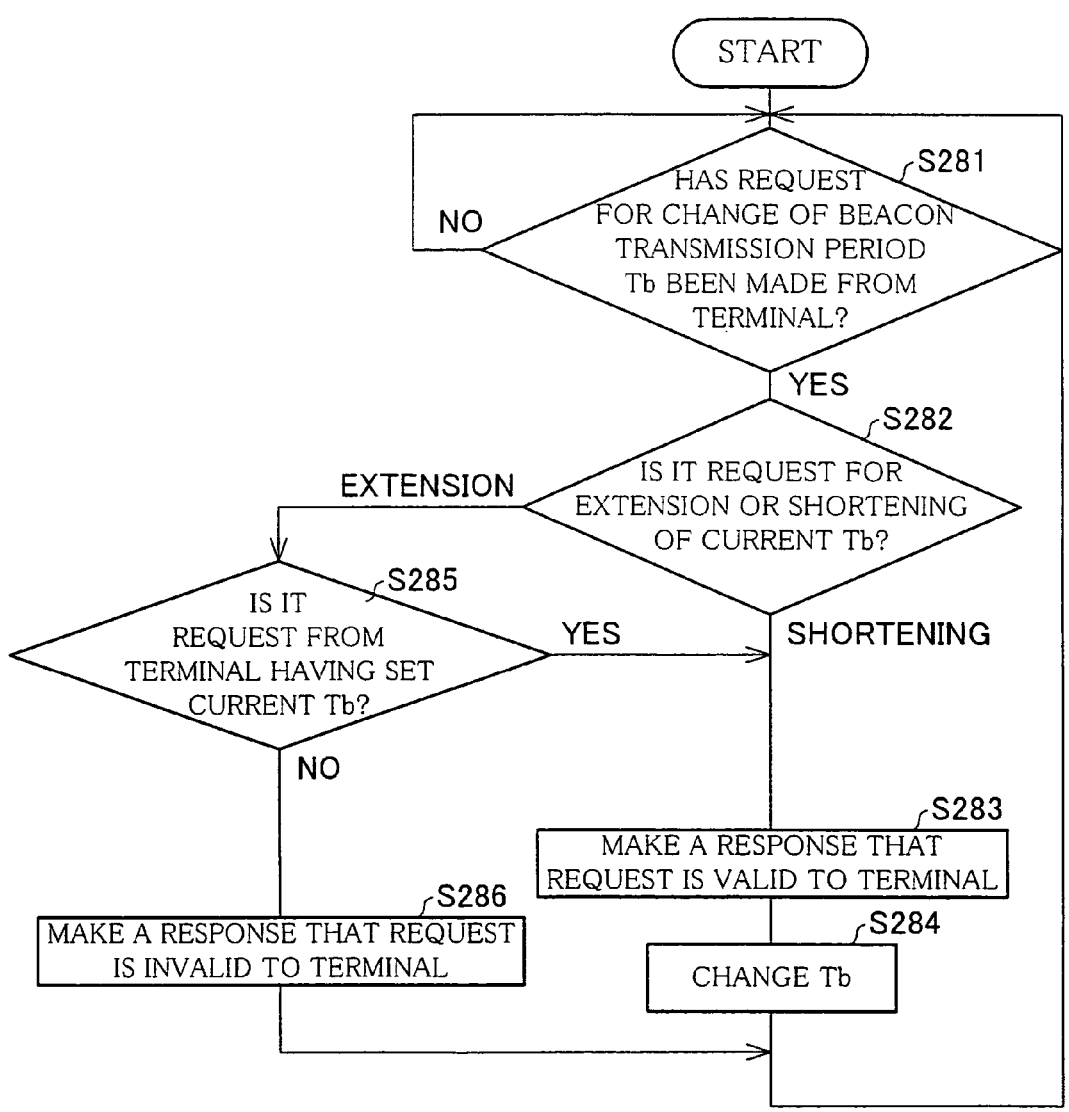
FIG. 28 is a flowchart illustrating operation of a base station when the base station has received a request for change of a beacon transmission period from the terminal in the wireless communication system illustrated in FIGS. 1 and 2.

With reference to FIG. 28, operation of the base station 10 in this case will be described specifically below. FIG. 28 is a flowchart illustrating operation of the base station 10 in the case where the beacon transmission period of the base station 10 has received a request for change of the beacon transmission period from the terminal 30.

Firstly, the base station 10 detects that a request for change of the beacon transmission period Tb has been made from the terminal 30 (YES in S281). Then, if the detected request is a request for shortening of the beacon transmission period Tb ("SHORTENING" in S282), or the base station 10 have received a request for extension of the current beacon transmission period Tb from the terminal 30 having setting the current beacon transmission period Tb (YES in S285), the base station 10 makes, to that terminal 30, a response that the request for change of the beacon transmission period Tb is valid (S283), and changes the beacon transmission period Tb (S284).

On the other hand, if a request for extension of the beacon transmission period Tb is received from the terminal 30 other than the terminal 30 having set the current beacon transmission period Tb (NO in S285), the base station 10, to that terminal 30, a response that the request for change of the beacon transmission period Tb is invalid (S286). In this case, the beacon transmission period Tb is not changed.

Figure 29:
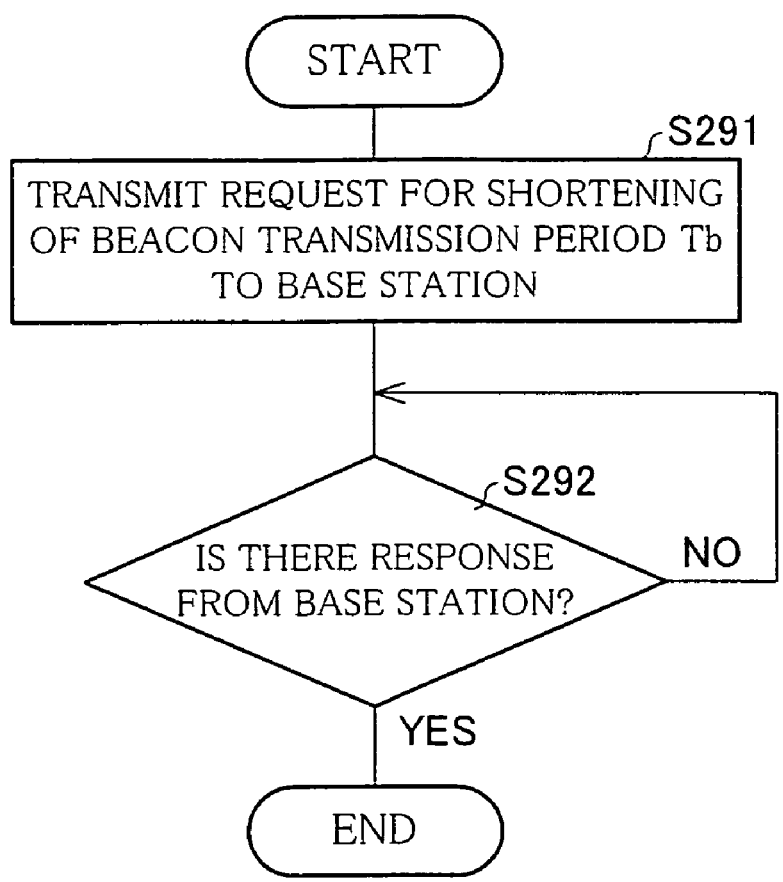
FIG. 29 is a flowchart illustrating operation of a terminal in the case where a terminal has made a request for shortening of a beacon transmission period in the wireless communication system illustrated in FIGS. 1 and 2.

Next, with reference to FIG. 29, the following describes operation of the terminal 30 in the case where the terminal 30 has made a request for shortening of the beacon transmission period.

The terminal 30 transmits, to the base station 10, the request for shortening of the beacon transmission period Tb (S291) and then receives a response from the base station 10 (S292).

Figure 30:
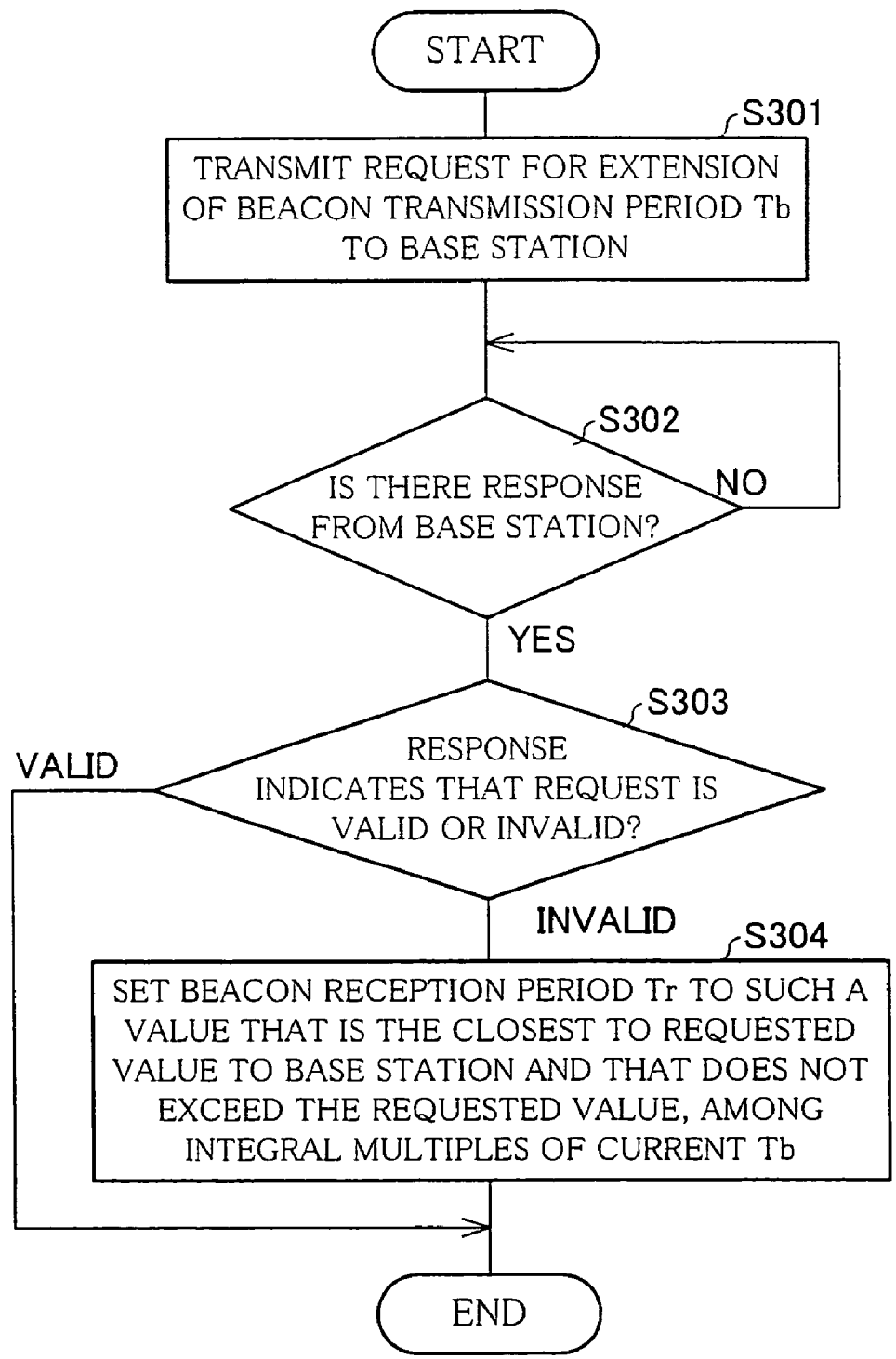
FIG. 30 is a flowchart illustrating operation of a terminal in the case where a terminal has made a request for extension of a beacon transmission period in the wireless communication system illustrated in FIGS. 1 and 2.

Next, with reference to FIG. 30, the following describes operation of the terminal 30 in the case where the terminal 30 has made a request for extension of the beacon transmission period.

Firstly, the terminal 30 transmits, to the base station 10, a request for extension of the beacon transmission period Tb (S301), and then receives a response from the base station 10 (S302). Subsequently, if the response indicates that the request is invalid ("INVALID" in S303), the terminal 30 sets the beacon reception period Tr to such a value that is the closest to a requested value to the base station 10 that does not exceed the requested value among integral multiples of the current beacon transmission period Tb (S304).

Figure 31:
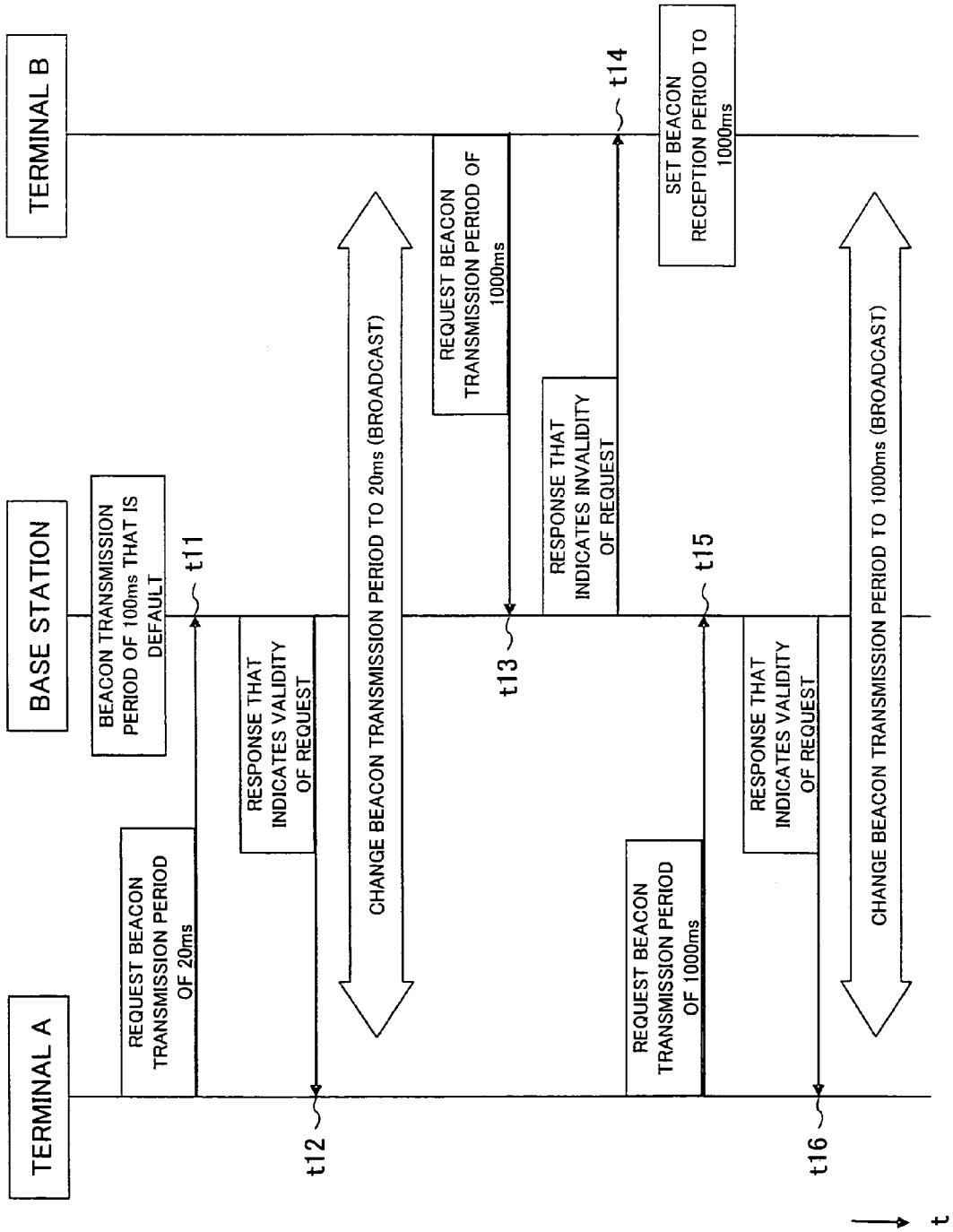
FIG. 31 is a diagram illustrating one example of a sequence in the case where the wireless communication system illustrated in FIGS. 1 and 2 includes a plurality of terminals.

FIG. 31 is a sequence diagram illustrating operation of the terminal 30 and the base station 10 in this case.

In the state where the beacon transmission period of the base station 10 is 100 ms (default), the terminal 30A requests the beacon transmission period of 20 ms, and the base station 10 receives the request (t11). Then, the terminal 30A receives from the base station 10 a response that the request is valid (t12). In this case, the base station 10 changes the beacon transmission period to 20 ms and broadcasts the change of the beacon transmission period to all of the terminals 30.

Next, in this state, the other terminal 30B requests the beacon transmission period of 1000 ms, and the base station 10 receives the request (t13). The base station 10 regards this request as being invalid since this request is a request for extension of the current transmission period and is not a request made by the terminal 30A having requested a change to the current beacon transmission period, and then transmits invalidity of the request to the terminal 30B (t14). When the terminal 30B receives from the base station 10 a response that the request for change has been regarded as being invalid, the terminal 30B sets the beacon reception period to 1000 ms that is an integral multiple of the current beacon transmission period of 20 ms.

Subsequently, in this state, the terminal 30A requests the beacon transmission period of 1000 ms, and the base station 10 receives the request (t15). The base station 10 regards this request as being valid since this request is a request for extension of the current transmission period, but is a request made by the terminal 30A having requested a change to the current beacon transmission period, and then transmits validity of the request to the terminal 30A (t16). In this case, the base station 10 changes the beacon transmission period to 1000 ms and broadcasts the change of the beacon transmission period to all of the terminals 30.

Here, in the situation where the beacon transmission period has been extended, if a value requested by the terminal 30A having made a request for setting to the current beacon transmission period is larger than a value requested by the other terminal 30B, the base station 10 extends the beacon transmission period, and thereafter the other terminal 30B makes a request for shortening of the beacon transmission period. In this case, there might be an unsuitable state for the other terminal 30B during a period until the base station 10 shortens the beacon transmission period.

Figure 32:
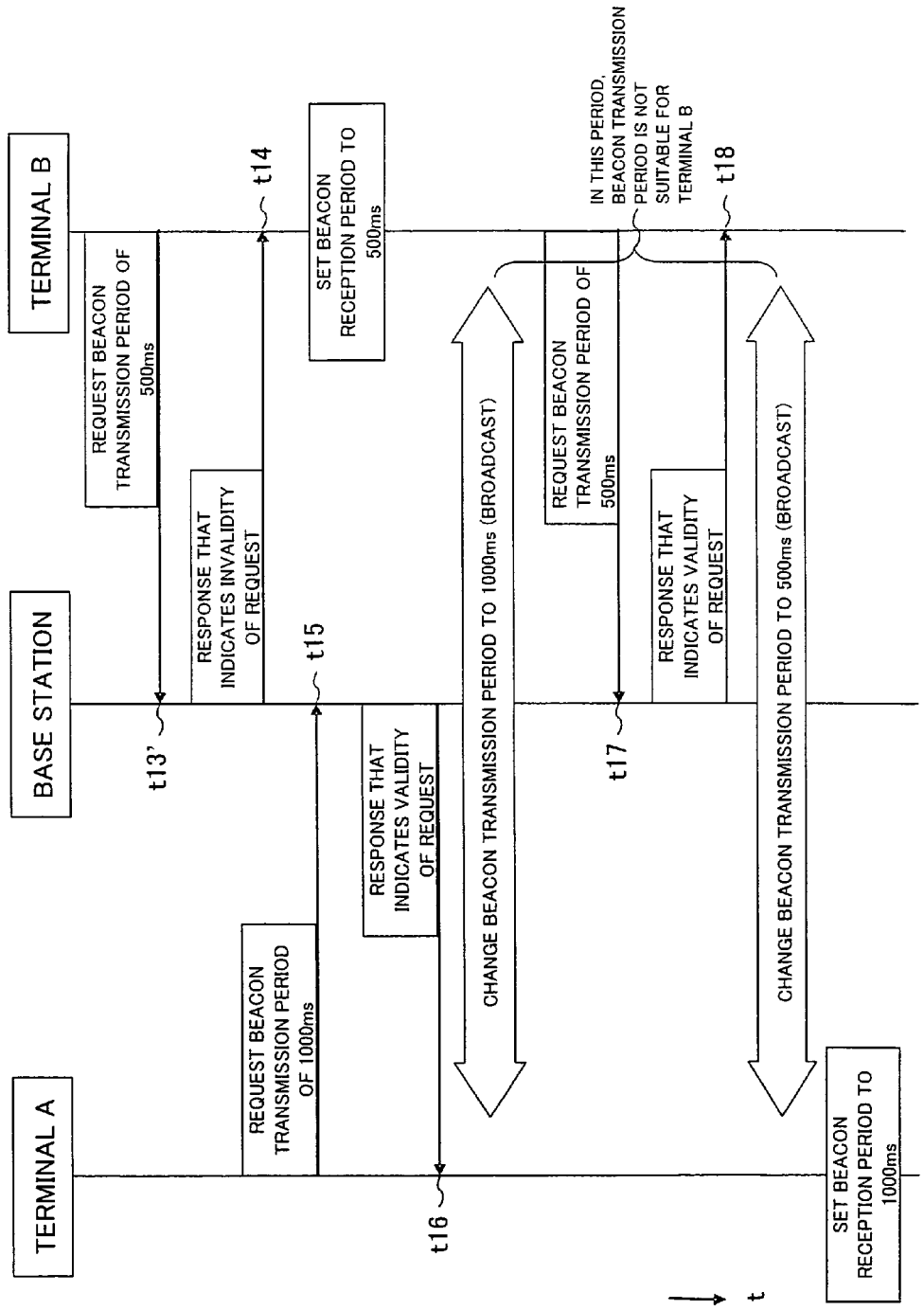
FIG. 32 is a diagram illustrating one example of a sequence in the case where the wireless communication system illustrated in FIGS. 1 and 2 includes a plurality of terminals.

With reference to FIG. 32, the above problem is described. FIG. 32 is a sequence diagram illustrating operation of the terminal 30 and the base station 10.

FIG. 32 illustrates the case where, in t13 of FIG. 31, the other terminal 30B requests the beacon transmission period of 500 ms (t13'), not 1000 ms. The base station 10 regards this request as being invalid since this request is a request for extension of the current transmission period and is not a request made by the terminal 30A having requested a change to the current beacon transmission period, and then transmits invalidity of the request to the terminal 30B (t14). When the terminal 30B receives from the base station 10 a response that the request for change has been regarded as being invalid, the terminal 30B sets the beacon reception period to 500 ms that is an integral multiple of the current beacon transmission period of 20 ms.

Thereafter, as in the case of FIG. 31, the terminal 30A requests the beacon transmission period of 1000 ms, and the base station 10 receives the request (t15). The base station 10 regards this request as being valid since this request is a request for extension of the current transmission period, but is a request made by the terminal 30A having requested a change to the current beacon transmission period, and then transmits validity of the request to the terminal 30A (t16). In this case, the base station 10 changes the beacon transmission period to 1000 ms and broadcasts the change of the beacon transmission period to all of the terminals 30.

In this case, the terminal 30B requests the base station 10 the beacon transmission period of 500 ms since the beacon transmission period is 1000 ms with respect to the beacon reception period of 500 ms (t17). In response to this request, the base station 10 changes the beacon transmission period to 500 ms (t18). However, there is an unsuitable state for the other terminal 30B during a period from when the beacon transmission period is changed to 1000 ms in response to the request from the terminal 30A to when the beacon transmission period is changed to 500 ms in response to the request from the terminal 30B.

In this circumstance, if the request for extension of the beacon transmission period is transmitted from the terminal 30A having made a request for setting to the current beacon transmission period, the base station 10 judges whether or not it is in communication with the other terminal 30B. If it is in communication with the other terminal 30B, the base station 10 compares between the beacon transmission period requested by the other terminal 30B and the beacon transmission period requested by the terminal 30A having made a request for setting to the current beacon transmission period. As a result of comparison, the base station 10 changes the beacon transmission period to a shorter period. On the other hand, if it is not in communication with the terminal 30B, the base station 10 may change the beacon transmission period to a value requested by the terminal 30A having made a request for setting to the current beacon transmission period. This makes it possible for all of the terminals 30 to set suitable beacon reception intervals and to reduce their power consumption.

Here, in the base station 10, the communication control section 15 performs a process of selecting the shortest beacon transmission period among beacon transmission periods requested by such terminals 30 in communication with the base station 10 as described above. More specifically, in the case where the base station 1 receives a request for extension of the current beacon transmission period, the communication control section 15 judges whether or not the request is a request from the terminal 30 having transmitted a request for change to the current beacon transmission period. Then, if judging that the request is a request from the terminal having transmitted a request for change to the current beacon transmission period, the communication control section 15 changes the beacon transmission period in accordance with that request. Further, the communication control section 15 holds the beacon transmission periods requested by all of the terminals 30. Then, the communication control section 15 selects the shortest period from among the beacon transmission periods requested from the all of the terminals 30.

Figure 33:
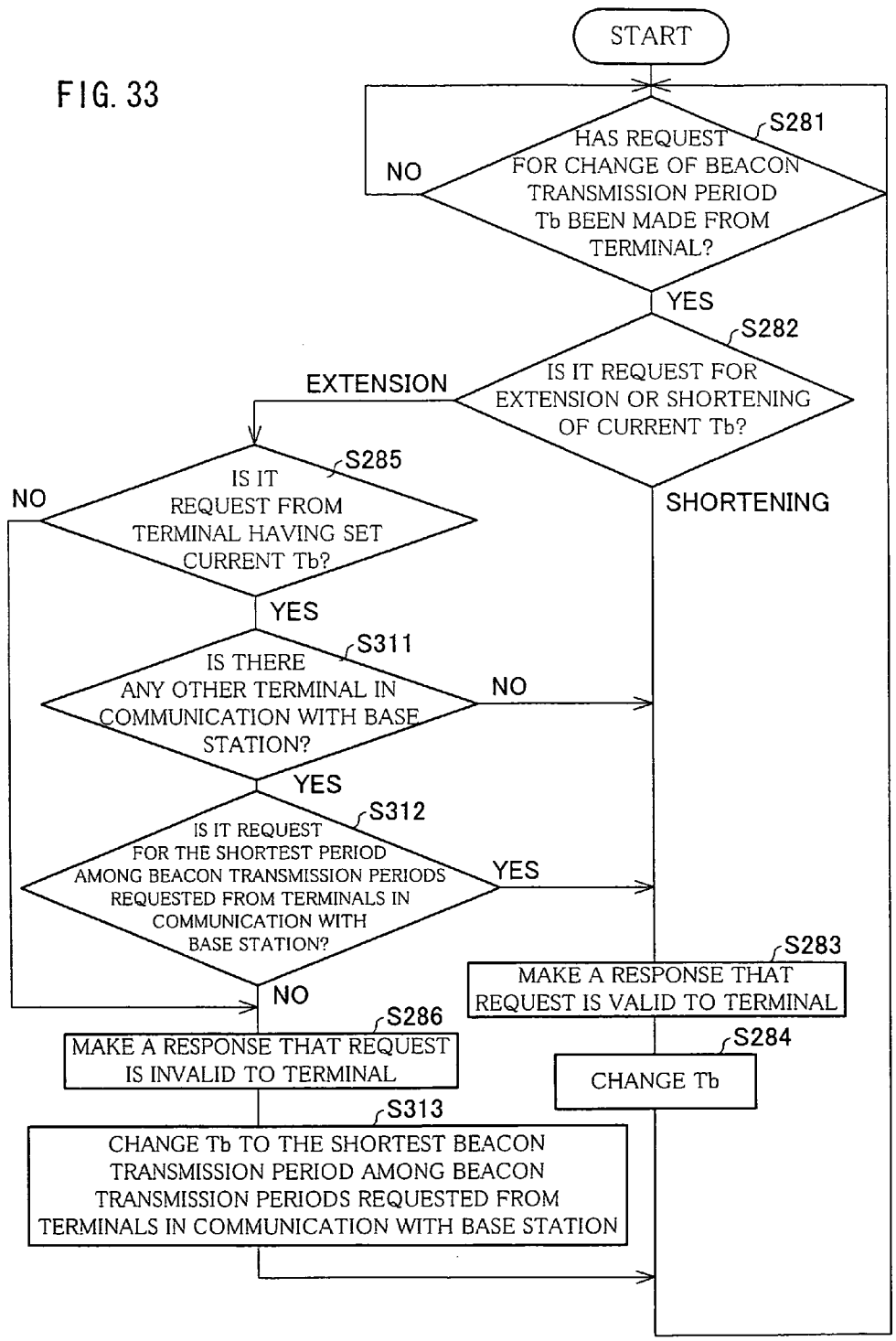
FIG. 33 is a flowchart illustrating operation of a base station when the base station receives a request for change of a beacon transmission period from the terminal in the wireless communication system illustrated in FIGS. 1 and 2.

With reference to FIG. 33, the following specifically describes operation of the base station 10 in this case. FIG. 33 is a flowchart illustrating operation of the base station 10 when the base station 10 receives a request for change of the beacon transmission period from the terminal 30. Note that, operation of the terminal 30 is the same as that illustrated in the flowcharts of FIGS. 29 and 30.

Firstly, the base station 10 detects that a request for change of the beacon transmission period Tb has been made from the terminal 30 (YES in S281). Then, if the detected request is a request for shortening of the beacon transmission period Tb ("SHORTENING" in S282), the base station 10 makes, to that terminal 30, a response that the request for change of the beacon transmission period Tb is valid (S283), and changes the beacon transmission period Tb (S284).

If the base station 10 have received a request for extension of the current beacon transmission period Tb from the terminal 30 having setting the current beacon transmission period Tb (YES in S285), the base station 10 judges whether or not there are other terminals 30 in communication with the base station 10 and whether or not there is a period shorter than the newly requested beacon transmission period Tb in beacon transmission periods Tb' requested from the other terminals 30 (S311, S312). Then, if there is no period shorter than the newly requested beacon transmission period Tb in the beacon transmission periods Tb' requested from such other terminals 30 in communication with the base station 10 (NO in S311 or YES in S312), the base station 10 makes, to that terminal 30, a response that the request for change of the beacon transmission period Tb is valid (S283), and changes the beacon transmission period Tb (S284).

On the other hand, if there is a period shorter than the newly requested beacon transmission period Tb in the beacon transmission periods Tb' requested from the other terminals 30 in communication with the base station 10 (YES in S311 and NO in S312), the base station 10 makes, to that terminal 30, a response that the request for change of the beacon transmission period Tb is invalid (S286), and changes to the beacon transmission period Tb' (S313). This makes it possible to perform change to the shortest beacon transmission period Tb among the beacon transmission periods requested from the terminals 30 in communication with the base station 10.

FIG. 34 is a sequence diagram illustrating operations of the terminal 30 and the terminal 10 in this case.

In the state where the beacon transmission period of the base station 10 is 100 ms (default), the terminal 30A requests the beacon transmission period of 20 ms, and the base station 10 receives the request (t21). Then, the terminal 30A receives from the base station 10 a response that the request is valid (t22). In this case, the base station 10 changes the beacon transmission period to 20 ms and broadcasts the change of the beacon transmission period to all of the terminals 30.

Next, in this state, the other terminal 30B requests the beacon transmission period of 500 ms, and the base station 10 receives the request (t23). The base station 10 regards this request as being invalid since this request is a request for extension of the current transmission period and is not a request made by the terminal 30A having requested a change to the current beacon transmission period, and then transmits invalidity of the request to the terminal 30B (t24). When the terminal 30B receives from the base station 10 a response that the request for change has been regarded as being invalid, the terminal 30B sets the beacon reception period to 500 ms that is an integral multiple of the current beacon transmission period of 20 ms.

Subsequently, in this state, the terminal 30A requests the beacon transmission period of 1000 ms, and the base station 10 receives the request (t25). The base station 10 regards this request as being valid since this request is a request for extension of the current transmission period and is a request made by the terminal 30A having requested a change to the current beacon transmission period, but there is the other terminal 30B currently in communication with the base station 10 and the beacon transmission period 500 ms which has been requested from the terminal 30B is shorter than the beacon transmission period 1000 ms. Then, the base station 10 transmits validity of the request to the terminal 30A (t26). In this case, the base station 10 changes the beacon transmission period to 500 ms, which is the shortest beacon transmission period among the beacon transmission periods requested from the terminals 30 in communication with the base station 10 and then broadcasts the change of the beacon transmission period to all of the terminals 30. Further, the terminal 30A sets its beacon reception period to beacon reception period of 1000 ms which is an integral multiple of the current beacon transmission period of 500 ms.

Note that, a communication system according to the present invention is a communication system, composed of a base station and at least two terminals, where a period between transmissions of periodic signals (beacon signals) transmitted from the base station is notified to the terminal, wherein in the case where transmission period setting requesting means (terminal-side wireless communication section 36) in the terminal A transmits, to the base station, a request for shortening of the current transmission period, and the base station shortens the current period between transmissions of periodic signals in accordance with the request having been received from the terminal A, terminals other than the terminal A may include reception period setting means (terminal-side wireless communication section 36) which sets a period between receptions of the periodic signals to a multiple of the period between transmissions of periodic signals transmitted from the base station.

Further, a base station according to the present invention may include terminal judgment means (communication control section 15) which judges, when the received request is a request for extension of the current period between transmissions of periodic signals, whether or not the request has been received from a terminal having transmitted a request for change to the current transmission period. Further, if the terminal judgment means judges that the request has been received from the terminal having transmitted the request for change to the current period between transmissions of periodic signals, a base station according to the present invention may change the period between transmissions of periodic signals. Still further, if the terminal judgment means judges that the request has been received from the terminal having transmitted the request for change to the current period, and if communication judgment means (communication control section 15) which judges whether or not the base station is in communication with a terminal other than the terminal having transmitted the request, included in a base station according to the present invention, judges that the base station is in communication with other terminal, the base station may change the current period to a shortest period of all periods between transmissions of periodic signals, received from the terminals in communications with the base station.

The present invention is not limited to the aforementioned embodiments and is susceptible of various changes within the scope of the accompanying claims. An embodiment obtained by suitable combinations of technical means disclosed in the different embodiments also fall within the technical scope of the present invention.

Further, in a wireless communication system according to the present invention, change of the beacon period may be performed in accordance with not only a communication pattern of the application and a state of the application, but also a type of a device used as a terminal (portable telephone, portable information terminal, notebook computer, portable television, and other devices). In addition, change of the beacon period may be performed in accordance with a combination of a type of the device and a type of the application.

Further, the streaming application or the IP phone application may be executed in such a manner that the amount of space necessary for a stable transmission in the amount of space available in a buffer of the base station is dedicated to the application, and the rest of the space in the buffer is used for other application or by other terminal.

Further, as described above, the communication interface section 35 in the terminal 30 is positioned between the application section 33 and the terminal-side wireless communication section 36, so as to function as a middleware. In addition, the communication interface section 35 may be arranged so as to be provided for each application or may be arranged so as to be shared by a plurality of applications (FIG. 2).

In the case where the communication interface section 35 is provided for each application, the communication interface section 35 can be integral with the application. In such an arrangement, the application becomes a special-purpose application including, in addition to normal functions as e-mail application and streaming application, a function, as the communication interface section 35, of obtaining a communication pattern of the application and a state of the application, and a function of controlling the terminal-side wireless communication section 36 to change the beacon period in accordance with a communication pattern of the application and a state of the application.

Meanwhile, in the case where the communication interface section 35 is shared by a plurality of applications, the application should include only a normal function as e-mail application and streaming application, and the application becomes a so-called general-purpose application. In this case, the communication interface section 35 can be provided in the terminal-side wireless communication section 36.

In the terminal 30 according to the present invention, regardless of whether an application is a special-purpose or general-purpose application, the middleware (communication interface section 35) obtains a communication pattern of the application and a state of the application and changes the beacon period.

The application operated in the terminal 30, not limited to one realized by software, may be one realized by hardware or one realized by a combination of hardware and software.

A wireless communication system according to the present invention is a wireless communication system, composed of a base station and a terminal, where a terminal is identified by a base station in accordance with beacon signals transmitted periodically from the base station, and to the identified terminal, the presence or absence of data to be transmitted and a period until a transmission of a next beacon signal are notified, and in the wireless communication system, the terminal may include means (terminal-side wireless communication section 36) which transmits, to the base station, a request for setting of a period between transmissions of beacon signals, and the base station may include means (communication control section 15) which changes the period between transmissions of beacon signals in accordance with the request having been received from the terminal. Further, in the foregoing wireless communication system, the request for setting of the period between transmissions of beacon signals may be determined in accordance with a communication pattern of an application to be executed by the terminal. Still further, in the foregoing wireless communication system, the request for setting of the period between transmissions of beacon signals may be determined in accordance with a type of an application to be executed by the terminal. Yet further, in the foregoing wireless communication system, the request for setting of the period between transmissions of beacon signals may be determined in accordance with a state of an application to be executed by the terminal. Further, in the foregoing wireless communication system, the request for setting of the period between transmissions of beacon signals may be determined in accordance with a type of a device used as the terminal. Still further, in the foregoing wireless communication system, the request for setting of the period between transmissions of beacon signals may be determined in accordance with a combination of a type of a device used as the terminal and an application to be executed. Yet further, the foregoing wireless communication system may include means (communication control section 15) which checks the amount of space in a buffer of the base station. Further, in the foregoing wireless communication system, in the case where a plurality of applications are executed, the shortest period among the periods required by the applications may be the period between transmissions of beacon signals. Still further, in the foregoing wireless communication system, in the case where there are a plurality of terminals, the shortest period among the periods required by the terminals may be the period between transmissions of beacon signals. Yet further, in the foregoing wireless communication system, in the case where there are a plurality of terminals, the beacon reception period of each terminal may be changed without change of the period between transmissions of beacon signals in the base station. Further, in the foregoing wireless communication system, the beacon reception period of each terminal may be a multiple of the period between transmissions of beacon signals in the base station.

A communication management method according to the present invention in a wireless communication system is a communication management method in a wireless communication system, composed of a base station and a terminal, where a terminal is identified by a base station in accordance with beacon signals transmitted periodically from the base station, and to the identified terminal, the presence or absence of data to be transmitted and a period until a transmission of a next beacon signal are notified, and the communication management method may include: in the terminal, a step of transmitting, to the base station, a request for setting of the period between transmissions of beacon signals; and in the base station, a step of setting the period between transmissions of beacon signals in accordance with the request having been received from the terminal. Further, in the foregoing communication management method, the request for setting of the period between transmissions of beacon signals may be determined in accordance with a communication pattern of an application to be executed by the terminal. Still further, in the foregoing communication management method, the request for setting of the period between transmissions of beacon signals may be determined in accordance with a type of an application to be executed by the terminal. Yet further, in the foregoing communication management method, the request for setting of the period between transmissions of beacon signals may be determined in accordance with a state of an application to be executed by the terminal. Further, in the foregoing communication management method, the request for setting of the period between transmissions of beacon signals may be determined in accordance with a type of a device used as the terminal. Still further, in the foregoing communication management method, the request for setting of the period between transmissions of beacon signals may be determined in accordance with a combination of a type of a device used as the terminal and an application to be executed. Yet further, in the foregoing communication management method, the amount of space in a buffer of the base station may be checked and the request for setting of the period between transmissions of beacon signals may be determined in accordance with the amount of space in the buffer. Further, in the foregoing communication management method, in the case where a plurality of applications are executed, the shortest period among the periods required by the applications may be the period between transmissions of beacon signals. Still further, in the foregoing communication management method, in the case where there are a plurality of terminals, the shortest period among the periods required by the terminals may be the period between transmissions of beacon signals. Yet further, in the foregoing communication management method, in the case where there are a plurality of terminals, the beacon reception period of each terminal may be changed without change of the period between transmissions of beacon signals in the base station. Further, in the foregoing communication management method, the beacon reception period of each terminal may be a multiple of the period between transmissions of beacon signals in the base station.

A terminal according to the present invention is a terminal in a wireless communication system, composed of a base station and a terminal, where a terminal is identified by a base station in accordance with beacon signals transmitted periodically from the base station, and to the identified terminal, the presence or absence of data to be transmitted and a period until a transmission of a next beacon signal are notified, and the terminal may include: means (terminal-side wireless communication section 36) which transmits, to the base station, the request for setting of the period between transmissions of beacon signals.

A base station according to the present invention is a base station in a wireless communication system, composed of a base station and a terminal, where a terminal is identified by a base station in accordance with beacon signals transmitted periodically from the base station, and to the identified terminal, the presence or absence of data to be transmitted and a period until a transmission of a next beacon signal are notified, and the base station may include: means (communication control section 15) which sets the period between transmissions of beacon signals in accordance with the request having received from the terminal.

A terminal according to the present invention is a terminal in a wireless communication system, composed of a base station and a terminal, where communications are performed between the base station and the terminal, the terminal may include control instruction means (communication interface section 35) which makes control instructions to the communication control means (terminal-side wireless communication section 36) which performs control of communications. Further, in the foregoing terminal, the instructions by the control instruction means may be determined in accordance with a communication pattern of an application to be executed by the terminal. Still further, in the foregoing terminal, the instructions by the control instruction means may be determined in accordance with a type of an application to be executed by the terminal. Yet further, in the foregoing terminal, the instructions by the control instruction means may be determined in accordance with a state of an application to be executed by the terminal. Further, in the foregoing terminal, the instructions by the control instruction means may be determined in accordance with a type of a device used as the terminal. Still further, in the foregoing terminal, the instructions by the control instruction means may be determined in accordance with a combination of a type of a device used as the terminal and an application to be executed.

A wireless communication system according to the present invention is a wireless communication system, composed of a base station and a terminal, where communications are performed between the base station and the terminal, and the wireless communication system may be such that the terminal includes: terminal communication control means (terminal-side wireless communication section 36) which performs control for communications with the base station; and control instruction means (communication interface section 35) which make control instructions to the terminal communication control means, and the base station may include: base station communication control means (control section 13) which performs control for communications with the terminal; and means (communication control section 15) which controls the base station communication control means in accordance with the instructions from the control instruction means of the terminal. Further, in the foregoing wireless communication system, the instructions by the control instruction means may be determined in accordance with a communication pattern of an application to be executed by the terminal. Still further, in the foregoing wireless communication system, the instructions by the control instruction means may be determined in accordance with a type of an application to be executed by the terminal. Yet further, in the foregoing wireless communication system, the instructions by the control instruction means may be determined in accordance with a state of an application to be executed by the terminal. Further, in the foregoing wireless communication system, the instructions by the control instruction means may be determined in accordance with a type of a device used as the terminal. Still further, in the foregoing wireless communication system, the instructions by the control instruction means may be determined in accordance with a combination of a type of a device used as the terminal and an application to be executed. Yet further, the foregoing wireless communication system may include means (communication control section 15) which checks the amount of space in a buffer of the base station.

An object of the present invention can be also achieved in such a manner that a computer-readable recording medium storing therein program codes (execute form program, intermediate code program, source program) of a communication management program (control program of the base station 10, control program of the terminal 30), which is software for realizing the aforementioned functions, is supplied to a system or a device, and a computer (or CPU, MPU, or DSP) of the system or device reads out and executes program codes stored in the recording medium. In this case, the program codes read out from the recording medium realize the aforementioned functions, so that the recording medium recording these program codes constitutes the present invention.

Specifically, a predetermined program stored in a memory (not shown) of the base station 10 is executed by a microprocessor or the like in the base station 10, so that the communication control section 15 of the base station 10 is realized. Further, a predetermined program stored in a memory (not shown) of the terminal 30 is executed by a microprocessor or the like in the terminal 30, so that the communication interface section 35, the transmission control section 37, the reception control section 39 in the terminal 30 are realized.

The recording medium for supplying the program codes can be separated from the system or device. Further, the recording medium may be a medium which holds the program codes in a fixed manner so as to supply the program codes. In addition, the recording medium may be provided in the system or device so that the program codes stored in the recording medium can be directly read out by the computer, or may be inserted as an external storage device in the system or device so that the program codes stored in the recording medium can be read out via a program reading device connected to the system or device.

For example, the recording medium can be a tape medium including magnetic tape and cassette tape; a disk medium including magnetic disk such as floppy® disk and hard disk and optical disk such as CD-ROM, MO, MD, DVD, and CD-R; a card medium including IC card (including memory card) and optical card; or a semiconductor memory including mask ROM, EPROM, EEPROM, and flash ROM.

In addition, the program codes may be stored so that the computer can read out from the recording medium to directly execute the program codes, or may be stored so that the computer can read out from a program storage area a main storage to which the program codes are transferred from the recording medium.

Further, the system or device may be arranged to connect to a communication network to supply the above program codes via the communication network. As the communication network, which is not especially limited, available are, for example, Internet, Intranet, Extranet, LAN, ISDN, VAN, CATV communication network, virtual private network, telephone line network, mobile communication network, and satellite communication network. Moreover, as a transmission medium constituting the communication network, which is not especially limited, available are, for example, wired lines such as IEEE1394, USB, power-line carrier, CATV line, telephone line, and ADSL line and wireless lines such as infrared rays for IrDA and remote control, Bluetooth®, IEEE802.11, HDR, mobile telephone network, satellite line, and terrestrial digital network. Note that, the present invention can be also realized when the program codes are in the form of carrier wave embodied by electronic transmission or data signal strings.

Note that, the system or device stores beforehand therein computer-implemented programs for reading out the program codes from the recording medium and storing them in the main storage and for downloading the program codes via the communication network.

The aforementioned functions are realized in such a manner not only that the computer implements the read program codes, but also that in accordance with the instructions from the program codes an operating system and others which operate on the computer perform an actual processing in whole or in part.

The aforementioned functions are further realized in such a manner that after the program codes read out from the recording medium are written in a memory which is provided in a function expansion board mounted in the computer or a function expansion unit connected to the computer, in accordance with the instructions from the program codes a CPU and others which are provided in the function expansion board or function expansion unit perform an actual processing in whole or in part.

Note that, a communication system according to the present invention is a communication system where a period between transmissions of a periodic signal transmitted from a base station is notified to a terminal, the communication system may be arranged such that the terminal comprises transmission period setting requesting means which transmits to the base station a request for setting of a period between transmissions of periodic signals; and the base station comprises transmission period setting means which changes the period between transmissions of periodic signals in accordance with the request having been received from the terminal.

Here, the periodic signal is a signal periodically transmitted from the base station to the terminal so as to control communications between the base station and the terminal, and is referred to as "beacon signal" in the wireless LAN, for example. The period between transmissions of periodic signal (transmission period) is transmitted at least when notification of the period is requested from the terminal to the base station. This transmission period may be transmitted in such a manner so as to be incorporated into the periodic signal, or may be transmitted separately by a signal for notification. Note that, the periodic signal may include information indicating whether or not there is data to be transmitted from the base station to the terminal.

With this arrangement, the period of the periodic signal transmitted from the base station can be controlled by the terminal. Therefore, the terminal can optimize a period between receptions of the periodic signal (reception period), in accordance with its own status. Consequently, the power supply to a communication circuit can be kept OFF until the timing for receiving the periodic signal in the terminal. As a result, power consumption of the terminal can be reduced. More specifically, the period between transmissions of periodic signals is dynamically changed and is set to a best-suited value, in accordance with a type of device as used a terminal and an application executed by the terminal, thus enabling a response in real time and reduction in power consumption.

Further, a communication system according to the present invention may be such that the terminal further comprises: application executing means which executes an application involving communications via the base station with an external entity; and communication interface means which notifies, to the transmission period setting requesting means, the period between transmissions of periodic signals, corresponding to communication property and/or a type of the application being executed by the application executing means, the transmission period setting requesting means transmitting, to the base station, the request for setting of the period between transmissions of periodic signals, to the period having been notified from the communication interface means.

Here, the "communication property" is determined by, for example, (a) a communication pattern of the application, (b) a state of the application, (c) a type of a device used as the terminal, or (d) a combination of (a) to (c). The "communication property" and the "type of the application" are used as information for determining the period between transmissions of periodic signals (transmission period determination information). For example, if the type of the application is the e-mail application, the communication property is determined by an interval, which is set by the user, of automatic mail reception check. If the type of the application is the streaming application, the communication property is determined by a data rate for streaming and the amount of space in a buffer of the base station. If the type of the application is the IP phone application, the communication property is determined by an interval of reception check performed in a standby state, and by an interval of packet-transmission performed in a call state.

According to the foregoing communication system, the terminal can optimize its own period between receptions of the periodic signal in accordance with the communication pattern and state of the application executed by the terminal. Therefore, it is possible to reduce power consumption of the terminal with respect to each application.

For example, if the type of the application is the e-mail application, the terminal requests the base station to change the transmission period to such a period that corresponds to the interval, which is set in the application, of automatic mail reception check. This allows the terminal to perform intermittent receiving, at a minimum period required to check on whether or not an e-mail message has been received. Therefore, the terminal can optimize its period between receptions of the periodic signal, so that the power supply to the communication circuit can be kept OFF until the timing for receiving the periodic signal. As a result, power consumption can be reduced.

Further, conventionally, the streaming application and IP phone application were executed constantly in the communication state. However, according to the foregoing communication system, the period between transmissions of periodic signals can be set so as not to cause data collapse and data delay, whereby it is possible to provide a period during which there are no communications and perform intermittent data receptions. As a result, power consumption can be reduced.

Further, a communication system according to the present invention may be such that the communication interface means acquires a state of the application executed by the application executing means and then determines the period between transmissions of periodic signals in accordance with the state of the application.

With this arrangement, the terminal can optimize the period between receptions of the periodic signals in accordance with the state of the application. Therefore, it is possible to reduce power consumption according to the state of the application.

For example, in the case where the application is the IP phone application, the terminal sets the transmission period to, for example, 1 sec in the stand-by state, and to a value (e.g. 20 msec) corresponding to the interval of packet-transmission (with this value, delay will not have much influence) in the call state. This allows the terminal to perform intermittent receiving in accordance with the interval of packet-transmission. Therefore, the terminal can optimize its period between receptions of the periodic signal, so that the power supply to the communication circuit can be kept OFF until the timing for receiving the periodic signal. As a result, power consumption during a telephone conversation is reduced. Note that, detection of off-hook operation performed by the user enables detection of the call state.

Further, a communication system according to the present invention may be such that the communication interface means determines the period between transmissions of periodic signals in accordance with an amount of space in a buffer of the base station.

With this arrangement, even in the case of such an application using a buffer of the base station during data transmissions, as the streaming application, the terminal can optimize its period between receptions of the periodic signal. Therefore, it is possible to reduce power consumption in accordance with the amount of space in the buffer of the base station.

For example, if the type of the application is the streaming application, the terminal acquires the buffer the amount of space in the buffer of the base station. Then, on the basis of the data rate of streaming and the amount of space in the buffer, the terminal calculates a longest transmission period with which the data reproduction will not collapse. Thereafter, the terminal requests the base station to change the transmission period to the transmission period thus obtained. This allows the terminal to perform intermittent receiving at a period with which data will not collapse. Therefore, the terminal can optimize its period between receptions of periodic signals, so that the power supply to the communication circuit can be kept OFF until the timing for receiving a periodic signal. As a result, power consumption during streaming can be reduced.

Further, a communication system according to the present invention may be such that the communication interface means, in a case where a plurality of the applications are executed by a single terminal, determines that a shortest period among periods required by the applications is the period between transmission s of periodic signals.

With this arrangement, even in the case where a plurality of the applications are executed by a single terminal, the terminal optimizes the period between receptions of the periodic signals, so that the power supply to the communication circuit can be kept OFF until the timing for receiving a periodic signal, thus enabling reduction in power consumption.

Further, a communication system according to the present invention may be such that the transmission period setting means, in a case where the communication system includes a plurality of the terminals, determines that a shortest period among periods required by the terminals is the period between transmission s of periodic signals.

With this arrangement, even in the case where one base station is used by a plurality of terminals, the period between receptions of the periodic signals is optimized, so that the power supply to the communication circuit can be kept OFF until the timing for receiving a periodic signal, thus enabling reduction in power consumption.

Further, a communication system according to the present invention may be such that the terminal comprises communication interface means which notifies, to the transmission period setting requesting means, transmission period determination information for the base station determining the period between transmissions of periodic signals; and the transmission period setting requesting means transmits, to the base station, the request for setting of the period between transmissions of periodic signals, the request including the transmission period determination information notified by the communication interface means.

With this arrangement, further, the transmission period determination information is transmitted from the terminal to the base station, and the base station can determine the period between transmissions of periodic signals in accordance with the transmission period determination information. Therefore, it is not necessary for the terminal to determine the period between transmissions of periodic signals. This allows a simplified arrangement of the terminal.

Note that, what is used as the transmission period determination information is "communication property" and/or "type of the application" executed in the terminal. Here, the "communication property" is determined by, for example, (a) a communication pattern of the application, (b) a state of the application, (c) a type of a device used as the terminal, or (d) a combination of (a) to (c).

Further, a communication system according to the present invention may be such that the terminal comprises application executing means which executes an application involving communications via the base station with an external entity; and the transmission period determination information contains communication property and/or a type of the application being executed by the application executing means.

Further, with this arrangement, the base station can determine the period between transmissions of periodic signals, corresponding to communication property and/or a type of the application executed by the terminal.

Further, a base station according to the present invention may be a base station in a communication system where a period between transmissions of periodic signals transmitted from the base station is notified to a terminal, the base station comprising: transmission period setting means which changes the period between transmissions of periodic signals, in accordance with a request for setting of the period between transmissions of periodic signals, which is received from the terminal.

Further, a terminal according to the present invention may be a terminal in a communication system where a period between transmissions of periodic signals transmitted from a base station is notified to the terminal, the terminal comprising: transmission period setting requesting means which transmits, to the base station, a request for setting of the period between transmissions of periodic signals.

Further, a terminal according to the present invention may further comprises: communication interface means which notifies, to the transmission period setting requesting means, transmission period determination information for the base station determining the period between transmissions of periodic signals, the transmission period setting requesting means transmits, to the base station, the request for setting of the period between transmissions of periodic signals, the request including the transmission period determination information notified by the communication interface means.

Further, a terminal according to the present invention may further comprise: application executing means which executes an application involving communications via the base station with an external entity; and communication interface means which notifies, to the transmission period setting requesting means, the period between transmissions of periodic signals, corresponding to communication property and/or a type of the application being executed by the application executing means, the transmission period setting requesting means transmitting, to the base station, the request for setting of the period between transmissions of periodic signals, to the period having been notified from the communication interface means.

Further, a terminal according to the present invention may be such that power supply to a communication circuit is turned on at a timing of receiving the periodic signal and is turned off upon completion of reception of signals transmitted from the base station.

With this arrangement, further the terminal can turn on power supply to the communication circuit only in a period where communications with the base station are performed. This makes it possible to realize low power consumption.

Further, a communication management method according to the present invention may be a communication management method in a communication system where a period between transmissions of periodic signals transmitted from a base station is notified to a terminal, the method comprising: in the terminal, a transmission period setting requesting step of transmitting, to the base station, a request for setting of the period between transmissions of periodic signals; and in the base station, a transmission period setting step of changing a period between transmissions of periodic signals in accordance with the request having been received from the terminal.

Further, a communication management method according to the present invention may be such that in the transmission period setting requesting step, the terminal transmits transmission period determination information for determining the period between transmissions of periodic signals, the transmission period determination information being incorporated into the request for setting of the period between transmissions of periodic signals; and in the transmission period setting step, the base station determines the period between transmissions of periodic signals in accordance with the transmission period determination information.

Further, a communication management method according to the present invention may further comprise: in the terminal, a transmission period determination step of determining the period between transmissions of periodic signals, corresponding to communication property and/or a type of an application, in execution, involving communications via the base station with an external entity.

Further, a terminal according to the present invention may be a terminal in a communication system where periodic signals are transmitted from a base station to the terminal, the terminal comprises: reception period setting means setting a period between receptions of the periodic signals to a multiple of a period between transmissions of the periodic signals transmitted from the base station.

With this arrangement, without change in the period between transmissions of periodic signals in the base station, the terminal can control the period between receptions of the periodic signals received. This makes it possible for the terminal to optimize the period between receptions of the periodic signals in accordance with a status of the terminal. Therefore, the terminal can keep power supply to the communication circuit OFF until the timing for receiving the periodic signals. This makes it possible to reduce power consumption. That is, the period between transmissions of periodic signals is dynamically changed and is set to a best-suited value, in accordance with a type of device as a terminal and an application executed by the terminal, thus enabling a response in real time and reduction in power consumption.

Note that, the base station may transmit the same periodic signals until it receives a signal (ACK) of reception acknowledgement from the terminal. In this case, the base station transmits, for multiple times, a periodic signal of the same content during the period between receptions of the terminal.

Further, a terminal according to the present invention may further comprise: application executing means which executes an application involving communications via the base station with an external entity; and communication interface means which notifies, to the reception period setting means, a period between receptions of the periodic signals, corresponding to communication property and/or a type of the application being executed by the application executing means.

Here, the "communication property" is determined by, for example, (a) a communication pattern of the application, (b) a state of the application, (c) a type of a device used as the terminal, or (d) a combination of (a) to (c). The "communication property" and the "type of the application" are used as information for determining the period between transmissions of periodic signals (transmission period determination information). For example, if the type of the application is the e-mail application, the communication property is determined by an interval, which is set by the user, of automatic mail reception check. If the type of the application is the streaming application, the communication property is determined by a data rate for streaming and the amount of space in a buffer of the base station. If the type of the application is the IP phone application, the communication property is determined by an interval of reception check performed in a standby state, and by an interval of packet-transmission performed in a call state.

According to the foregoing communication system, the terminal can optimize its own reception period in accordance with the communication pattern and state of the application executed by the terminal. Therefore, it is possible to reduce power consumption of the terminal with respect to each application.

For example, if the type of the application is the e-mail application, the terminal requests the base station to change the reception period to such a period that corresponds to the interval, which is set in the application, of automatic mail reception check. This allows the terminal to perform intermittent receiving, at a minimum period required to check on whether or not an e-mail message has been received. Therefore, the terminal can optimize its own reception period, so that the power supply to the communication circuit can be kept OFF until the timing for receiving the periodic signal. As a result, power consumption can be reduced.

Further, conventionally, the streaming application and IP phone application were executed constantly in the communication state. However, according to the foregoing communication system, the terminal sets the period between receptions of the periodic signals, to such a period which does not cause data collapse and data delay, whereby it is possible to provide a period during which there are no communications and perform intermittent data receptions. As a result, power consumption can be reduced.

Further, a terminal according to the present invention may be such that the communication interface means acquires a state of the application executed by the application executing means and then determines the period between receptions of the periodic signals in accordance with the state of the application.

With this arrangement, the terminal can optimize its own reception period in accordance with the state of the application. Therefore, it is possible to reduce power consumption according to the state of the application.

For example, in the case where the application is the IP phone application, the terminal sets the reception period to, for example, 1 sec in the stand-by state, and to a value (e.g. 20 msec) corresponding to the interval of packet-transmission (with this value, delay will not have much influence) in the call state. This allows the terminal to perform intermittent receiving in accordance with the interval of packet-transmission. Therefore, the terminal can optimize its own reception period, so that the power supply to the communication circuit can be kept OFF until the timing for receiving the periodic signal. As a result, power consumption during a telephone conversation is reduced. Note that, detection of off-hook operation performed by the user enables detection of the call state.

Further, a terminal according to the present invention may be such that the communication interface means determines the period between receptions of the periodic signals in accordance with an amount of space in a buffer of the base station.

With this arrangement, even in the case of such an application using a buffer of the base station during data transmissions, as the streaming application, the terminal can optimize its reception period. Therefore, it is possible to reduce power consumption in accordance with the amount of space in the buffer of the base station.

For example, if the type of the application is the streaming application, the terminal acquires the buffer the amount of space in the buffer of the base station. Then, on the basis of the data rate of streaming and the amount of space in the buffer, the terminal calculates a longest reception period with which the data reproduction will not collapse. Thereafter, the terminal requests the base station to change the reception period to the reception period thus obtained. This allows the terminal to perform intermittent receiving at a period with which data will not collapse. Therefore, the terminal can optimize its own reception period, so that the power supply to the communication circuit can be kept OFF until the timing for receiving a periodic signal. As a result, power consumption during streaming can be reduced.

Further, in a terminal according to the present invention, the communication interface means, in a case where a plurality of the applications are executed by a single terminal, determines that a shortest period among periods required by the applications is the period between receptions of periodic signals.

With this arrangement, even in the case where a plurality of the applications are executed by a single terminal, the terminal optimizes its own reception period, so that the power supply to the communication circuit can be kept OFF until the timing for receiving a periodic signal. This makes it possible to reduce power consumption.

Further, a terminal according to the present invention is a terminal in a communication system where periodic signals are transmitted from a base station to the terminal, and the terminal may comprise: reception period setting means setting a period between receptions of the periodic signals to a multiple of a period between transmissions of the periodic signals transmitted from the base station.

With this arrangement, further the terminal can turn on power supply to the communication circuit only in a period where communications with the base station are performed. This realizes low power consumption.

Further, a communication management method according to the present invention is a communication management method in a communication system where periodic signals are transmitted from a base station to a terminal, and the method may comprise: in a terminal, a reception period setting step of setting a period between receptions of the periodic signals to a multiple of a period between transmissions of the periodic signals transmitted from the base station.

Still further, a communication management method according to the present invention may further comprise: in the terminal, a reception period determination step of determining the period between receptions of the periodic signals, corresponding to communication property and/or a type of an application, in execution, involving communications via the base station with an external entity.

Further, a communication system according to the present invention is a communication system, composed of a base station and at least two terminals, where a period between transmissions of periodic signals transmitted from the base station is notified to the terminal, and the communication system may be such that the terminal comprises transmission period setting requesting means which transmits, to the base station, a request for setting of a period between transmissions of periodic signals; the base station comprises transmission period setting means which changes the period between transmissions of periodic signals in accordance with the request having been received from the terminal, the terminal further comprises: reception period setting means, in a case where the period between transmissions of the periodic signals transmitted from the base station is shorter than a proper period between receptions of the periodic signals to be received by the terminal, sets a period between receptions of the periodic signals to a multiple of a period between transmissions of the periodic signals transmitted from the base station.

With this arrangement, even when one terminal requests the base station to set the transmission period to be shorter than a current transmission period, and then the base station changes the period between transmissions of periodic signals to be shorter than a current transmission period in accordance with the request having received from the terminal, the other terminal sets the period between receptions of the periodic signals to a multiple of the period between transmissions of the periodic signals transmitted from the base station. This enables the other terminal itself to properly adjust a timing for receiving the periodic signal.

Further, a communication system according to the present invention may be such that the transmission period setting means in the base station, when the request having been received from the terminal is a request for extension of a current period between transmissions of periodic signals, judges whether or not the terminal having transmitted the request is identical with a terminal having transmitted a request for change to the current transmission period, and, if it is identical, performs change of the period between transmissions of periodic signals.

This prevents the communications of the terminal performed at a short transmission period from being disturbed by the other terminal's request for setting of the transmission period.

Further, a communication system according to the present invention may be such that the transmission period setting means in the base station, when the terminal having transmitted the request for extension of the current period between transmissions of periodic signals is identical with the terminal having transmitted the request for change to the current period, changes the current period to a shortest period of all periods between transmissions of periodic signals, received from the terminals in communications with the base station.

This prevents the communications of the terminal performed at a short transmission period from being disturbed by the other terminal's request for setting of the transmission period.

Further, a communication device according to the present invention is a communication device which transmits periodic signals, and the communication device may be such that a period between transmissions of periodic signals is changed in accordance with a request for setting of the transmission period.

Further, a communication device according to the present invention may be a communication device which receives periodic signals, wherein: a request for setting of a period between transmissions of periodic signals is transmitted.

Further, a communication device according to the present invention may be a communication device which receives periodic signals, wherein: a period between receptions of periodic signals is set to a multiple of the period between transmissions of periodic signals.

Note that, the base station, the terminal, and the communication device may be realized by a computer. In this case, a control program (communication management program) for the foregoing devices which causes a computer to realize the foregoing devices by causing a computer to operate as the foregoing means, and a computer-readable recording medium containing the control program are also included in the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A communication system where a period between transmissions of periodic signals transmitted periodically from a base station is notified to a terminal,
   the terminal comprising transmission period setting requesting means which transmits, to the base station, a request for setting of a period between transmissions of periodic signals; and
   the base station comprising transmission period setting means which changes the period between transmissions of periodic signals in accordance with the request having been received from the terminal, wherein
   at least one periodic signal includes a period between transmissions of the periodic signals which is set by the base station with respect to a periodic signal transmitted from the base station next to said at least one periodic signal.

2. The communication system according to claim 1, wherein:
   the terminal further comprises:
   application executing means which executes an application involving communications via the base station with an external entity; and
   communication interface means which notifies, to the transmission period setting requesting means, the period between transmissions of periodic signals, corresponding to communication property and/or a type of the application being executed by the application executing means,
   the transmission period setting requesting means transmitting, to the base station, the request for setting of the period between transmissions of periodic signals to the period having been notified from the communication interface means.

3. The communication system according to claim 2, wherein:
   the communication interface means acquires a state of the application executed by the application executing means and then determines the period between transmissions of periodic signals in accordance with the state of the application.

4. The communication system according to claim 2, wherein:
   the communication interface means determines the period between transmissions of periodic signals in accordance with an amount of space in a buffer of the base station.

5. The communication system according to claim 2, wherein:
   the communication interface means, in a case where a plurality of the applications are executed by a single terminal, determines that a shortest period among periods required by the applications is the period between transmissions of periodic signals.

6. The communication system according to claim 1, wherein:
   the transmission period setting means, in a case where the communication system includes a plurality of the terminals, determines that a shortest period among periods required by the terminals is the period between transmissions of periodic signals.

7. The communication system according to claim 1, wherein:
   the terminal comprises communication interface means which notifies, to the transmission period setting requesting means, transmission period determination information for the base station determining the period between transmissions of periodic signals; and
   the transmission period setting requesting means transmits, to the base station, the request for setting of the period between transmissions of periodic signals, the request including the transmission period determination information notified by the communication interface means.

8. The communication system according to claim 7, wherein:
   the terminal comprises application executing means which executes an application involving communications via the base station with an external entity; and
   the transmission period determination information contains communication property and/or a type of the application being executed by the application executing means.

9. A base station in a communication system where a period between transmissions of periodic signals transmitted periodically from the base station is notified to a terminal, the base station comprising:

transmission period setting means which changes the period between transmissions of periodic signals, in accordance with a request for setting of the period between transmissions of periodic signals, which is received from the terminal, wherein at least one periodic signal includes a period between transmissions of the periodic signals which is set by the base station with respect to a periodic signal transmitted from the base station next to said at least one periodic signal.

10. A terminal in a communication system where a period between transmissions of periodic signals transmitted periodically from a base station is notified to the terminal, the terminal comprising:

transmission period setting requesting means which transmits, to the base station, a request for setting of the period between transmissions of periodic signals, wherein at least one periodic signal includes a period between transmission of the periodic signals which is set by the base station with respect to a periodic signal transmitted from the base station next to said at least on periodic signal.

11. The terminal according to claim 10, further comprising:

communication interface means which notifies, to the transmission period setting requesting means, transmission period determination information for the base station determining the period between transmissions of periodic signals, the transmission period setting requesting means transmitting, to the base station, the request for setting of the period between transmissions of periodic signals, the request including the transmission period determination information notified by the communication interface means.

12. The terminal according to claim 10, further comprising:

application executing means which executes an application involving communications via the base station with an external entity; and communication interface means which notifies, to the transmission period setting requesting means, the period between transmissions of periodic signals, corresponding to communication property and/or a type of the application being executed by the application executing means, the transmission period setting requesting means transmitting, to the base station, the request for setting of the period between transmissions of periodic signals, to the period having been notified from the communication interface means.

13. The terminal according to claim 10, wherein:

power supply to a communication circuit is turned on at a timing of receiving the periodic signal and is turned off upon completion of reception of signals transmitted from the base station.

14. A communication management method in a communication system where a period between transmissions of periodic signals transmitted periodically from a base station is notified to a terminal, the method comprising:

in the terminal, a transmission period setting request step of transmitting, to the base station, a request for setting of the period between transmissions of periodic signals; and in the base station, a transmission period setting step of changing a period between transmissions of periodic signals in accordance with the request having been received from the terminal, wherein at least one periodic signal includes a period between transmission of the periodic signals which is set by the base station with respect to a periodic signal transmitted from the base station next to said at least one periodic signal.

15. The method according to claim 14, wherein:

in the transmission period setting requesting step, the terminal transmits transmission period determination information for the base station determining the period between transmissions of periodic signals, the transmission period determination information being incorporated into the request for setting of the period between transmissions of periodic signals; and in the transmission period setting step, the base station determines the period between transmissions of periodic signals in accordance with the transmission period determination information.

16. The method according to claim 14, further comprising:

in the terminal, a transmission period determination step of determining the period between transmissions of periodic signals, corresponding to communication property and/or a type of an application, in execution, involving communications via the base station with an external entity.

17. A terminal in a communication system where periodic signals are transmitted periodically from a base station to the terminal, the terminal comprising:

reception period setting means setting a period between receptions of the periodic signals to a multiple of a period between transmissions of the periodic signals transmitted from the base station, wherein at least one periodic signal includes a period between transmissions of the periodic signals which is set by the base station with respect to a periodic signal transmitted from the base station next to said at least one periodic signal.

18. The terminal according to claim 17, further comprising:

application executing means which executes an application involving communications via the base station with an external entity; and communication interface means which notifies, to the reception period setting means, a period between receptions of the periodic signals, corresponding to communication property and/or a type of the application being executed by the application executing means.

19. The terminal according to claim 18, wherein:

the communication interface means acquires a state of the application executed by the application executing means and then determines the period between receptions of the periodic signals in accordance with the state of the application.

20. The terminal according to claim 18, wherein:

the communication interface means determines the period between receptions of the periodic signals in accordance with an amount of space in a buffer of the base station.

21. The terminal according to claim 18, wherein:

the communication interface means, in a case where a plurality of the applications are executed by a single terminal, determines that a shortest period among periods required by the applications is the period between receptions of periodic signals.

22. The terminal according to claim 17, which turns on power supply to a communication circuit upon receiving the periodic signal and turns off power supply to the communication circuit upon completing the reception of the signal transmitted from the base station.

23. A communication management method in a communication system where periodic signals are transmitted periodically from a base station to a terminal, the method comprising:
in a terminal, a reception period setting step of setting a period between receptions of the periodic signals to a multiple of a period between transmissions of the periodic signals transmitted from the base station, wherein
at least one periodic signal includes a period between transmissions of the periodic signals which is set buy the base station with respect to a periodic signal transmitted from the base station next to said at least one periodic signal.

24. The method according to claim 23, further comprising:
in the terminal, a reception period determination step of determining the period between receptions of the periodic signals, corresponding to communication property and/or a type of an application, in execution, involving communications via the base station with an external entity.

25. A communication system, composed of a base station and at least two terminals, where a period between transmissions of periodic signals transmitted periodically from the base station is notified to the terminal,
the terminal comprising transmission period setting requesting means which transmits, to the base station, a request for setting of a period between transmissions of periodic signals; and
the base station comprising transmission period setting means which changes the period between transmissions of periodic signals in accordance with the request having been received from the terminal,
the terminal further comprising:
reception period setting means, in a case where the period between transmissions of the periodic signals transmitted from the base station is shorter than a proper period between receptions of the periodic signals to be received by the terminal, sets a period between receptions of the periodic signals to a multiple of a period between transmissions of the periodic signals transmitted from the base station, wherein
at least one periodic signal includes a period between transmissions of the periodic signals which is set by the base station with respect to a periodic signal transmitted from the base station next to said at least one periodic signal.

26. The communication system according to claim 25, wherein:
the transmission period setting means in the base station, when the request having been received from the terminal is a request for extension of a current period between transmissions of periodic signals, judges whether or not the terminal having transmitted the request is identical with a terminal having transmitted a request for change to the current period between transmissions of periodic signals, and, if it is identical, performs change of the period between transmissions of periodic signals.

27. The communication system according to claim 26, wherein:
the transmission period setting means in the base station, when the terminal having transmitted the request for extension of the current period between transmissions of periodic signals is identical with the terminal having transmitted the request for change to the current period between transmissions of periodic signals, changes the current period to a shortest period of all periods between transmissions of periodic signals, received from the terminals in communications with the base station.

28. A communication device serving as a base station from which periodic signals are transmitted periodically to a terminal station, wherein:
a period between transmissions of periodic signals is changed in accordance with a request for setting of the period between transmissions of periodic signals, wherein
at least one periodic signal includes a period between transmissions of the periodic signals which is set by the communication device with respect to a periodic signal transmitted from the communication device next to said at least one periodic signal.

29. A communication device serving as a terminal station which receives periodic signals transmitted periodically from a base station, wherein:
a request for setting of a period between transmissions of the periodic signals is transmitted, and
at least one periodic signal includes a period between transmissions of the periodic signals which is set by the base station serving as a communication counterpart, with respect to a periodic signal transmitted from the base station, serving as the communication counterpart, next to said at least one periodic signal.

30. A communication device serving as a terminal station which receives periodic signals transmitted periodically from a base station, wherein:
a period between receptions of the periodic signals is set to a multiple of a period between transmissions of the periodic signals, and
at least one periodic signal includes a period between transmissions of the periodic signals which is set by the base station serving as a communication counterpart, with respect to a periodic signal transmitted from the base station, serving as the communication counterpart, next to said at least one periodic signal.

31. A control program operating the base station according to claim 9, which is a control program for causing a computer to function as each of the foregoing means.

32. A computer-readable recording medium containing therein the control program according to claim 31.

33. A control program operating the terminal according to claim 10, which is a control program for causing a computer to function as each of the foregoing means.

34. A computer-readable recording medium containing therein the control program according to claim 33.

35. A control program operating the terminal according to claim 17, which is a control program for causing a computer to function as each of the foregoing means.

36. A computer-readable recording medium containing therein the control program according to claim 35.

37. A control program operating the communication device according to claim 28, which is a control program for causing a computer to function as each of the foregoing means.

38. A computer-readable recording medium containing therein the control program according to claim 37.

39. A control program operating the communication device according to claim 29, which is a control program for causing a computer to function as each of the foregoing means.

40. A computer-readable recording medium containing therein the control program according to claim 39.

41. A control program operating the communication device according to claim 30, which is a control program for causing a computer to function as each of the foregoing means.

42. A computer-readable recording medium containing therein the control program according to claim 41.

* * * * *

UNITED STATES PATENT AND TRADEMARK OFFICE
CERTIFICATE OF CORRECTION

PATENT NO.       : 7,586,864 B2
APPLICATION NO. : 10/921984
DATED            : September 8, 2009
INVENTOR(S)      : Tsuguhiro Aoki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 720 days.

Signed and Sealed this

Twenty-first Day of September, 2010

David J. Kappos
*Director of the United States Patent and Trademark Office*